(12) United States Patent
Lu et al.

(10) Patent No.: US 9,219,685 B2
(45) Date of Patent: Dec. 22, 2015

(54) COMMUNICATION METHOD AND SYSTEM FOR A NOVEL NETWORK

(75) Inventors: Dorian Lu, Shanghai (CN); Carl Yang, Beijing (CN)

(73) Assignee: BEIJING QIANTANG NETWORK TECHNOLOGY COMPANY, LTD., Beijing (CN)

( * ) Notice: Subject to any disclaimer, the term of this patent is extended or adjusted under 35 U.S.C. 154(b) by 312 days.

(21) Appl. No.: 13/814,717

(22) PCT Filed: Aug. 4, 2011

(86) PCT No.: PCT/CN2011/078002
§ 371 (c)(1),
(2), (4) Date: Mar. 21, 2013

(87) PCT Pub. No.: WO2012/016533
PCT Pub. Date: Feb. 9, 2012

(65) Prior Publication Data
US 2013/0170492 A1    Jul. 4, 2013

(30) Foreign Application Priority Data
Aug. 6, 2010 (CN) .......................... 2010 1 0248194

(51) Int. Cl.
H04L 29/06 (2006.01)
*H04L 12/741* (2013.01)
H04L 29/12 (2006.01)
H04L 12/46 (2006.01)
H04L 12/24 (2006.01)

(52) U.S. Cl.
CPC ............ *H04L 45/74* (2013.01); *H04L 12/4625* (2013.01); *H04L 61/6022* (2013.01); *H04L 41/0896* (2013.01)

(58) Field of Classification Search
None
See application file for complete search history.

(56) References Cited

U.S. PATENT DOCUMENTS

| 7,639,684 | B2 * | 12/2009 | Lim et al. | 370/390 |
| 2009/0161667 | A1 * | 6/2009 | Kern et al. | 370/389 |
| 2011/0030032 | A1 * | 2/2011 | Baykal et al. | 726/3 |

FOREIGN PATENT DOCUMENTS

| CN | 101557303 A | 10/2009 |
| CN | 101674221 A | 3/2010 |

(Continued)

OTHER PUBLICATIONS

International Search Report mailed Nov. 10, 2011, PCT Application No. PCT/CN2011/078002, 6 pages.

(Continued)

*Primary Examiner* — Hassan Phillips
*Assistant Examiner* — Ayanah George
(74) *Attorney, Agent, or Firm* — Kilpatrick Townsend & Stockton LLP

(57) ABSTRACT

A communication method for a novel network is disclosed. The novel network is a network with centralized control function, which includes a main control server and a subordinate network device. The subordinate network device includes a terminal. The method includes the steps: the main control server configures the downlink communication link of the present service, and transmits packets of the present service transmitted from the source terminal to the target terminal according to the downlink communication link. The present invention can guarantee the stability and smoothness of the transmission path, avoid multimedia service delays, ensure state information security requirements, and save hardware resources, thereby guaranteeing the quality of the network transmission.

19 Claims, 11 Drawing Sheets

(56) References Cited

FOREIGN PATENT DOCUMENTS

| | | |
|---|---|---|
| CN | 101729365 A | 6/2010 |
| CN | 101917492 A | 12/2010 |

OTHER PUBLICATIONS

Office Action of the counterpart Chinese application 2010102481949.

* cited by examiner

COMMUNICATION METHOD AND SYSTEM FOR A NOVEL NETWORK

FIELD

The present invention relates to the technical field of communication networks, and in particular, to a communication method for a novel network and a communication system for a novel network.

BACKGROUND

Novel networks (including Internet) enable the exchange of information and other information resources between different individuals and organizations. Generally, a network concerns the technologies of path, transmission, signaling and network management, etc. Such technologies have been widely set forth in various documents among which *Telecommunications Convergence* (McGraw-Hill, 2000) by Steven Shepherd, *The Essential Guide to Telecommunications*, Third Edition (Prentice Hall PRT, 2001) by Annabel Z. Dodd, or *Communications Systems and Networks*, Second Edition (M&T Books, 2000) by Ray Horak gives an overview of the technologies. The progression in such technologies obtained in the past has fully built up the speed and quality of information transmission and lowered the cost thereof.

The path technology for connecting a terminal to a wide area transmission network (for example, a local area loop of a terminal apparatus and the network edge) has been developed from a modem of 14.4, 28.8 and 56K to technologies including ISDN, T1, cable modem, DSL, Ethernet and wireless connection.

At present, transmission technologies used in a wide area network include: synchronous optical network (SONET), Dense Wavelength Division Multiplexing (DWDM), Frame Relay, Asynchronous Transmission Mode (ATM) and Resilient Packet Ring (RPR).

Among all the different signaling technologies (for example, protocols and methods for establishing, maintaining and terminating a communication in a network), Internet Protocol (IP) is applied most widely. In fact, almost all the communication and network specialists consider that an IP-based network (for example, Internet) that integrates audio (for example, telephone), video and data networks is an inevitable trend. Just as described by an author: there's one thing that is clear, that is, an IP-based train that integrates various networks has drawn out of the station, some passengers are eager in this trip, and others are pulled forward with reluctance and cry, scream, struggle and list all sorts of defects of IP; however, in spite of all the defects thereof, IP has been adopted as a industry standard, and no other technology, except for IP, has such a large potentiality and development space. (Abstracted from *IP Convergence: Building the Future*, by Susan Breidenbach, *Network World*, Aug. 10, 1998).

With the explosive increment of Internet services, the application range thereof has been extended to each field and each industry in the society. In the view point of telecommunication industry, more and more traditional telecommunication services employ IP for transmission, i.e., so-called Everything Over IP. The framework of the current telecommunication network will gradually turn from circuit switching and the networking technology thereof to a new framework based on packet switching, in particular, IP; and services over telecommunication network will turn from telephone service to data service.

TCP/IP Network Protocol

TCP/IP (Transmission Control Protocol/Internet Protocol) is a protocol most widely applied over the world at present, and the prevalence thereof is closely related to the impetuous development of Internet. Originally, TCP/IP is designed for the prototype of Internet, ARPANET, for providing a full set of protocols that are convenient and practical and can be applied on various networks. It is proved by facts that TCP/IP has accomplished its tasks, it makes network interconnection easy, and it enables more and more networks to participate in the network interconnection, thereby becoming a de facto standard of Internet.

Application Layer: application layer is a general term for all applications that users face. On this layer, there exist a lot of protocols from the TCP/IP protocol family to support different applications, and the implementation of many familiar Internet-based applications cannot be separated from these protocols. For example, HTTP protocol used in World Wide Web (WWW) access. FTP protocol used in file transmission, SMTP used in e-mail sending, DNS protocol used in domain name resolution, Telnet protocol used in remote logon and so on all belong to TCP/IP on the application layer, for users, patterned operating interfaces constructed by software are seen, but in fact, the above protocols are operated in the background.

Transmission Layer: the function of this layer is mainly to provide communication between applications, and on this layer, protocols from the TCP/IP protocol family include TCP and UDP.

Network Layer: network layer is a very crucial layer in the TCP/IP protocol family, which mainly defines the format of IP address, thereby data of different application types can be transmitted on the Internet smoothly, and IP protocol is a network layer protocol.

Network Interface Layer: this is the lowest layer of TCP/IP software, which is responsible for receiving an IP packet and sending it via a network, or receiving a physical frame from a network, extracting an IP datagram and delivering it to an IP layer.

How does IP implement network interconnection? Network systems and devices manufactured by various manufacturers, for example, Ethernet and packet switching network, etc., cannot intercommunicate with each other, the main reason is that the formats of the basic units (technically referred to as "frames") of data transmitted by them are different. In fact, IP protocol is a set of protocol software consisted of software programs, and it unitedly converts various different "frames" into the format of "IP packet", such conversion is a most important feature of Internet, i.e., a feature of "openness", which makes all computers able to realize intercommunication on the Internet.

Then, what is "data packet"? And what feature does it have? Data packet is also a form of packet switching, that is, data to be transmitted are segmented into "packets" and then transmitted out. However, it belongs to "connectionless type", that is, each "packet" is transmitted out as an "independent message", so it is called "data packet". Thus, before communication starts, no circuit needs to be connected first, and respective packets will not necessarily be transmitted via one and the same route, so it is called "connectionless type". Such a feature is very important, and in the case of text information transmission, it greatly improves the robustness and security of the network.

Each data packet has two parts, header and message. Header contains necessary contents such as destination address, etc., so that each data packet can correctly reach its destination via different routes. At the destination, the data packets recombine and restore to the data sent originally. This requires that IP has the functions of packet packaging and assembling.

During the practical transmission process, a data packet also needs to change the data packet length according to the packet size specified by the network it passes, the maximum length of an IP data packet may reach 65535 bytes.

Quality of Service (QoS) is a main problem of IP Internet. Through the ages, countless research reports try to solve this problem; however, if we arrange the main milestones of QoS in time order, it will be readily seen that this is a helpless history in which QoS of Internet continuously lowers its requirements and continuously fails. From "Inte Serv" (1990) to "Diff Serv" (1997) and then to "Lightload" (2001), the summation of various partial QoS improving solutions that seem effective is still far from the target of network-wide QoS. QoS seems nearby, but in fact it's too far away to reach.

At the early stage of IP Internet, video application has become a target of network service, for example, MBone. Due to the lack of an effective QoS, no video communication service with a commercial value can be developed in a long term, which weakens the profit-earning capacity of IP Internet. Therefore, it has a great commercial value to solve the quality problem of network transmission. The quality problem of network transmission specifically appears as packet loss and error code. Computer files are not sensitive to errors in transmission; so long as there exists a TCP retransmission mechanism, a computer may consider the network as usable even if a great part of data packets are lost during the transmission process. However, if packet loss rate and error code rate are higher than 1/1,000, the quality of video and audio will be lowered for synchronous video. Empirical data tells us that high-quality video communication even requires that packet loss and error code should be lower than 1/100,000. Test data from the current network environment show that most packet loss occurs inside a router, and error codes generated during optical fiber transmission may almost be neglected.

Why can't "Inte Serv" succeed?

"Inte Serv" is established on the basis of reserved independent stream resources by employing Resource Reservation SetupProtocol (RSVP). In large-scale network environment, if a part of bandwidth resources can be reserved between two video terminals, it may be specially used by the video service; however, although this sounds good, it is impracticable in fact.

Firstly, this solution requires network-wide device reconstruction, which equals to reestablishing the network, and it is almost impossible in practical operation.

Next, even if network-wide reconstruction is implemented, for example, a bandwidth of 2 Mbps is kept for a 2 Mbps video service in each switch, can QoS problem be solved? The answer is No.

The so-called 2 Mbps bandwidth of RSVP is only considered macroscopically, if data in one second is sent in the first half second centralizedly, a problem will arise and periodic burst flow will be formed. Because the core concept of IP Internet is "Best Efforts", at each network node, the switch always tries its best to forward data at the highest speed. After a video stream passes multiple levels of switches, it will be certain that flow distribution becomes non-uniform. When multiple non-uniform and asynchronous streams are combined, greater non-uniformity will be generated in a period of time; that is, periodic congestion of network flow is certain to appear. With the increasing of video user numbers, no upper limit can be given to periodic congestion, and when it exceeds the internal storage capacity of the switch, packet loss will be directly caused.

Why does "Diff Serv" fail?

After "Inte Serv" made its appearance for 7 years, a novel method "Diff Serv" starts to prevail. "Diff Serv" tries to provide a network service being superior to "Best Efforts". Such a method does not require complex network-wide resource reservation, and it is easy to implement. It only needs to put a "priority" label on each data packet and the network switch processes video data with "priority" first. The basic theory thereof is just like that a bank issues a gold card to a VIP client and the queuing time of a high-end client may be effectively reduced. This method also sounds good, but in fact, it is impracticable, too.

There exists one easy fact that cannot be ignored: the flow of a single video service is much larger than that of a traditional non-video service (over a hundredfold).

When there are a few video users, video data packets will be seen almost everywhere on the network. If most of the data packets have a "gold card", VIP is meaningless. Additionally, because IP interconnection networking principle is not compulsory, although QoS has drawn up a set of moral standards for users that maintain their personal integrity during chaotic times, it is unpractical to require all the users to carry the standards into effect.

Therefore, "Diff Serv" is only effective in a few enterprise private networks, and it is difficult to be effectively popularized in large-scale public networks.

Why can't "Light load" succeed?

Since IP Internet was popularized step by step, people have been unremittingly seeking after an effective prescription for network QoS. After more than 10 years' brain squeeze, network technicians work out two QoS solutions, but neither is ideal. Under the macro-environment in which people loose confidence in solving QoS, some anonymous people put forward a method, i.e., "Light load". The basic design consideration thereof is so-called light-load network, and it is considered that so long as a sufficient bandwidth is provided and optical fiber enters users' houses, there should be no need to worry about network congestion.

Is the design consideration of light-load network feasible? The answer is also No.

The current network technicians seem to miss a basic theory: the root of network packet loss phenomenon is flow non-uniformity. Macroscopically, when the sending speed is high in one time period, it is certain to cause jam in another time period; no upper limit can be given to the peak flow of the network so long as the network flow is non-uniform, and any arbitrary large bandwidth may be occupied in a short time.

Actually, a reasonably good video program may be transmitted so long as there exists a bandwidth of 2 Mbps; if a bandwidth of 8 Mbps is provided, a video content of HDTV quality may be transmitted. However, if we randomly browse a text or a picture on an ordinary web site, the instantaneous flow will be tens of folds of that of HDTV, because most of the current web site servers use a Gigabit network interface. If the flows of a lot of similar web sites just collide, the burst flow generated in a certain short time will exceed the flow required by all network-wide users that use HDTV, and a network with any bandwidth can be occupied. As shown by statistical analysis, such a collision is frequent.

IP Internet tries to absorb the instantaneous flow by employing a memory, which causes the increase of transmission delay. The storage capacity is limited, but the burst flow has no upper limit; therefore, by employing the memory method, it can only improve the packet loss of the current device, and the burst flow absorbed at the current node will put much pressure on the next node. Video stream flow is ceaseless, and the storage mode of the switch intensifies the accumulation of the burst flow to a weak node, thus network packet loss is inevitable.

By employing light load plus "Diff Serv" technology, the current network constructors may deal with narrowband VoIP voice services. This is because voice does not occupy the main part of total flow on the network, once jam occurs, voice will take priority by sacrificing computer files. However, for high-bandwidth video communication, only temporary improvement can be obtained by partial expansion. If expansion is also carried out at other nodes, the non-uniformity of network flow will increase therewith, so that the effect of the originally expanded part will be lowered. If expansion is carried uniformly network wide, the transmission quality will return to that before expansion. In other words, overall expansion is ineffective.

At preset, device manufacturers recommend ultra-wideband access networks of tens or even hundreds of Megabit to each household. However, even if optical fiber enters each household, it is difficult to exhibit a video communication service with good QoS to the consumers. In spite of what complex QoS measures are taken, the transmission quality of IP Internet can only be "improved", and no quality of network transmission can be "guaranteed".

SUMMARY

The technical problem to be solved by the invention is to provide a communication method for a novel network, which may guarantee the stability and smoothness of the transmission path, avoid multimedia service delays, meet state information security requirements and save hardware resources, thereby guaranteeing the quality of network transmission.

An embodiment of the invention further provides a communication system for a novel network, which may guarantee the implementation and application of the above method in practice.

To solve the above technical problem, an embodiment of the invention discloses a communication method for a novel network, wherein the novel network is a network with a centralized control function, which includes a main control server and subordinate network devices, the subordinate network devices include terminals, and the method includes:

configuring, by the main control server, a downlink communication link of a current service; and transmitting a data packet of the current service, sent from a source terminal, to a target terminal via the downlink communication link.

The novel network referred to in the invention has a network structure that may be controlled centralizedly. The network may be the types of tree network, star network and ring network, etc.; but on this basis, a centralized control node is needed to control the whole network.

The novel network is divided into two parts: an access network and a metropolitan area network. Devices on the access network part may be mainly divided into 3 categories: a node server, an access switch and a terminal (including various set-top boxes, code plates and storages, etc.). Wherein, a node server is a node in the access network that has a centralized control function, and it may control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

It should be noted that, in embodiments of the invention, a configuration mode of a communication link, a configuration and usage mode of an uplink communication link and a type of a data packet are not limited; for example, the uplink communication link may be configured in such a mode that a main control server notifies an uplink access switch to open a fixed port, or it may be configured in a broadcast mode. Those skilled in the art may employ any one mode according to a practical situation.

As a preferred embodiment of the invention, the configuring the downlink communication link of the current service includes: notifying a switching device related to the downlink communication link of the current service to configure a table;

the transmitting via the downlink communication link includes: querying a configured table, and transmitting, by the switching device, a received data packet via a corresponding port.

That is, one of the core concepts of the embodiments of the invention lies in that, the main control server notifies the switching device to configure a table for the downlink communication link of the current service, and then the data packet is transmitted based on the table configured.

In a specific implementation, the service includes a unicast communication service and a multicast communication service. That is, the above configuration of a table may be employed for both multicast communication and unicast communication, and communication on the novel network may be implemented by the core concept of table.

As described above, the novel network of the invention includes an access network part, and in the access network, the main control server is a node server, and the subordinate network devices include an access switch and a terminal.

For a unicast communication service on the access network, the configuring a downlink communication link of the current service by the main control server may comprise the following steps:

acquiring, by the main control server, information on the downlink communication link of the current service according to a service request protocol packet initiated by the source terminal, wherein the information on the downlink communication link includes downlink communication port information of the main control server and an access switch that participate in the current service;

setting, by the main control server, a downlink port to which the data packet of the current service is to be oriented in its internal data packet address table according to the downlink communication port information of the main control server, and sending a port configuration command to the corresponding access switch according to the downlink communication port information of the access switch; and setting, by the access switch, a downlink port to which the data packet of the current service is to be oriented in its internal data packet address table in response to the port configuration command.

That is, the node server performs a main control, configures a table according to the downlink communication link acquired, and notifies the access switch to configure a table.

Preferably, the information on the communication link may not include communication port information of the node server that participates in the current service. For example, if the source terminal and the target terminal are connected to one and the same access switch, the node server may only configure a data packet orientation port of the access switch, and when service communication is carried out between the source terminal and the target terminal, the access switch transmits a data packet directly via a corresponding downlink port of the access switch according to settings of an internal data packet address table; that is, the source terminal and the target terminal may directly carry out service communication under the access switch to which they are connected jointly, rather than uploading the data packet to the node server and then issuing the data packet to the corresponding terminal by the node server, thereby bandwidth and route resources may be saved effectively.

In an embodiment of the invention, the subordinate network devices each has a corresponding access network address, as one specific application example, the acquiring the information on the downlink communication link of the current service by the main control server may include the following substeps:

obtaining, by the main control server, a service request protocol packet initiated by the source terminal for establishing a unicast communication service with the target terminal, wherein the service request protocol packet includes service type information, service content information and an access network address of the source terminal, and the service content information includes a service number;

extracting, by the main control server, an the access network address of the target terminal from a preset content-address mapping table according to the service number, and acquiring, by the main control server, the information on the downlink communication link of the current service according to the service type information, the access network address of the source terminal, and the access network address of the target terminal.

In practice, a downlink port to which a unicast data packet of the current service is to be oriented, that is set by the main control server in its internal unicast data packet address table, includes:

a downlink port to which the unicast data packet with a destination address being an address of the source terminal is to be oriented; and/or a downlink port to which the unicast data packet with a destination address being an address of the target terminal is to be oriented.

For a unicast communication service, information on a communication link may be information on a unidirectional communication link, for example, a unicast service request initiated by the source terminal to the target terminal, or a unicast service request initiated by the target terminal to the source terminal; or, information on a communication link may also be information on a bidirectional communication link, for example, a unicast service request initiated by the source terminal and the target terminal to each other.

When the information on the communication link is information on a unidirectional communication link, communication port information of an access switch includes uplink port information of an uplink access switch and downlink port information of a downlink access switch;

a port to which the unicast data packet of the current service is to be oriented, that is set by an access switch in its internal unicast data packet address table according to the port configuration command, includes:

an uplink port of an uplink access switch and a downlink port of a downlink access switch to which the unicast data packet with a destination address being the address of the target terminal is to be oriented.

When the information on the communication link is information on a bidirectional downlink communication link, communication port information of an access switch includes uplink port information and downlink port information of an uplink access switch, and uplink port information and downlink port information of a downlink access switch;

a port to which the unicast data packet of the current service is to be oriented, that is set by an access switch in its internal unicast data packet address table according to the port configuration command, includes:

an uplink port and a downlink port of an uplink access switch to which the unicast data packet with a destination address being the address of the target terminal is to be oriented; and an uplink port and a downlink port of an downlink access switch to which the unicast data packet with a destination address being the address of the source terminal is to be oriented.

As one preferred embodiment of the invention, the data packet of the current service includes an access network address of the target terminal, and the transmitting the data packet of the current service to the target terminal via the downlink communication link includes the following substeps:

looking up, by the main control server, the downlink port to which the data packet of the current service is to be oriented in its internal data packet address table according to the access network address of the target terminal, and transmitting the data packet to the corresponding access switch via the downlink port; and looking up, by the access switch, the downlink port to which the data packet of the current service is to be oriented in its internal data packet address table according to the access network address of the target terminal, and transmitting the data packet to the target terminal via the downlink port.

For a unicast communication service, the data packet may not only be transmitted from the source terminal to the target terminal, but also be transmitted from the target terminal to the source terminal; that is, as another preferred embodiment of the invention, the method further comprises the following step:

transmitting a data packet of the current service, sent from the target terminal, to the source terminal via the downlink communication link.

In such a case, the data packet of the current service includes an access network address of the source terminal, and the transmitting the data packet of the current service to the source terminal via the downlink communication link may include the following substeps:

looking up, by the main control server, the downlink port to which the data packet of the current service is to be oriented in its internal data packet address table according to the access network address of the source terminal, and transmitting the data packet to the corresponding access switch via the downlink port; and looking up, by the access switch, the downlink port to which the data packet of the current service is to be oriented in its internal data packet address table according to the access network address of the source terminal, and transmitting the data packet to the source terminal via the downlink port.

For a multicast communication service on the access network, the acquiring the information on the downlink communication link of the current service by the main control server may include the following substeps:

obtaining, by the main control server, a service request protocol packet initiated by the target terminal for applying for a multicast communication service, wherein the service request protocol packet comprises service type information, service content information and an access network address of the target terminal, and the service content information comprises a service number;

extracting, by the main control server, an access network address of the source terminal from a preset content-address mapping table according to the service number, and acquiring, by the main control server, a multicast address corresponding to the source terminal and allocating the multicast address to the target terminal; and acquiring communication link information of the current multicast service according to the service type information, the access network address of the source terminal, and the access network address of the target terminal.

As another example of multicast communication service, the acquiring the information on the downlink communication link of the current service by the main control server may further include the following substeps:

obtaining, by the main control server, a service request protocol packet submitted by the source terminal for initiating a multicast communication service, and allocating a multicast address to the source terminal according to the service request protocol packet; wherein the service request protocol packet includes service type information, service content information and the access network address of the source terminal, and the service content information includes a service number; and acquiring uplink communication link information of the current multicast service according to the service type information, an access network address of the main control server, and the access network address of the source terminal.

As another example of multicast communication service, the acquiring the information on the downlink communication link of the current service by the main control server may further include the following substep:

acquiring downlink communication link information of the current multicast service according to the service type information, the access network address of the main control server, and the access network address of the source terminal.

Because the node server functions as a main control node on the access network, and multicast service communication only relates to a downlink port of the node server, a port to which a multicast data packet of the current service is oriented, that is set by the main control server in its internal multicast data packet address table, includes:

a downlink port to which the multicast data packet with a destination address being the multicast address is to be oriented.

In one example of a typical multicast service, for example, a target terminal requests to watch living broadcast, communication port information of an access switch includes uplink port information of an uplink access switch and downlink port information of a downlink access switch;

a port to which the multicast data packet of the current service is to be oriented, that is set by an access switch in its internal multicast data packet address table according to the port configuration command, includes:

an uplink port of an uplink access switch and a downlink port of an downlink access switch to which the multicast data packet with a destination address being the multicast address is to be oriented.

As another example of a multicast server, for example, a source terminal is watching a living broadcast when it initiates the living broadcast, the communication port information of the access switch further comprises downlink port information of the uplink access switch;

the port to which the multicast data packet of the current service is to be oriented, that is set by the access switch in its internal multicast data packet address table according to the port configuration command, includes:

a downlink port of the uplink access switch to which the multicast data packet with a destination address being the multicast address is to be oriented.

For a multicast communication service, the data packet of the current service generally includes a multicast address, and in one preferred embodiment of the invention, the transmitting the data packet of the current service via the downlink communication link may include the following substeps:

looking up, by the main control server, the downlink port to which the data packet of the current service is to be oriented in its internal data packet address table according to the multicast address, and transmitting the data packet to the corresponding downlink access switch via the downlink port; and looking up, by the access switch, the downlink port to which the data packet of the current service is to be oriented in its internal data packet address table according to the multicast address, and transmitting the data packet to the target terminal via the downlink port.

For different multicast communication services, the transmitting the data packet of the current service via the downlink communication link may further include the following substeps:

orienting the data packet to an uplink access switch according to the multicast address in the data packet of the current service sent from the source terminal; and looking up, by the access switch, an uplink port to which the data packet of the current service is to be oriented in its internal data packet address table according to the multicast address, and transmitting the data packet to the main control server via the uplink port.

Or, the transmitting the data packet of the current service via the downlink communication link may further include the following substeps:

looking up, by the main control server, the downlink port to which the data packet of the current service is to be oriented in its internal data packet address table according to the multicast address, and transmitting the data packet to the corresponding uplink access switch via the downlink port; and looking up, by the access switch, the downlink port to which the data packet of the current service is to be oriented in its internal data packet address table according to the multicast address, and transmitting the data packet to the source terminal via the downlink port.

In a specific implementation, if the main control server obtains information on multiple communication links of the current service, it selects information on one of the multiple communication links as the information on the communication link of the current service according to a preset rule. As an example, the preset rule may be as follows: the node server acquires flow information of each communication link and flow information of the current service, and information on a communication link with the minimum flow used is determined as the information on the communication link of the current service; or, the preset rule may be as follows: the node server acquires bandwidth information of each communication link and bandwidth information of the current service, and information on a communication link with the maximum bandwidth is determined as the information on the communication link of the current service.

However, the above setting of the preset rule is only an example, and it is not limited in the invention.

As one preferred embodiment, the port configuration command may be recorded in a protocol packet, and the main control server orients the protocol packet to the corresponding access switch by connecting to a downlink port of the corresponding access switch according to settings of a downlink protocol packet address table that is preset internally;

wherein, a downlink port, to which a protocol packet with a destination address being an address of a subordinate network device is to be oriented, is set in the downlink protocol packet address table.

For better resource utilization, after the current service is completed, the main control server of the invention may further release the port that is set, to which the data packet of the current service is oriented, in its internal data packet address table, and send a port release command to the access switch that participates in the current service;

the access switch releases the port that is set, to which the data packet of the current service is oriented, in its internal data packet address table according to the port release command.

One main reason that the node server of the invention can perform a centralized control is that, it has its own access network address and maintains access network addresses of the subordinate network devices. In such a case, an access switch as a subordinate network device may access the novel network by the following steps:

the access switch being powered on and setting in its internal downlink protocol packet address table that all downlink protocol packets are to be oriented to a CPU module;

receiving, by the access switch, a downlink protocol packet sent from the main control server, and orienting the downlink protocol packet to the CPU module of the access switch according to the settings of the downlink protocol packet address table; and generating, by the CPU module, an uplink protocol packet and sending the uplink protocol packet to the main control server, wherein the downlink protocol packet contains an access network address that is to be allocated;

sending, by the main control server, a network access command to the access switch, wherein the network access command contains an access network address of the access switch, and the access network address is the access network address to be allocated in the downlink protocol packet received by the access switch; and updating, by the access switch, its internal downlink protocol packet address table, for orienting only a protocol packet with a destination address being its own access network address to the CPU module.

In a specific implementation, other subordinate access network devices are often connected under the access switch. In such a case, the node server will send a port allocation packet to an access switch that has accessed the network. That is, as one preferred embodiment of the invention, when an access switch that has accessed the network receives a port allocation packet sent by the node server, the process in which the access switch accesses the network further includes the following steps:

orienting, by the access switch that has accessed the network, the port allocation packet with a destination address being its own access network address to the CPU module; and setting a downlink port to which each port downlink protocol packet is to be oriented in its internal downlink packet address table according to port allocation information in the port allocation packet.

Moreover, when the access switch has accessed the network and receives a port downlink protocol packet sent from the node server, the process in which the access switch accesses the network further includes the following steps:

orienting, by the access switch, the port downlink protocol packet to the corresponding downlink port according to the settings of its internal downlink protocol packet address table, wherein the port downlink protocol packet contains an access network address that is to be allocated; and sending, by the main control server, a network access command to a certain subordinate network device that is connect to the downlink port of the access switch, when the main control server receives a port uplink protocol packet sent from said certain subordinate network device, wherein the network access command contains the access network address of the subordinate network device, and the access network address is the access network address to be allocated in the port downlink protocol packet received by the subordinate network device;

and wherein the subordinate network device includes an access switch or a terminal.

To realize the convergence of the novel network of the invention and the existing Ethernet, the access network device further includes an Ethernet protocol conversion gateway and a local area Ethernet that are connected between the access switch and the source terminal as well as the target terminal, and an embodiment of the invention may further include the following steps:

the Ethernet protocol conversion gateway accesses the novel network, and obtains the MAC address of the Ethernet protocol conversion gateway and the MAC address of a terminal bond to the Ethernet protocol conversion gateway from the node server;

the Ethernet protocol conversion gateway receives a data packet or a protocol packet sent from the novel network, adds the MAC address of the Ethernet protocol conversion gateway and the MAC address of the target terminal into the data packet or the protocol packet, and then sends the packet to the local area Ethernet; and the Ethernet protocol conversion gateway receives a data packet or a protocol packet sent from the local area Ethernet, removes the MAC address of the Ethernet protocol conversion gateway and the MAC address of the source terminal from the data packet or the protocol packet, and then sends the packet to the novel network;

wherein, the target terminal and the source terminal conform to a novel network protocol.

It should be noted that, in order to realize the convergence of the above novel network and the existing Ethernet and make full use of the functions of the existing Ethernet protocol conversion gateway at the same time, in the invention, the standard Ethernet gateway is reconstructed as a special-type access switch, which plays the role of connection and conversion between the novel network and the Ethernet. The reconstructed Ethernet gateway is referred to as Ethernet protocol conversion gateway. In the novel network, the Ethernet protocol conversion gateway lies on the access network part, and it may be connected with the access switch, or it may be directly connected with the node server. In the Ethernet, the Ethernet protocol conversion gateway is connected with a standard Ethernet switch, and the Ethernet switch is connected with a terminal.

That is, in an embodiment of the invention, it further includes a step in which the Ethernet protocol conversion gateway accesses a novel network, specifically:

issuing, by the main control server, a query packet;

receiving, by the Ethernet protocol conversion gateway, the query packet and returning a reply packet that contains a serial number of the Ethernet protocol conversion gateway, after the Ethernet protocol conversion gateway is powered on and initialized;

looking up, by the main control server, Ethernet protocol conversion gateway information corresponding to the serial number in a registration information table, wherein the Ethernet protocol conversion gateway information includes an MAC address of the Ethernet protocol conversion gateway and an MAC address of a terminal bond to the Ethernet protocol conversion gateway;

sending, by the main control server, a network access command to the Ethernet protocol conversion gateway, wherein the network access command contains an address of the Ethernet protocol conversion gateway in the novel network and the MAC address of the Ethernet protocol conversion gateway; and returning, by the Ethernet protocol conversion gateway, a reply after receiving the network access command, and accessing the novel network.

In practice, the binding relation between the MAC address of the terminal and the Ethernet protocol conversion gateway is preset in a node server at the time the terminal and the Ethernet protocol conversion gateway are sold.

After the Ethernet protocol conversion gateway accesses the novel network and obtains the MAC address of the Ethernet protocol conversion gateway and the MAC address of the terminal bond to the Ethernet protocol conversion gateway, the terminal bond to the Ethernet protocol conversion gateway may also access the novel network by the following steps:

issuing, by the main control server, a query packet:

receiving, by the Ethernet protocol conversion gateway, the query packet, orienting the query packet to a corresponding port according a the protocol packet address table, adding the MAC address of the Ethernet protocol conversion gateway and the MAC address of the target terminal into the query packet, and forwarding the query packet;

receiving, by the terminal, the query packet, and returning a reply packet that contains a serial number of the terminal, after the terminal is powered on and initialized;

removing, by the Ethernet protocol conversion gateway, the MAC address of the Ethernet protocol conversion gateway and the MAC address of the terminal in the reply packet, and then forwarding the reply packet to the main control server;

finding, by the main control server, terminal information corresponding to the serial number of the terminal in the registration information table, and sending a network access command, wherein the network access command contains an address of the terminal in the novel network:

receiving, by the Ethernet protocol conversion gateway, the network access command, and forwarding the network access command after adding the MAC address of the Ethernet protocol conversion gateway and the MAC address of the target terminal; and returning, by the terminal, a reply after receiving the network access command; and forwarding, by the Ethernet protocol conversion gateway, the reply to the main control server after removing the MAC address of the Ethernet protocol conversion gateway and the MAC address of the terminal from the reply; and the terminal accessing the novel network.

It can be known from the above that, after the Ethernet protocol conversion gateway accesses the novel network, it will obtain the MAC address of the Ethernet protocol conversion gateway and the MAC address of the terminal registered under the Ethernet protocol conversion gateway from the node server that has a centralized control function. In such a case, an embodiment of the invention may further include the following steps:

receiving, by the Ethernet protocol conversion gateway, a data packet or a protocol packet sent from the novel network, adding the MAC address of the Ethernet protocol conversion gateway and the MAC address of the target terminal into the data packet or the protocol packet, and then sending the packet to the Ethernet; and receiving, by the Ethernet protocol conversion gateway, a data packet or a protocol packet sent from the Ethernet, removing the MAC address of the Ethernet protocol conversion gateway and the MAC address of the source terminal from the data packet or the protocol packet, and then sending the packet to the novel network;

wherein, the target terminal and the source terminal conform to a novel network protocol.

That is, after the Ethernet protocol conversion gateway accesses the novel network, it may add/remove the MAC to/from the data packet or the protocol packet.

More specifically, in the embodiments of the invention, preferably, a data packet to which the MAC address of the Ethernet protocol conversion gateway and the MAC address of the target terminal are added is transmitted in the Ethernet using an Ethernet protocol; and a data packet from which the MAC address of the Ethernet protocol conversion gateway MAC address and the MAC address of the source terminal are removed is transmitted in the novel network using the novel network protocol.

Preferably, a packet header of a data packet sent either from the novel network or the Ethernet contains addresses of two transmission ends in the novel network, and the addresses are the source address and the destination address of the data packet.

In this embodiment, it may further include the following steps:

obtaining a mapping between the MAC address of the terminal bond to the Ethernet protocol conversion gateway and the address of the terminal in the novel network; and receiving, by the Ethernet protocol conversion gateway, a data packet sent from the novel network, and adding an MAC address of a corresponding target terminal into the data packet according to the mapping between a destination address of the data packet and the MAC address.

By the above measures, the novel network and the Ethernet may be well compatible with each other via an Ethernet protocol conversion gateway. Additionally, the Ethernet protocol conversion gateway may also have the functions of the above access switch, for example, accurate flow control, specifically:

after the Ethernet protocol conversion gateway receives the data packet sent from the Ethernet, and before the Ethernet protocol conversion gateway removes the MAC address of the Ethernet protocol conversion gateway and the MAC address of the source terminal from the data packet, the method further includes:

checking the data packet received, and allocating a corresponding flow identifier when the data packet meets a check requirement, wherein the checking may be: checking whether the MAC address of the Ethernet protocol conversion gateway, the MAC address of the source terminal, a destination address, a source address, a packet type and a packet length of the data packet meet the requirement.

Further, after the Ethernet protocol conversion gateway removes the MAC address of the Ethernet protocol conversion gateway and the MAC address of the source terminal from the data packet, and before the packet is sent, it may further includes: putting the data packet into a corresponding port receive buffer according to the flow identifier; reading the data packet from the port receive buffer, and putting the data packet into a packet buffer queue of a corresponding flow according to the flow identifier; polling the packet buffer queue, and after a sending token is generated, sequentially reading a data packet from the packet buffer queue of the corresponding flow according to the flow identifier in the sending token, and putting the data packet into a port sending buffer; reading the data packet from the port sending buffer and sending the data packet.

Additionally, the Ethernet protocol conversion gateway may also determine whether the following two conditions are met: 1) the port sending buffer is not full; 2) the count of a packet counter in the packet buffer queue of the corresponding flow is larger than 0; if the two conditions are met, it sequentially reads the data packet from the packet buffer queue of the corresponding flow according to the flow identifier in the sending token, and puts the data packet into the port sending buffer.

During the above flow control process, the sending token is generated in the following mode: a node server with a centralized control function in the novel network generates flow control information according to a service request protocol packet initiated by a terminal, and sends the flow control information to an Ethernet protocol conversion gateway for flow control on the uplink, wherein the flow control information includes a sending time interval and a sending data size; and the Ethernet protocol conversion gateway generates the sending token according to the flow control information, wherein the token contains a flow identifier.

As described above, the novel network includes a metropolitan area network part, and in the metropolitan area network, the main control server is a metropolitan area server, and the subordinate network devices include a node switch and a node server, wherein the node switch is connected between the metropolitan area server and the node server; in an embodiment of the invention, the method may further include the following steps:

after a subordinate network device accesses the metropolitan area network, allocating, by the metropolitan area server, a protocol label and a metropolitan area network address to the device that accesses the network:

wherein, the protocol label is adapted to describe a connection between the subordinate network device and the metropolitan area server; when there exist multiple connections between one and the same subordinate network device and the metropolitan area server, the metropolitan area server allocates a different protocol label to each connection; and allocating, by the metropolitan area server, a data label of a corresponding service to each service request across the metropolitan area network, wherein the data label is adapted to describe a connection between node servers related to the service.

Wherein, the label may be multiplexed, which includes the following two multiplexing situations:

Situation 1: the protocol label from the subordinate network device to the metropolitan area server and the protocol label from the metropolitan area server to the subordinate network device are different, or the same; and among the node servers related to the service, the data label from one node server to another node server and the data label from said another node server to said one node server are different, or the same.

Situation 2: The label is divided into an IN label and an OUT label, wherein an IN label refers to the label by which a packet enters a metropolitan area server or a node switch, an OUT label refers to the label by which the packet leaves the metropolitan area server or the node switch; the IN label and OUT label of one and the same packet may be different, or the same.

Preferably, in the invention, a data label may be adapted to describe a connection from one node server to another node server, even if there exists a node switch on the access path of the two node servers; However, in such a case, the invention may also use a plurality of data labels to describe the connection between said two node servers, wherein each data label describes a segment of the access path, for example, the connection from node server 1 to node switch 1 is described by data label 1, the connection from node switch 1 to node switch 2 is described by data label 2, and the connection from node switch 2 to node server 2 is described by data label 3, and so on.

Firstly, the allocation and usage of a protocol label will be illustrated as follows:

after a subordinate network device accesses the metropolitan area network, the allocating a protocol label and a metropolitan area network address by the metropolitan area server includes: sending, by the metropolitan area server, metropolitan area query label packets to all of its downlink ports, wherein each metropolitan area query label packet contains a standby protocol label allocated by the metropolitan area server; receiving, by a certain subordinate network device, a metropolitan area query label packet sent by the metropolitan area server after said subordinate network device is powered on, and then returning a metropolitan area reply label packet to the metropolitan area server, wherein the metropolitan area reply label packet contains a serial number of the subordinate network device and a port number of a port that receives the metropolitan area query label packet; verifying, by the metropolitan area server according to the serial number in the metropolitan area reply label packet after receiving the packet, whether the subordinate network device is registered, and if it is registered, sending a network access command to the port of the subordinate network device that receives the metropolitan area query label packet, wherein the network access command contains a metropolitan area network address allocated to the subordinate network device by the metropolitan area server, and the standby protocol label; returning, by the corresponding port of the subordinate network device, a network access command reply after receiving the network access command, and the subordinate network device accessing the metropolitan area network; wherein, the subordinate network device is a node switch or a node server.

During the above process in which the subordinate network device accesses the network, the label is multiplexed in the following mode: the protocol label in the metropolitan area reply label packet is the same as the protocol label in the metropolitan area query label packet, and the protocol label in the network access command reply is the same as the protocol label in the network access command.

Specially, when there exist multiple connections between one and the same subordinate network device and the metropolitan area server, a plurality of ports of said one and the same subordinate network device will receive a plurality of metropolitan area query label packets, wherein the standby protocol label in each metropolitan area query label packet is different; the metropolitan area server sends a plurality of network access commands to the plurality of ports of one and the same subordinate network device via a plurality of different protocol labels, and the metropolitan area network address allocated to the subordinate network device in each network access command is the same.

After the subordinate network device accesses the network, it may also configure the protocol packet label table, which specifically includes: setting a protocol packet label table in the subordinate network device, and setting in its internal protocol packet label table that all metropolitan area protocol packets are oriented to a CPU module when the subordinate network device is powered on; when the subordinate network device is a node switch, after accessing the metropolitan area network, modifying, by the node switch, its own protocol packet label table according to an instruction of the metropolitan area server, and orienting metropolitan area protocol packets corresponding to respective standby protocol labels newly allocated by the metropolitan area server to corresponding downlink ports of the node switch respectively; wherein, the standby protocol labels newly allocated are adapted to describe connections between the metropolitan area server and a subordinate connecting device of the node switch, and the metropolitan area protocol packets include the metropolitan area query label packets sent by the metropolitan area server.

After the subordinate network device accesses the network, it may also configure the reply packet label table, which specifically includes: setting a reply packet label table in the subordinate network device, and setting in its internal reply packet label table that orientation of all metropolitan area reply label packets is shut down when the subordinate network device is powered on; modifying, by the subordinate network device, its own reply packet label table after receiving a metropolitan area query label packet sent by the metropolitan area server, and orienting a metropolitan area reply label packet corresponding to the protocol label to an uplink port that receives the metropolitan area query label packet; when the subordinate network device is a node switch, after accessing the metropolitan area network, modifying, by the node switch, its own reply packet label table according to an instruction of the metropolitan area server, and orienting metropolitan area reply label packets corresponding to respective standby protocol labels newly allocated by the metropolitan area server to corresponding uplink ports of the node switch respectively; wherein, the standby protocol labels newly allocated are adapted to describe connections between a subordinate connecting device of the node switch and the metropolitan area server.

In one preferred embodiment of the invention, the method further includes: setting a protocol packet label table in the metropolitan area server, and setting in its internal protocol packet label table that orientation of all metropolitan area protocol packets is shut down when the metropolitan area server is powered on;

allocating, by the metropolitan area server, standby protocol labels corresponding to the number of its own downlink ports, modifying its own protocol packet label table, and orienting metropolitan area protocol packets corresponding to respective allocated standby protocol labels to corresponding downlink ports of the metropolitan area server respectively;

wherein, the standby protocol labels are adapted to describe connections between the metropolitan area server and a subordinate network device, and the metropolitan area protocol packets comprise the metropolitan area query label packets sent by the metropolitan area server, the metropolitan area server sends the metropolitan area query label packets to its downlink ports according to its own protocol packet label table.

Correspondingly, after the subordinate network device accesses the network, the metropolitan area server may also configure its own protocol packet label table which specifically includes:

1) setting a protocol packet label table in the metropolitan area server, and setting in its internal protocol packet label table that orientation of all metropolitan area protocol packets is shut down when the metropolitan area server is powered on; allocating, by the metropolitan area server, standby protocol labels corresponding to the number of its own downlink ports, modifying its own protocol packet label table, and orienting metropolitan area protocol packets corresponding to respective allocated standby protocol labels to corresponding downlink ports of the metropolitan area server respectively; wherein, the standby protocol labels are adapted to describe connections between the metropolitan area server and a subordinate network device, and the metropolitan area protocol packets comprise the metropolitan area query label packets sent by the metropolitan area server; the metropolitan area server sends the metropolitan area query label packets to its downlink ports according to its own protocol packet label table; and 2) newly allocating, by the metropolitan area server, standby protocol labels to a subordinate connecting device of a subordinate network device after the subordinate network device accesses the network, modifying its own protocol packet label table, and orienting metropolitan area protocol packets corresponding to respective newly allocated standby protocol labels to corresponding downlink ports of the metropolitan area server respectively; wherein, the newly allocated standby protocol labels are adapted to describe connections between the metropolitan area server and the subordinate connecting device of the subordinate network device, and the metropolitan area protocol packets include the metropolitan area query label packets sent by the metropolitan area server, the metropolitan area server sends the metropolitan area query label packets to its downlink ports according to its own protocol packet label table.

Correspondingly, after the subordinate network device accesses the network, the metropolitan area server may also configure its own reply packet label table, which specifically includes: setting a reply packet label table in the metropolitan area server, and setting in its internal reply packet label table that all metropolitan area reply label packets are to be oriented to a CPU module when the metropolitan area server is powered on.

Wherein, when the subordinate network device that accesses the network is a node switch, a certain subordinate connecting device of the node switch accesses the metropolitan area network, wherein the subordinate connecting device includes a node switch and a node server, and it specifically includes the following steps: sending, by the metropolitan area server, metropolitan area query label packets to respective subordinate connecting devices via newly allocated standby protocol labels, and orienting the metropolitan area query label packets to corresponding downlink ports of the metropolitan area server respectively according to a protocol packet label table: receiving, by the subordinate connecting device, a metropolitan area query label packet after it is powered on, and then returning a metropolitan area reply label packet to the metropolitan area server, wherein the metropolitan area reply label packet contains a serial number of the subordinate connecting device and a port number of a port that receives the metropolitan area query label packet: verifying, by the metropolitan area server according to the serial number in the metropolitan area reply label packet after receiving the packet, whether the subordinate connecting device is registered, and if it is registered, sending a network access command to the subordinate connecting device, wherein the network access command contains a metropolitan area network address allocated to the subordinate connecting device by the metropolitan area server and the protocol label to be allocated; and returning, by the subordinate connecting device, a network access command reply after receiving the network access command, and the subordinate connecting device accessing the metropolitan area network.

When the subordinate network device configures its own protocol packet label table and reply packet label table, and after the subordinate network device between the metropolitan area server and subordinate connecting device receives the metropolitan area query label packet and the network access command, it orients the metropolitan area query label packet and the network access command to a corresponding downlink port for forwarding, according to its own protocol packet label table; after the subordinate network device between the metropolitan area server and subordinate connecting device receives the metropolitan area reply label packet and the network access command reply, it orients the metropolitan area reply label packet and the network access command reply to a corresponding uplink port for forwarding, according to its own reply packet label table.

Preferably, a label information table is set in the metropolitan area server, wherein label occupation information, label description information and label route information are recorded in respective items of the label information table, and the label route information includes a metropolitan area network address and a port number of a port of a previous-hop switch of the label.

The usage of the label information table includes:

1) when the metropolitan area server allocates a standby label to a subordinate network device, it modifies the item in the label information table corresponding to the label: the label occupation information is modified from not-used to standby, the metropolitan area network address and port of the previous-hop switch in the label route information is set as the address and the corresponding port of the metropolitan area server, and the label description information is not modified; after the subordinate network device accesses the network, it modifies the item in the label information table corresponding to the label: the label occupation information is modified as used, and the label description information and the label route information are not modified; and 2) when the metropolitan area server allocates a standby label to the subordinate connecting device of the subordinate network device, it modifies the item in the label information table corresponding to the label: the label occupation information is modified from not-used to standby, the metropolitan area network address and port of the previous-hop switch in the label route information is set as the address and the corresponding port of the subordinate network device, and the label description information is not modified; after the subordinate connecting device accesses the network, it modifies the item in the label information table corresponding to the label: the label occupation information is modified as used, and the label description information and the label route information are not modified.

Preferably, an address information table is set in the metropolitan area server, wherein metropolitan area network address occupation information, device description information and device resource information are recorded in respective items of the address information table, and the device resource information includes a metropolitan area network address of a subordinate network device connected to each network port of the device and an uplink and downlink flow count on each network port of the device.

The usage of address information table comprises:

1) after the metropolitan area server is powered on, it allocates a metropolitan area network address to itself, and modifies the item corresponding to the address in the address information table: the address occupation information is modified from not used to used, the device description information is modified as the metropolitan area server, and the device resource information is modified as the resource description of the metropolitan area server;

2) when the metropolitan area server allocates a metropolitan area network address to a subordinate network device and sends a network access command containing the metropolitan area network address, it modifies the item corresponding to the address in the address information table: the address occupation information is modified from not used to standby, and the device description information and the device resource information is not modified: after the metropolitan area server receives a network access command reply sent by the subordinate network device, it modifies the item corresponding to the address in the address information table: the address occupation information is modified as used, the device description information is modified as the subordinate network device, and the device resource information is modified as a certain downlink port of a metropolitan area server connected with a certain uplink port of the subordinate network device: at the same time, the item in the address information table corresponding to the metropolitan area server address is modified: the device resource information is modified as a certain uplink port of a subordinate network device connected with a certain downlink port of the metropolitan area server, and the address occupation information and the device description information are not modified; wherein, said certain uplink port of the subordinate network device is known according to a metropolitan area reply label packet returned by the subordinate network device, and said certain downlink port of a metropolitan area server is known according to the protocol packet label table; and 3) when the metropolitan area server allocates a metropolitan area network address to a subordinate connecting device of the subordinate network device and sends a network access command containing the metropolitan area network address, it modifies the item corresponding to the address in the address information table: the address occupation information is modified from not used to standby, and the device description information and the device resource information is not modified; after the metropolitan area server receives a network access command reply sent by the subordinate connecting device, it modifies the item corresponding to the address in the address information table: the address occupation information is modified as used, the device description information is modified as the subordinate connecting device, and the device resource information is modified as a certain downlink port of the subordinate network device connected with a certain uplink port of the subordinate connecting device; at the same time, the item in the address information table corresponding to the subordinate network device address is modified: the device resource information is modified as a certain uplink port of the subordinate connecting device connected with a certain downlink port of the subordinate network device, and the address occupation information and the device description information are not modified; wherein, said certain uplink port of the subordinate connecting device is known according to a metropolitan area reply label packet returned by the subordinate connecting device, and said certain downlink port of the subordinate network device is known according to the protocol packet label table.

Preferably, a device information table is set in the metropolitan area server, and a device identification, a device state and a device address are recorded in respective items of the device information table.

The usage of the device information table includes: when the metropolitan area server allocates a metropolitan area network address to the subordinate network device or a subordinate connecting device of the subordinate network device and sends a network access command containing the metropolitan area network address, it modifies the item in the device information table corresponding to the device: the device state is modified as to access the network, the device address is modified as the metropolitan area network address allocated, and the device identification is not modified; after the metropolitan area server receives a network access command reply sent by the subordinate network device or a subordinate connecting device of the subordinate network device, it modifies the item in the device information table corresponding to the device: the device state is modified as have accessed the network, and the device identification and the device address are not modified.

Next, the allocation and usage of a data label will be illustrated as follows:

the allocating a data label of the corresponding service to each service request across the metropolitan area network by the metropolitan area server includes: the service request across the metropolitan area network relates to a first terminal and a second terminal; the first terminal connected to a certain node server initiates a service request packet, and if the node server determines that the second terminal is not connected to the node server according to the service request packet, it adds a protocol label to deliver a service request packet to the metropolitan area server; the metropolitan area server determines that the second terminal is connected to another node server according to the service request packet received; the metropolitan area server obtains information on a communication link of the current service in the metropolitan area network, and then allocates the data label of the current service, and sends a label allocation packet containing information on the data label to subordinate network devices on the communication link respectively; wherein, the label allocation packet contains an IN label, an OUT label and an orientation port, and the subordinate network devices includes a node switch and a node server.

During the above service request process, a packet label table may also be configured, which specifically includes: setting, by the metropolitan area server, the IN label, OUT label and orientation port of the current service in its internal data packet label table according to the data label allocated; setting, by a subordinate network device on the communication link, the IN label, OUT label and orientation port in its internal data packet label table according to the label allocation packet, after the subordinate network device receives the label allocation packet; wherein, the internal data packet label table of the metropolitan area server and the node switch are configured for orienting a label data packet received via the set IN label to a corresponding port, and sending the label data packet via the corresponding set OUT label; wherein, the internal data packet label table of the node server is configured for orienting a data packet received by the node server from the access network to a corresponding port, adding the set corresponding OUT label and sending the data packet to the metropolitan area network.

During the above service request process, the node server may also configure an address-label mapping table, which specifically includes: the label allocation packet sent to the node server by the metropolitan area server further includes a binding relation between an access network address of the first terminal and an access network address of the second terminal of the current service and the OUT label; the node servers at both ends of the communication link set the binding relation in their respective internal address-label mapping tables after receiving the label allocation packet respectively; wherein, an access network address is an address allocated by each node server to a network access device connected therewith.

During the above service request process, the node server may also configure its own packet address table, which specifically includes: setting, by the node server connected to the second terminal, a port to which a data packet with a destination address being an access network destination address is oriented in its internal data packet address table according to the access network destination address in the label allocation packet, after the node servers at both ends of the communication link respectively receive the label allocation packet; and setting, by the node server connected to the first terminal, a port to which a data packet with a destination address being an access network source address is oriented in its internal data packet address table according to the access network source address in the label allocation packet.

The above service request process further comprises: sending, by the node server connected to a first terminal, a service processing command to the first terminal according to its internal data packet address table; sending, by the node server connected to a second terminal, a service processing command to the second terminal according to its internal data packet address table; and performing, by the first terminal and the second terminal, the corresponding operation according to the service processing command received respectively.

Wherein, the information on a communication link is information on a unidirectional communication link or information on a bidirectional communication link.

Again, during the above service request process, it may also perform a flow control and allocate an appropriate communication link via the flow control, specifically as follows:

Preferably, during the above service request process, after the first terminal connected to a certain node server initiates a service request packet, it further includes: the node server checks according to the content of the service request packet whether the remaining flow resource of the communication link between the node server and the first terminal meets the flow resource required by the service, if not, it sends a service reject packet to the first terminal; if yes, it continues to determine whether the second terminal is connected to the node server.

Preferably, during the above service request process, after the metropolitan area server obtains the information on the communication link of the current service on the metropolitan area network, it further includes: the metropolitan area server checks according to the content of the service request packet whether the remaining flow resource of the current service on the communication link of the metropolitan area network meets the flow resource required by the service, if not, it sends a service reject packet to the node server connected to the first terminal.

Preferably, during the above service request process, it further includes: if it meets the flow resource required by the service, the metropolitan area server sends a service request packet to the node server connected to the second terminal; the node server checks according to the content of the service request packet whether the remaining flow resource of the communication link between the node server and the second terminal meets the flow resource required by the service, if not, it sends a service reject packet to the metropolitan area server.

Preferably, during the above service request process, it further includes: if it meets the flow resource required by the service, the node server connected to the second terminal sends a menu packet to the second terminal; after the second terminal receives the menu packet, it returns a reply packet indicating that communication is accepted; and after the node server receives the reply packet, it adds a protocol label and sends a service admission packet to the metropolitan area server.

Wherein, an address information table is set in the metropolitan area server, and metropolitan area network address occupation information, device description information and device resource information are recorded in each item of the address information table, and the device resource information includes the metropolitan area network address of the subordinate network device connected to each network port of the device and the uplink and downlink flow count on each network port of the device; the metropolitan area server obtains the information on the communication link of the current service on the metropolitan area network according to the metropolitan area network address of the subordinate network device connected to each network port of the device in the address information table, and obtains the remaining flow resource of the current service on the communication link of the metropolitan area network according to the uplink and downlink flow count of each network port of the device.

Wherein, an address information table is set on the node server, and the access network address occupation information, device description information and device resource information are recorded in each item of the address information table, and the device resource information includes the access network address of the access network device connected to each network port of the device and the uplink and downlink flow count on each network port of the device; the node server obtains the communication link information between the node server and the terminal according to the access network address of the access network device connected to each network port of the device in the address information table, and obtains the remaining flow resource of the communication link between the node server and the terminal according to the uplink and downlink flow count of each network port of the device.

Additionally, a content-address mapping table is also set on the node server, and the usage thereof is as follows: the service request packet initiated by the first terminal contains service type information, service content information and the access network address of the first terminal, and the service content information includes a service number; the node server connected to the first terminal looks up the service number in a content-address mapping table preset internally, if the service number is not found, it is determined that the second terminal is not connected with the node server; otherwise, the second terminal is connected with the node server.

Additionally, a content-address mapping table is also set on the metropolitan area server, and the usage thereof is as follows: the service application packet received by the metropolitan area server contains service type information, service content information and the access network address of the first terminal, and the service content information includes a service number; the metropolitan area server looks up the metropolitan area network address corresponding to the service number in a content-address mapping table preset internally, and determines that the second terminal is connected with another node server.

An embodiment of the invention further discloses a communication system for a novel network, wherein the novel network is a network with a centralized control function, which includes a main control server and subordinate network devices, the subordinate network devices include terminals, and the system includes:

a route configuring module on the main control server, configured for configuring a downlink communication link of the current service; and a first communication module group configured for transmitting a data packet of the current service sent from a source terminal, to a target terminal via the downlink communication link.

As one preferred embodiment of the invention, the configuring the downlink communication link of the current service comprises: notifying a switching device related to the downlink communication link of the current service to configure a table; and the transmitting via the downlink communication link includes: querying a configured table, and transmitting, by the switching device, a received data packet via a corresponding port.

That is, one of the core concepts of the embodiments of the invention lies in that, the main control server notifies the switching device to configure a table for the downlink communication link of the current service, and then transmits the data packet based on the table configured.

In a specific implementation, the service includes a unicast communication service and a multicast communication service. That is, the above configuration of a table may be employed for both multicast communication and unicast communication, and communication on the novel network may be implemented by the core concept of table.

As described above, the novel network of the invention includes an access network part, and in the access network, the main control server is a node server, and the subordinate network devices include an access switch and terminals.

For a unicast communication service on the access network, the route configuring module includes:

a downlink acquiring sub-module configured for acquiring information on the downlink communication link of the current service according to a service request protocol packet initiated by the source terminal, wherein the information on the downlink communication link includes downlink communication port information of the main control server and an access switch that participate in the current service;

a table configuring sub-module configured for setting a downlink port to which the data packet of the current service is to be oriented in its internal data packet address table according to the downlink communication port information of the main control server; and a notifying sub-module configured for sending a port configuration command to the corresponding access switch according to the downlink communication port information of the access switch, so that the access switch sets a downlink port to which the data packet of the current service is to be oriented in its internal data packet address table in response to the port configuration command.

That is, the node server performs a main control, configures a table according to the downlink communication link acquired, and notifies the access switch to configure a table.

In an embodiment of the invention, the subordinate network devices each has a corresponding access network address, as one specific application example, the downlink acquiring sub-module includes:

a unicast service request receiving unit configured for obtaining a service request protocol packet initiated by the source terminal for establishing a unicast communication service with the target terminal, wherein the service request protocol packet comprises service type information, service content information and an access network address of the source terminal, and the service content information comprises a service number;

a target terminal address extracting unit configured for extracting an access network address of the target terminal from a preset content-address mapping table according to the service number; and a unicast link calculating unit configured for acquiring the information on the downlink communication link of the current service according to the service type information, the access network address of the source terminal, and the access network address of the target terminal.

In practice, a downlink port to which a unicast data packet of the current service is to be oriented, that is set by the main control server in its internal unicast data packet address table, includes:

a downlink port to which the unicast data packet, with a destination address being an address of the source terminal, is to be oriented; and/or a downlink port to which the unicast data packet, with a destination address being an address of the target terminal, is to be oriented.

For a unicast communication service, the information on a communication link may be information on a unidirectional communication link, for example, a unicast service request initiated by the source terminal to the target terminal, or a unicast service request initiated by the target terminal to the source terminal; or, the information on the communication link may also be information on a bidirectional communication link, for example, a unicast service request initiated by the source terminal and the target terminal to each other.

When the information on a communication link is information on a unidirectional communication link, communication port information of an access switch includes uplink port information of an uplink access switch and downlink port information of a downlink access switch;

a port to which the unicast data packet of the current service is to be oriented, that is set by an access switch in its internal unicast data packet address table according to the port configuration command, includes:

an uplink port of an uplink access switch and a downlink port of a downlink access switch to which the unicast data packet with a destination address being the address of the target terminal is to be oriented.

When the information on the communication link is information on a bidirectional downlink communication link, communication port information of an access switch includes uplink port information and downlink port information of an uplink access switch, and uplink port information and downlink port information of a downlink access switch;

a port to which the unicast data packet of the current service is to be oriented, that is set by an access switch in its internal unicast data packet address table according to the port configuration command, includes:

an uplink port and a downlink port of an uplink access switch to which the unicast data packet with a destination address being the address of the target terminal is to be oriented; and an uplink port and a downlink port of an downlink access switch to which the unicast data packet with a destination address being the address of the source terminal is to be oriented.

As one preferred embodiment of the invention, the data packet of the current service comprises an access network address of the target terminal, and the first communication module group comprises:

a first lookup table orientation module on the main control server, configured for looking up the downlink port to which the data packet of the current service is to be oriented in its internal data packet address table according to the access network address of the target terminal, and transmitting the data packet to the corresponding access switch via the downlink port; and a first lookup table transmission module on the access switch, configured for looking up the downlink port to which the data packet of the current service is to be oriented in its internal data packet address table according to the access network address of the target terminal, and transmitting the data packet to the target terminal via the downlink port.

For a unicast communication service, the data packet may not only be transmitted from the source terminal to the target terminal, but also be transmitted from the target terminal to the source terminal; that is, as another preferred embodiment of the invention, the system may further include a second communication module group configured for transmitting a data packet of the current service, sent by the target terminal, to the source terminal via the downlink communication link.

In such a case, the data packet of the current service includes the access network address of the source terminal, and the second communication module group includes:

a second lookup table orientation module on the main control server, configured for looking up the downlink port to which the data packet of the current service is to be oriented in its internal data packet address table according to the access network address of the source terminal, and transmitting the data packet to the corresponding access switch via the downlink port; and a second lookup table transmission module on the access switch, configured for looking up the downlink port to which the data packet of the current service is to be oriented in its internal data packet address table according to the access network address of the source terminal, and transmitting the data packet to the source terminal via the downlink port.

For a multicast communication service on the access network, the downlink acquiring sub-module includes:

a first multicast service request receiving unit configured for obtaining a service request protocol packet initiated by the target terminal for applying for a multicast communication service, wherein the service request protocol packet comprises service type information, service content information and an access network address of the target terminal, and the service content information includes a service number;

a source terminal address extracting unit configured for extracting an access network address of the source terminal from a preset content-address mapping table according to the service number;

a first multicast address allocating unit configured for acquiring the multicast address corresponding to the source terminal and allocating the multicast address to the target terminal; and a first multicast link calculating unit configured for acquiring communication link information of the current multicast service according to the service type information, the access network address of the source terminal, and the access network address of the target terminal.

As another example of multicast communication service, the downlink acquiring sub-module further includes:

a second multicast service request receiving unit configured for obtaining a service request protocol packet submitted by the source terminal for initiating a multicast communication service, wherein the service request protocol packet comprises service type information, service content information and the access network address of the source terminal, and the service content information includes a service number;

a second multicast address allocating unit configured for allocating a multicast address to the source terminal according to the service request protocol packet; and a second multicast link calculating unit configured for acquiring uplink communication link information of the current multicast service according to the service type information, an access network address of the main control server, and the access network address of the source terminal.

As another example of a multicast communication service, the downlink acquiring sub-module further includes:

a third multicast link calculating unit configured for acquiring downlink communication link information of the current multicast service according to the service type information, the access network address of the main control server, and the access network address of the source terminal.

Because the node server functions as the main control node on the access network, and a multicast service communication only relates to the downlink port of the node server, a port to which a multicast data packet of the current service is oriented, that is set by the main control server in its internal multicast data packet address table, includes:

a downlink port to which the multicast data packet with a destination address being the multicast address is to be oriented.

In one example of a typical multicast service, for example, a target terminal requests to watch living broadcast, the communication port information of an access switch includes uplink port information of an uplink access switch and downlink port information of a downlink access switch;

a port to which the multicast data packet of the current service is to be oriented, that is set by an access switch in its internal multicast data packet address table according to the port configuration command, includes:

an uplink port of an uplink access switch and a downlink port of an downlink access switch to which the multicast data packet with a destination address being the multicast address is to be oriented.

As another example of a multicast server, for example, a source terminal is watching a living broadcast when it initiates the living broadcast, the communication port information of the access switch further includes downlink port information of the uplink access switch;

the port to which the multicast data packet of the current service is to be oriented, that is set by the access switch in its internal multicast data packet address table according to the port configuration command, includes:

a downlink port of the uplink access switch to which the multicast data packet with a destination address being the multicast address is to be oriented.

For a multicast communication service, the data packet of the current service generally includes a multicast address, and in one preferred embodiment of the invention, the first communication module group includes:

a first port orientation module on the main control server, configured for looking up the downlink port to which the data packet of the current service is to be oriented in its internal data packet address table according to the multicast address, and transmitting the data packet to the corresponding downlink access switch via the downlink port; and a first downlink port transmission module on the access switch, configured for looking up the downlink port to which the data packet of the current service is to be oriented in its internal data packet address table according to the multicast address, and transmitting the data packet to the target terminal via the downlink port.

For different multicast communication services, the first communication module group further includes:

a sending module on the terminal, configured for orienting the data packet to an uplink access switch according to the multicast address in the data packet of the current service sent from the source terminal; and an uplink port transmission module on the access switch, configured for looking up an uplink port to which the data packet of the current service is to be oriented in its internal data packet address table according to the multicast address, and transmitting the data packet to the main control server via the uplink port.

More preferably, the first communication module group may further include:

a second port orientation module on the main control server, configured for looking up the downlink port to which the data packet of the current service is to be oriented in its internal data packet address table according to the multicast address, and transmitting the data packet to the corresponding uplink access switch via the downlink port; and a second downlink port transmission module on the access switch, configured for looking up the downlink port to which the data packet of the current service is to be oriented in its internal data packet address table according to the multicast address, and transmitting the data packet to the source terminal via the downlink port.

In a specific implementation, the downlink acquiring sub-module further includes:

a link selecting unit configured for selecting information on one communication link among information on multiple communication links as the information on the communication link of the current service according to a preset rule, when the information on multiple communication links of the current service are obtained. As an example, the preset rule is as follows: the node server acquires flow information of each communication link and flow information of the current service, and information on a communication link with the minimum flow used is determined as the communication link information of the current service; or, the preset rule is as follows: the node server acquires bandwidth information of each communication link and bandwidth information of the current service, and information on a communication link with the maximum bandwidth is determined as the information on the communication link of the current service.

As one preferred embodiment, the port configuration command is recorded in a protocol packet, and the main control server further includes:

a protocol packet orientation module configured for orienting the protocol packet to the corresponding access switch by connecting to a downlink port of the corresponding access switch according to settings of a downlink protocol packet address table that is preset internally;

wherein a downlink port, to which a protocol packet with a destination address being an address of a subordinate network device is to be oriented, is set in the downlink protocol packet address table.

For better resource utilization, after the current service is completed, the system further includes:

a resource releasing module on the main control server, configured for releasing the port that is set, to which the data packet of the current service is oriented, in its internal data packet address table after the current service is completed, and sending a port release command to the access switch that participates in the current service; and a port releasing module on the access switch, configured for releasing the port that is set, to which the data packet of the current service is oriented, in its internal data packet address table according to the port release command.

One main reason that the node server of the invention can perform a centralized control is that, it has its own access network address and maintains the access network addresses of the subordinate network devices. In such a case, the subordinate network device includes access switch, and the system further includes an access switch network access processing module, and the access switch network access processing module includes:

a downlink protocol packet sending sub-module on the node server, configured for sending a downlink protocol packet to the access switch; and a first network access command sending sub-module configured for sending a network access command according to an uplink protocol packet returned by the access switch; and the following sub-modules on the access switch:

a table 0 initialization configuring sub-module configured for setting in its internal downlink protocol packet address table that all downlink protocol packets are to be oriented to a CPU module when it is powered on;

a downlink protocol packet receiving sub-module configured for orienting the received downlink protocol packet to the CPU module of the access switch according to the settings of the downlink protocol packet address table, wherein the downlink protocol packet contains an access network address that is to be allocated;

an uplink protocol packet returning sub-module configured for generating an uplink protocol packet by the CPU module and sending the uplink protocol packet to the node server;

a first network access command receiving sub-module configured for receiving the network access command sent by the node server, wherein the network access command contains an access network address of the access switch, and the access network address is the access network address to be allocated in the downlink protocol packet received by the access switch; and a table 0 first setting sub-module configured for updating its internal downlink protocol packet address table to orient only a protocol packet with a destination address being its own access network address to the CPU module.

In a specific implementation, other subordinate access network devices are often connected under the access switch. In such a case, the access switch network access processing module further includes:

a port allocation packet sending sub-module on the node server, configured for sending a port allocation packet to an access switch that has accessed the network, wherein the port allocation packet comprises port allocation information, and the port allocation information is information that orients each port downlink protocol packet to each downlink port of the access switch; and the following sub-modules on the access switch:

a first orienting sub-module configured for orienting the port allocation packet with a destination address being its own access network address to the CPU module; and a table 0 second setting sub-module configured for setting a downlink port to which each port downlink protocol packet is to be oriented in its internal downlink protocol packet address table according to the port allocation information.

More preferably, the access switch network access processing module further includes:

a port downlink protocol packet sending sub-module on the node server, configured for sending a port downlink protocol packet to an access switch that has accessed the network, wherein the port downlink protocol packet contains an access network address that is to be allocated; and the following sub-module on the access switch:

a second orienting sub-module configured for orienting the port downlink protocol packet to the corresponding downlink port according to the settings of its internal downlink protocol packet address table.

More preferably, the access network device further includes a subordinate access network device connected to a downlink port of an access switch that has accessed the network, and the access switch network access processing module further includes:

a second network access command sending sub-module on the node server, configured for sending a network access command to the subordinate access network device; and the following sub-modules on the subordinate access network device:

a port uplink protocol packet returning sub-module configured for generating a port uplink protocol packet for a received port downlink protocol packet, and sending the port uplink protocol packet to the node server;

a second network access command receiving sub-module configured for receiving the network access command sent by the node server, wherein the network access command comprises the access network address of the subordinate access switch, and the access network address is the access network address to be allocated in the port downlink protocol packet received by the subordinate access switch:

wherein, the subordinate network device includes an access switch or a terminal.

To realize the convergence of the novel network of the invention and the existing Ethernet, the access network device further includes an Ethernet protocol conversion gateway and a local area Ethernet connected between the access switch and the source terminal as well as the target terminal, the system further includes an Ethernet protocol conversion gateway network access processing module, and the Ethernet protocol conversion gateway network access processing module includes:

the following sub-modules on the main control server.

a query packet sending sub-module configured for issuing a query packet;

an information lookup sub-module configured for looking up Ethernet protocol conversion gateway information corresponding to a serial number in a registration information table, wherein the Ethernet protocol conversion gateway information includes an MAC address of the Ethernet protocol conversion gateway and an MAC address of a terminal bond to the Ethernet protocol conversion gateway;

a network access command sending sub-module configured for sending a network access command to the Ethernet protocol conversion gateway, wherein the network access command contains an address of the Ethernet protocol conversion gateway in the novel network and the MAC address of the Ethernet protocol conversion gateway; and the following sub-modules on the Ethernet protocol conversion gateway:

a query replying sub-module configured for receiving the query packet and returning a reply packet that contains a serial number of the Ethernet protocol conversion gateway after being powered on and initialized; and a network access replying sub-module configured for returning a reply after receiving the network access command, so that the Ethernet protocol conversion gateway accesses the novel network.

In practice, the binding relation between the MAC address of the terminal and the Ethernet protocol conversion gateway is preset in a node server at the time the terminal and the Ethernet protocol conversion gateway are sold.

In one preferred embodiment of the invention, the system further includes an Ethernet protocol conversion gateway bond terminal network access processing module, and the Ethernet protocol conversion gateway bond terminal network access processing module includes:

a query packet sending sub-module on the main control server, configured for issuing a query packet;

a query packet orienting sub-module on the Ethernet protocol conversion gateway, configured for receiving the query packet and orienting the query packet to a corresponding port according to a protocol packet address table;

a first MAC address adding sub-module on the Ethernet protocol conversion gateway, configured for adding the MAC address of the Ethernet protocol conversion gateway and the MAC address of the target terminal into the query packet and forwarding the query packet:

an initializing sub-module on the terminal, configured for receiving the query packet and returning a reply packet that contains a serial number of the terminal after being powered on and initialized;

a first MAC address deleting sub-module on the Ethernet protocol conversion gateway, configured for removing the MAC address of the Ethernet protocol conversion gateway and the MAC address of the terminal in the reply packet and then forwarding the reply packet to the main control server;

a network access notifying sub-module on the main control server, configured for finding terminal information corresponding to the serial number of the terminal in the registration information table and sending a network access command, wherein the network access command contains an address of the terminal in the novel network;

a second MAC address adding sub-module on the Ethernet protocol conversion gateway, configured for forwarding the network access command received after adding the MAC address of the Ethernet protocol conversion gateway and the MAC address of the target terminal;

a network access replying sub-module on the terminal, configured for returning a reply after receiving the network access command; and a second MAC address deleting sub-module on the Ethernet protocol conversion gateway, configured for removing the MAC address of the Ethernet protocol conversion gateway and the MAC address of the terminal from the reply, and then forwarding the reply to the main control server.

It can be known from the above that, after the Ethernet protocol conversion gateway accesses the novel network, it will obtain the MAC address of the Ethernet protocol conversion gateway and the MAC address of the terminal registered under the Ethernet protocol conversion gateway from the node server that has the centralized control function. In such a case, the following modules may be employed for communication: the node server is configured to send an MAC address of a terminal bond to an Ethernet protocol conversion gateway that accesses the network to the Ethernet protocol conversion gateway:

the Ethernet protocol conversion gateway is connected with the terminal via the Ethernet and includes:

an MAC acquiring module configured for accessing the novel network and obtaining the MAC address of the terminal bond to the Ethernet protocol conversion gateway from a node server that has the centralized control function:

an MAC adding module configured for receiving a data packet sent from the novel network, adding the MAC address of the Ethernet protocol conversion gateway and the MAC address of the target terminal into the data packet, and then sending the data packet to the Ethernet; and an MAC deleting module configured for receiving a data packet sent from the Ethernet, removing the MAC address of the Ethernet protocol conversion gateway and the MAC address of the source terminal from the data packet, and then sending the data packet to the novel network;

wherein, the target terminal and the source terminal conform to a novel network protocol; and the terminal is connected in the Ethernet, connected with the novel network via the Ethernet, and bond to the Ethernet protocol conversion gateway.

That is, after the Ethernet protocol conversion gateway accesses the novel network, it may add/remove the MAC to/from the data packet or the protocol packet.

More specifically, in the embodiments of the invention, preferably, a data packet to which the MAC address of the Ethernet protocol conversion gateway and the MAC address of the target terminal are added is transmitted in the Ethernet using an Ethernet protocol; and a data packet from which the MAC address of the Ethernet protocol conversion gateway and the MAC address of the source terminal are removed is transmitted in the novel network using the novel network protocol.

Preferably, a packet header of a data packet sent either from the novel network or the Ethernet contains addresses of two transmission ends in the novel network, and the addresses are the source address and the destination address of the data packet.

Preferably, the system further comprises: a mapping relation acquiring module on the Ethernet protocol conversion gateway, configured for obtaining a mapping between the MAC address of the terminal bond to the Ethernet protocol conversion gateway and the address of the terminal in the novel network from the node server, after the Ethernet protocol conversion gateway accesses the novel network;

wherein the MAC adding module receives a data packet sent from the novel network and adds an MAC address of a corresponding target terminal into the data packet according to the mapping between a destination address of the data packet and the MAC address.

The Ethernet protocol conversion gateway further has a function of accurate flow control, which is implemented as follows:

the system further includes a packet checking module on the Ethernet protocol conversion gateway, configured for checking the data packet received and allocating a corresponding flow identifier when the data packet meets a check requirement, wherein the checking includes:

checking whether the MAC address of the Ethernet protocol conversion gateway, the MAC address of the source terminal, a destination address, a source address, a packet type and a packet length of the data packet meet the requirement.

More preferably, the system further includes:

the following modules on the Ethernet protocol conversion gateway:

a port receive buffer, configured for storing the corresponding data packet according to the flow identifier.

a packet buffer, configured for storing the data packet read from the port receive buffer;

a port sending buffer, configured for storing the data packet read from the packet buffer; and a switching engine, for reading the data packet from the port receive buffer and putting the data packet into a packet buffer queue of a corresponding flow according to the flow identifier; polling the packet buffer queue, and sequentially reading a data packet from the packet buffer queue of the corresponding flow according to the flow identifier in the sending token after obtaining a sending token, and putting the data packet into a port sending buffer; and reading the data packet from the port sending buffer and sending the data packet.

More preferably, the switching engine is further configured to determine whether the following two conditions are met:
1) the port sending buffer is not full;
2) the count of a packet counter in the packet buffer queue of the corresponding flow is larger than 0:

when the two conditions are met, the switching engine sequentially reads the data packet from the packet buffer queue of the corresponding flow according to the flow identifier in the sending token, and puts the data packet into the port sending buffer.

In a specific implementation, the node server is further configured to generate flow control information according to a service request protocol packet initiated by a terminal, and send the flow control information to an Ethernet protocol conversion gateway for flow control on the uplink, wherein the flow control information includes a sending time interval and a sending data size; and the Ethernet protocol conversion gateway further includes a code rate control module being configured by the CPU module, for generating the sending token according to the flow control information, and sending the sending token to the switching engine, wherein the token contains a flow identifier.

As described above, the novel network includes a metropolitan area network part, and in the metropolitan area network, the main control server is a metropolitan area server, and the subordinate network devices include a node switch and a node server, wherein the node switch is connected between the metropolitan area server and the node server, and the system further comprises:

the following modules on the metropolitan area server:

a protocol label allocating module configured for allocating a protocol label to a subordinate network device that accesses the metropolitan area network when the device accesses the network, and allocating a different protocol label to each connection when there exist multiple connections between one and the same subordinate network device and the metropolitan area server: wherein, the protocol label is adapted to describe a connection between the subordinate network device and the metropolitan area server, and the subordinate network device includes a node switch and a node server;

a data label allocating module configured for allocating a data label of a corresponding service to each service request across the metropolitan area network, wherein the data label is adapted to describe a connection between node servers related to the service; and a metropolitan area network address allocating module configured for allocating a metropolitan area network address to a subordinate network device that accesses the metropolitan area network when the device accesses the network.

The metropolitan area server further includes the following modules, for the network access of the subordinate network device:

a port querying module configured for sending metropolitan area query label packets to all of its downlink ports, wherein each metropolitan area query label packet contains a standby protocol label allocated by the protocol label allocating module;

a port reply module configured for receiving a metropolitan area reply label packet sent by a subordinate network device, wherein the metropolitan area reply label packet contains a serial number of the subordinate network device and a port number of a port that receives the metropolitan area query label packet;

a network access verifying module configured for verifying whether the subordinate network device is registered according to the serial number in the metropolitan area reply label packet;

a network access command sending module configured for sending a network access command to the port of the subordinate network device that receives the metropolitan area query label packet when the subordinate network device is registered, wherein the network access command contains a metropolitan area network address allocated by the metropolitan area server to the subordinate network device, and the standby protocol label; and a network access command reply receiving module configured for receiving a network access command reply returned by the subordinate network device so that the subordinate network device accesses the metropolitan area network;

wherein, the subordinate network device is a node switch or a node server.

Specifically, when there exist multiple connections between one and the same subordinate network device and the metropolitan area server, a plurality of ports of said one and the same subordinate network device will receive a plurality of metropolitan area query label packets, wherein the standby protocol label in each metropolitan area query label packet is different:

the metropolitan area server sends a plurality of network access commands to the plurality of ports of one and the same subordinate network device via a plurality of different protocol labels, and the metropolitan area network address allocated to the subordinate network device in each network access command is the same.

In a specific implementation, the node switch includes:

a protocol packet label table, configured for orienting received metropolitan area protocol packets to corresponding downlink ports respectively, wherein the metropolitan area protocol packets include the metropolitan area query label packets sent by the metropolitan area server;

a protocol packet label table initializing module configured for setting that all metropolitan area protocol packets are to be oriented to a CPU module when the node switch is powered on; and a protocol packet label table updating module configured for modifying the protocol packet label table of the node switch according to an instruction of the metropolitan area server after the node switch accesses the metropolitan area network, and orienting metropolitan area protocol packets corresponding to respective standby protocol labels newly allocated by the metropolitan area server to corresponding downlink ports of the node switch respectively; wherein the standby protocol labels newly allocated are adapted to describe connections between the metropolitan area server and a subordinate connecting device of the node switch, and the subordinate connecting device includes a subordinate node switch and a subordinate node server.

More preferably, the node switch further includes:

a reply packet label table, configured for orienting received metropolitan area reply label packets to corresponding uplink ports respectively;

a reply packet label table initializing module configured for setting that orientation of all metropolitan area reply label packets is shut down when the node switch is powered on; and a reply packet label table updating module configured for modifying the reply packet label table of the node switch after the node switch receives a metropolitan area query label packet sent by the metropolitan area server, and orienting a metropolitan area reply label packet corresponding to the protocol label to an uplink port that receives the metropolitan area query label packet; and further, for modifying the reply packet label table of the node switch according to an instruction of the metropolitan area server after the node switch accesses the metropolitan area network, and orienting metropolitan area reply label packets corresponding to respective standby protocol labels newly allocated by the metropolitan area server to corresponding uplink ports respectively; wherein, the standby protocol labels newly allocated are adapted to describe connections between a subordinate connecting device of the subordinate network device and the metropolitan area server, and the subordinate connecting device includes a subordinate node switch and a node server.

A protocol packet label table and a reply packet label table are set on the metropolitan area server, which will be illustrated respectively as follows:

the protocol packet label table is configured for orienting metropolitan area protocol packets to corresponding downlink ports respectively, wherein the metropolitan area protocol packets include the metropolitan area query label packets sent by the metropolitan area server; and the reply packet label table is configured for setting that all metropolitan area reply label packets are to be oriented to a CPU module when the metropolitan area server is powered on.

Correspondingly, the metropolitan area server further includes: a protocol packet label table initializing module configured for setting in the protocol packet label table of the metropolitan area server that orientation of all metropolitan area protocol packets is shut down when the metropolitan area server is powered on; and a protocol packet label table configuring module configured for, when the subordinate network device accesses the network and after the protocol label allocating module allocates standby protocol labels corresponding to the number of the downlink ports, modifying the protocol packet label table and orienting metropolitan area protocol packets corresponding to respective allocated standby protocol labels to corresponding downlink ports of the metropolitan area server respectively; wherein, the standby protocol labels are adapted to describe connections between the metropolitan area server and the subordinate network device.

When the subordinate network device that accesses the network is a node switch, a certain subordinate connecting device of the node switch accesses the metropolitan area network, wherein the subordinate connecting device includes a node switch and a node server, and the system further includes:

a metropolitan area query label packet sending module on the metropolitan area server, configured for sending metropolitan area query label packets to respective subordinate connecting devices via newly allocated standby protocol labels, and orienting the metropolitan area query label packets to corresponding downlink ports of the metropolitan area server respectively according to a protocol packet label table;

a metropolitan area reply label packet returning module on the subordinate connecting device, configured for receiving a metropolitan area query label packet after being powered on, and then returning a metropolitan area reply label packet to the metropolitan area server, wherein the metropolitan area reply label packet contains a serial number of the subordinate connecting device and a port number of a port that receives the metropolitan area query label packet;

a registration verifying module on the metropolitan area server, configured for verifying whether the subordinate connecting device is registered according to the serial number in the metropolitan area reply label packet after receiving the packet;

a network access notifying module on the metropolitan area server, configured for sending a network access command to the subordinate connecting device when the subordinate connecting device is registered, wherein the network access command contains a metropolitan area network address allocated to the subordinate connecting device by the metropolitan area server and the protocol label to be allocated; and a network access reply module on the subordinate connecting device, configured for returning a network access command reply after receiving the network access command.

As one preferred embodiment, after the subordinate network device between the metropolitan area server and the subordinate connecting device receives the metropolitan area query label packet and the network access command, the subordinate network device orients the metropolitan area query label packet and the network access command to a corresponding downlink port for forwarding, according to its own protocol packet label table;

after the subordinate network device between the metropolitan area server and the subordinate connecting device receives the metropolitan area reply label packet and the network access command reply, the subordinate network device orients the metropolitan area reply label packet and the network access command reply to a corresponding uplink port for forwarding, according to its own reply packet label table.

Preferably, a label information table is set in the metropolitan area server, and the label occupation information, label description information and label route information are recorded in respective items, wherein the label route information includes a metropolitan area network address and a port number of a port of a previous-hop switch of the label.

Correspondingly, the metropolitan area server further includes: a label information table updating module configured for modifying an item in the label information table corresponding to a standby label when the protocol label allocating module allocates the label to a subordinate network device: the label occupation information is modified from not-used to standby, the metropolitan area network address and port of the previous-hop switch in the label route information is set as the address and the corresponding port of the metropolitan area server, and the label description information is not modified; after the subordinate network device accesses the network, it modifies the item in the label information table corresponding to the label: the label occupation information is modified as used, and the label description information and the label route information are not modified.

Additionally, the label information table updating module is further configured to modify an item in the label information table corresponding to a standby label when the protocol label allocating module allocates the label to the subordinate connecting device of the subordinate network device: the label occupation information is modified from not-used to standby, the metropolitan area network address and port of the previous-hop switch in the label route information is set as the address and the corresponding port of the subordinate network device, and the label description information is not modified; and after the subordinate connecting device accesses the network, it modifies the item in the label information table corresponding to the label: the label occupation information is modified as used, and the label description information and the label route information are not modified.

Preferably, an address information table is set on the metropolitan area server, and the metropolitan area network address occupation information, device description information and device resource information are recorded in respective items, and the device resource information includes a metropolitan area network address of a subordinate network device connected to each network port of the device and an uplink and downlink flow count on each network port of the device.

Correspondingly, the metropolitan area server further comprises:

an address information table initializing module configured for modifying an item corresponding to a metropolitan area network address in the address information table after the metropolitan area server is powered on and the metropolitan area network address allocating module allocates the address to itself: the address occupation information is modified from not used to used, the device description information is modified as the metropolitan area server, and the device resource information is modified as the resource description of the metropolitan area server;

an address information table updating module configured for modifying an item corresponding to a metropolitan area network address in the address information table when the metropolitan area network address allocating module allocates the address to a subordinate network device and sends a network access command containing the metropolitan area network address: the address occupation information is modified from not used to standby, and the device description information and the device resource information is not modified; and after the metropolitan area server receives a network access command reply sent by the subordinate network device, modifying the item corresponding to the address in the address information table: the address occupation information is modified as used, the device description information is modified as the subordinate network device, and the device resource information is modified as a certain downlink port of a metropolitan area server connected with a certain uplink port of the subordinate network device; and at the same time, modifying the item in the address information table corresponding to the metropolitan area server address: the device resource information is modified as a certain uplink port of a subordinate network device connected with a certain downlink port of the metropolitan area server, and the address occupation information and the device description information are not modified; wherein, said certain uplink port of the subordinate network device is known according to a metropolitan area reply label packet returned by the subordinate network device, and said certain downlink port of a metropolitan area server is known according to the protocol packet label table.

Additionally, the address information table updating module is further configured to modify an item corresponding to a metropolitan area network address in the address information table, when the metropolitan area network address allocating module allocates the address to a subordinate connecting device of the subordinate network device and sends a network access command containing the metropolitan area network address: the address occupation information is modified from not used to standby, and the device description information and the device resource information is not modified; modify the item corresponding to the address in the address information table, after the metropolitan area server receives a network access command reply sent by the subordinate connecting device: the address occupation information is modified as used, the device description information is modified as the subordinate connecting device, and the device resource information is modified as a certain downlink port of the subordinate network device connected with a certain uplink port of the subordinate connecting device; and at the same time, modify the item in the address information table corresponding to the subordinate network device address: the device resource information is modified as a certain uplink port of the subordinate connecting device connected with a certain downlink port of the subordinate network device, and the address occupation information and the device description information are not modified; wherein, said certain uplink port of the subordinate connecting device is known according to a metropolitan area reply label packet returned by the subordinate connecting device, and said certain downlink port of the subordinate network device is known according to the protocol packet label table.

Preferably, a device information table is set in the metropolitan area server, and a device identification, a device state and a device address are recorded in respective items of the device information table.

Correspondingly, the metropolitan area server further includes: a device information table updating module configured for modifying an item in the device information table corresponding to a device, when the metropolitan area network address allocating module allocates a metropolitan area network address to the subordinate network device or a subordinate connecting device of the subordinate network device and sends a network access command containing the metropolitan area network address: the device state is modified as to access the network, the device address is modified as the metropolitan area network address allocated, and the device identification is not modified; and it is further configured to modify the item in the device information table corresponding to the device after the metropolitan area server receives a network access command reply sent by the subordinate network device or a subordinate connecting device of the subordinate network device: the device state is modified as have accessed the network, and the device identification and the device address are not modified.

Preferably, the metropolitan area server further includes: a content-address mapping table, configured for recording a mapping relation between service content and metropolitan area network addresses, wherein information on the service content includes a service number;

the usage of the content-address mapping table is as follows: the service request across the metropolitan area network relates to a first terminal and a second terminal; when the metropolitan area server receives a service request packet sent by the node server connected to the first terminal that contains service type information, service content information and an access network address of the first terminal, it looks up the metropolitan area network address corresponding to the service number in the content-address mapping table, and determines that the second terminal is connected with another node server.

Additionally, the metropolitan area server may also perform a flow control during the service request process and allocate an appropriate communication link via the flow control, specifically as follows:

the metropolitan area server further includes: a communication link acquiring module configured for obtaining the communication link information of the current service on the metropolitan area network according to the metropolitan area network address of the subordinate network device connected to each network port of the device in the address information table; wherein the communication link information is unidirectional communication link information or bidirectional communication link information; thus, the data label allocating module allocates the data label of the current service, and sends a label allocation packet containing the data label information to the subordinate network devices on the communication link respectively; the label allocation packet contains an IN label, an OUT label and an orientation port, and the subordinate network device includes node switch and node server.

In comparison with the prior art, the invention has the following advantages:

1) In the invention, when a service request is initiated by a main control server (in the protocol interaction process established by the communication process), the transmission path of the current service data is set in advance in the table configuration mode of each access switch according to situation of the service request, and during the transmission process of the data packet, the data packet may be transmitted just according to the transmission path, without the need to employ the solution of the existing IP protocol, and each data packet negotiates the transmission route autonomously. In a word, the present invention may guarantee the stability and smoothness of the transmission path and avoid multimedia service delays.

2) In the invention, a mode of table configuration is employed for all data services (especially unicast data packets), and a path is set in advance, thus the state information security requirements may be met. For example, for state information security, it requires monitoring certain data in the novel network; by employing the mode of table configuration according to the invention, it is very easy to orient the data transmitted by the current service to a monitoring channel, so that it can meet state information security requirements.

3) In the invention, the access switch does not need to perform route calculation for each data packet, and it does not need to maintain the network device topology around it, either, so long as oriented transmission is performed according to the data packet address table configured in advance, and the orienting process may be implemented via hardware, which may greatly improve the orienting efficiency of the switch, drastically lower the operation demand of the switch, and save hardware resources.

4) The invention provides an Ethernet protocol conversion gateway, which can access the novel network and obtain the MAC address of the Ethernet protocol conversion gateway and the terminal MAC address bond to the Ethernet protocol conversion gateway from a node server on the novel network. Therefore, for a data packet sent from the novel network to the Ethernet, by adding the MAC address of the Ethernet protocol conversion gateway and the MAC address of the target terminal into the data packet, it may be forwarded to the target terminal on the Ethernet according to the terminal MAC address; similarly, for a data packet sent from the Ethernet to the novel network, by removing the MAC address of the Ethernet protocol conversion gateway and the MAC address of the target terminal from the data packet, it may be forwarded to the novel network according to the destination address (DA) of the novel network in the data packet. Thus, the convergence of the novel network and the Ethernet may be realized.

5) In the invention, data transmission is implemented on the novel network and the Ethernet protocol conversion gateway by looking up in an address table. A protocol packet address table, a reply packet address look-up table, a unicast data packet address table and a multicast data packet address table, which are respectively used for orienting the transmission of a protocol packet (including a query packet), a reply packet, a unicast data packet and a multicast data packet, are configured on the node server of the novel network, the access switch and the Ethernet protocol conversion gateway, respectively.

6) Accurate flow control may also be carried out on the Ethernet protocol conversion gateway. For each service, the node server generates flow control information (sending time interval and sending data size) and sends it to an uplink Ethernet protocol conversion gateway; the Ethernet protocol conversion gateway generates a sending token according to the flow control information, and performs flow control on an uplink data packet. The Ethernet protocol conversion gateway can convert a non-uniform data flow that is input, into a uniform data flow for sending.

7) The novel network constructed by the invention includes two parts: access network, and metropolitan area network, wherein the metropolitan area network has a network structure that is controlled centralizedly, for example, star network and ring network, etc. Thus, 2 or even more than 2 kinds of connections may exist between two devices, but the two devices both have only one address. Therefore, said multiple connections between the two devices cannot be described by only employing the addresses. In order to accurately describe the connection relation between the subordinate network devices, a label is introduced in the invention to uniquely describe a subordinate network device. But, in comparison with the traditional MPLS label, the allocation of the label in the invention is dominated by a metropolitan area network server, while the node switch and the node server both execute passively. This is different from the allocation of an MPLS label, which is a result obtained via the mutual negotiation of the switch and the server.

8) The invention describes a network structure that is controlled by layers, wherein a metropolitan area server controls the network management process and the service process of a node switch and a node server under it, while the node server controls the network management process and the service process of an access switch and a terminal under it. Wherein, the metropolitan area server or the node server allocates an address to each network device by sending a query packet to each communication port, and establishes a clear network topology on the main control server side during the allocation process, in a main control mode. Thus, during the transmission process of a specific data packet, the main control server (metropolitan area server or node server) directly allocates a corresponding communication link (because it clearly knows the device topology of the whole network), without the need of carrying out route negotiation between each network device, thus a stable transmission rate may be guaranteed, and delay may be avoided.

9) During the transmission of service data, each data packet of the service is transmitted via the same communication link, which is different from the solution of the existing IP protocol, wherein each data packet solves the routing problem via autonomous negotiation, and the route is unknown before the data packet is delivered, that is, two data packets of one and the same service may be transmitted to the target terminal via different routes. Thus, in comparison therewith, the invention may guarantee a stable transmission rate and avoid delay.

DETAILED DESCRIPTION OF THE EMBODIMENTS

Figure 1:
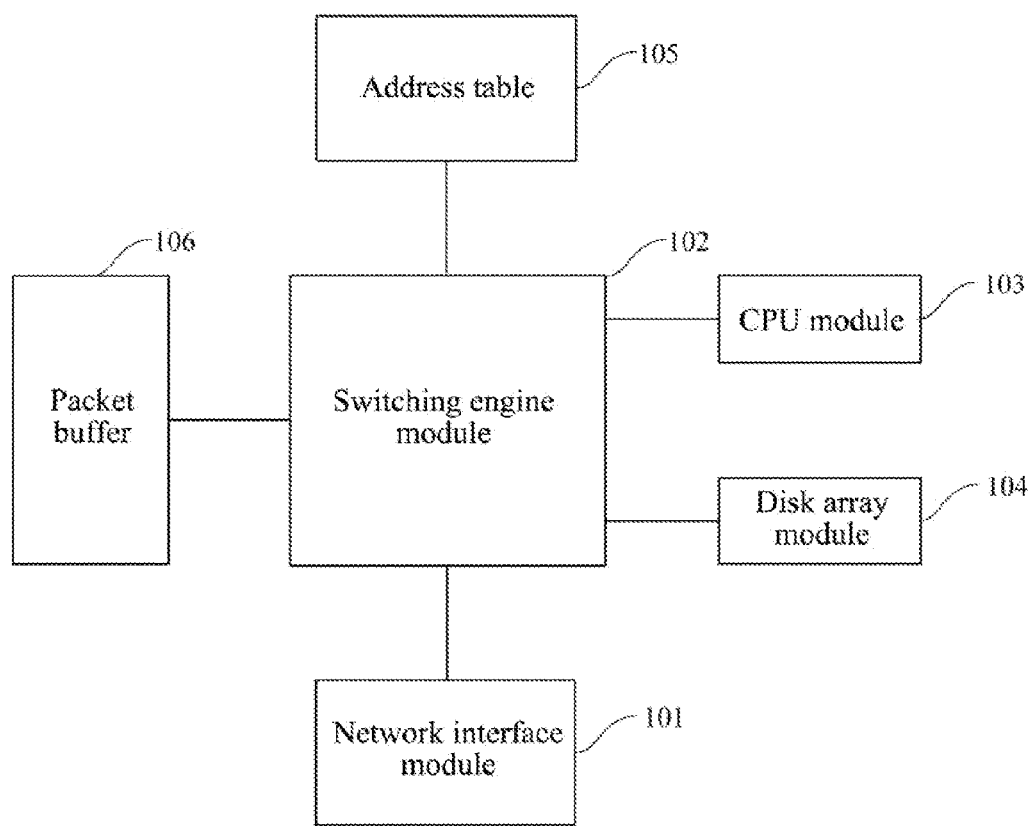
FIG. 1 shows the hardware structural representation of a node server according to the invention.

To make the above objects, characteristics and advantages of the invention more apparent, the invention will be further illustrated below in detail in conjunction with the drawings and embodiments.

1) The core concept of the invention will be briefly introduced below.

It is considered by the inventor that the present invention has the following several sufficient conditions for realizing network-wide QoS:

Firstly, the mechanism about "Best Efforts" in the core theories of IP Internet will certainly cause network flow non-uniformity and frequent packet loss. In fact, TCP protocol just utilizes the packet loss state of the network to adjust the transmission flow.

Secondly, the mechanism about "Store & Forward" in the core theories of IP Internet will cause a greater non-uniformity of network flow at the next node at the time it absorbs the local burst flow.

Thirdly, the mechanism about "Error Detection & Retransmission" in the core theories of IP Internet will cause an intolerable delay in synchronous video communication, thus it has no use value.

Fourthly, successional network flow non-uniformity or burst flow will certainly cause periodic switch (router) packet loss.

Thus it can be seen that, because the computer file burst flow is discrete in essence and has no subsequent burst flows, the above core theories of IP Internet have once made the Internet able to transmit a file efficiently. However, when facing the QoS in successional synchronous streaming media transmission, the above core theories of IP Internet becomes a prime criminal that harms the quality of network transmission. A conclusion has been drawn from the above discussion that, none of resource reservation, priority and light-load solutions can solve the QoS of synchronous streaming media fundamentally.

Since none of the above methods is feasible, how can we guarantee the quality of network transmission?

It is considered by the inventor that the current various QoS methods are all based on an error hypothesis. According to this hypothesis, the QoS solution is to provide a privilege of being processed preferentially to video flow. But in fact, because the network flow needed by different media forms is extremely non-uniform, video flow will be the absolute main body on the network so long as a few users use a video service.

Seen from another viewpoint, providing a good quality especially to a majority of the network flows is equivalent to providing a poor quality especially to a minority of the non-video flows. Since a majority of the network flows must require QoS, why not provide QoS to the remaining minority of service flows that does not require QoS? It is hypothesized that, when subscribing a airline ticket, 1000 passengers request first class and only a few passengers accept economy class, then a natural measure taken by the airline company is to cancel economy class, because the cost taken by the airline company to provide only a few economy-class services is much greater than that to provide free class upgrade for these passengers. In fact, it is very easy to guarantee the quality of all network transmission or none of the network transmission, but it is difficult to partially guarantee the quality, especially when we do not know the dividing line of the two parts. Therefore, no QoS problem will exist, so long as QoS is provided to all network services.

In its early stage, IP Internet is just like a country road, and no traffic policeman is needed in a small town with unsophisticated folkway. However, in a bustling bigalopolis, the disordered scene on some busy roads is out of control even with traffic lights and traffic policemen, and it is difficult to be on time for trips or appointments, just like today's IP Internet.

The invention is just like a highway, with no policeman or traffic light; and motor vehicles are restricted to run on specified roads via traffic lanes isolated by concrete and flyover crossings. According to the experience of the traffic bureau of California, the way to avoid highway jam is to close the entrance ramp.

The design concept of California highway has three features:
   a switch is set on the entrance ramp of the highway for controlling the macroscopic traffic flow;
   the driving speed is kept stable, thereby improving the traffic rate; and road isolations of a concrete structure and flyover crossings, rather than policemen and traffic lights, are employed to restrict vehicle driving.

The embodiments of the invention conform to theory of telephone networks and take three measures similar to those of the above highway:

the flow on each path is calculated and measured, once the flow is to be saturated, it will be bypassed, or new users will be rejected;

strict uniform-flow transmission is performed, and in the embodiments of the invention, a packet loss rate of 1/1,000,000 can be attained in TV under a heavy-load flow of 90%; and uplink data matching and flow control are performed, so that it can be ensured on structure that users strictly conform to the traffic rules, because it is impossible to expect that all users autonomously take the QoS measures.

Computer files and streaming media are two kinds of distinct media forms, and the processing modes thereof are exclusive to each other. Theory and practice of the network according to the invention disclose the following two achievements:

a price-performance ratio that is a hundredfold of that of IP Internet;

a method for developing high-quality symmetrical TV without interfering with the existing IP Internet service.

Especially on a large-flow backbone network, computer files and streaming media use the same optical fiber via different wavelengths. If they must be united to a single network, for example, an access network, then the computer files should be united to a video streaming network. An embodiment of the invention provides a complete solution for transparent bearer IP Internet.

Separating streaming media and files is just the first step, it is more important to guarantee the quality of the independent streaming media network.

As described above, the PSTN telephone network employs a strict synchronization mechanism, and the network congestion phenomenon will not appear before the flow is occupied 100 percent. Theoretically, a uniform flow will be obtained after a plurality of uniform flows are combined. It has been further proved by practice that under the premise of a uniform flow, the network flow may reach its limit value, with no packet loss phenomenon appears. Because the video media flow, which occupies over ninety percent of the further network flow, has the characteristics of a uniform flow, in the present that takes video service as the main object, the approach to guaranteeing Internet QoS is of course to eliminate source flow non-uniformity, especially to fundamentally prevent packet loss phenomenon of a network switch from appearing under a heavy load condition.

In an embodiment of the invention, a modified Ethernet is employed to establish a correction-oriented circuit, and packets with fixed length are unitedly employed network-wide. A media flow of any bandwidth may be obtained by only changing the time interval of packet transmission. To guarantee the uniform-flow characteristic of the network, it is required by the Internet of the invention that terminal designing must have a uniform-flow ability. However, in the practical network environment, it cannot expect that all the users autonomously comply with the uniform-flow specification. Therefore, in an embodiment of the invention, the node server issues a passport to the network switches, which only allows a user packet to pass uniformly under a very fine time precision. To a user terminal that is designed according to the specified requirements, the passport is totally transparent.

Under the above premise, a satisfactory result is obtained in network practice. The switch of the invention can obtain a heavy load packet loss rate less than 1/1,000,000 in the condition of a bandwidth utilization of 90%.

In conclusion, QoS is an unavoidable problem of the next generation network, and streaming media network is another species that is different from the traditional computer files. Therefore, it has no future to adapt the IP Internet to video services, and the only way out is to create a new network.

2) A novel network put forward in the invention will be introduced below.

The novel network has a network structure that is controlled centralizedly. It may be the types of tree network, star network and ring network, etc.; but on this basis, a centralized control node is needed on the network to control the whole network.

The novel network is divided into two parts: an access network and a metropolitan area network. Devices on the access network part mainly may be mainly divided into 3 categories: a node server, an access switch and a terminal (including various set-top boxes, code plates and storages, etc.). Wherein, a node server is a node on the access network that has a centralized control function, and it can control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

1. The classification of the novel network device 1.1 Device in the novel network system of the invention may be mainly divided into 3 categories: a server, a switch (including an Ethernet gateway) and a terminal (including various set-top boxes, code plates and storages, etc.). Generally, the novel network may be divided into a metropolitan area network (or state network and global network, etc.) and an access network.

1.2 Devices on the access network part may be mainly divided into 3 categories: a node server, an access switch (including an Ethernet gateway) and a terminal (including various set-top boxes, code plates and storages, etc.).

The specific hardware structure of each access network device is as follows:

Node Server:

As shown in FIG. 1, a node server mainly includes a network interface module 101, a switching engine module 102, a CPU module 103 and a disk array module 104;

Wherein, packets coming from the network interface module 101, the CPU module 103 and the disk array module 104 all enter the switching engine module 102; the switching engine module 102 performs an operation of checking the address table 105 on the packets, so that the orientation information of the packets is obtained; the packets are stored in a queue of the corresponding packet buffer 106 according to the orientation information of the packets: if the queue of the packet buffer 106 is to be full, the packets are discarded; the switching engine module 102 polls all the packet buffer queues, and forwards the queue if the following conditions are met: 1) the port sending buffer is not full; 2) the count of the packet counter in the queue is greater than 0. The disk array module 104 mainly realize the control on a hard disk, including operations of initialization, read and write, etc. on the hard disk: the CPU module 103 is mainly responsible for the protocol processing with the access switch and the terminal (not shown), the configuring of the address table 105 (including downlink protocol packet address table, uplink protocol packet address table and packet address table), and the configuring of the disk array module 104.

Figure 2:
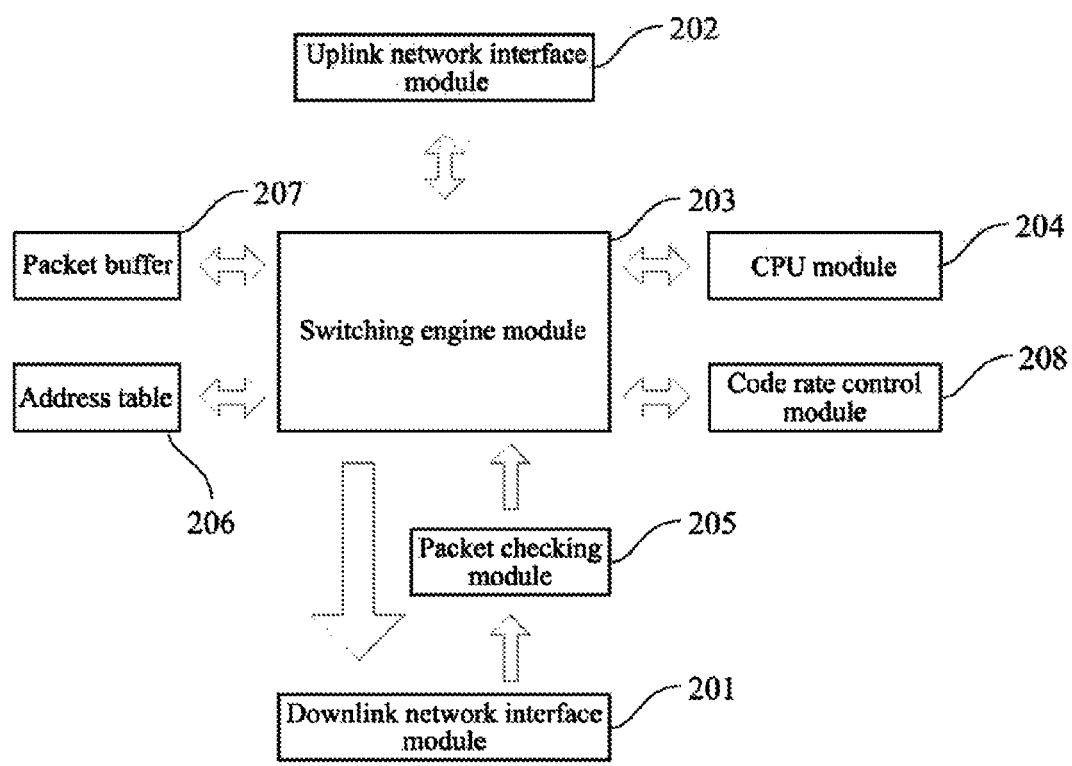
FIG. 2 shows the hardware structural representation of an access switch according to the invention.

Access Switch:

As shown in FIG. 2, the access switch mainly includes a network interface module (downlink network interface module 201 and uplink network interface module 202), a switching engine module 203 and a CPU module 204;

Wherein, packets coming from the downlink network interface module 201 (uplink data) enters the packet checking module 205; the packet checking module 205 checks whether the destination address (DA), source address (SA), packet type and packet length of the packets meet a requirement, if yes, it allocates a corresponding stream identifier (stream-id), and puts it into the switching engine module 203: otherwise, the packets are discarded. The packets coming from the uplink network interface module 202 (downlink data) enter the switching engine module 203; the packets coming from the CPU module 204 enter the switching engine module 203; the switching engine module 203 performs an operate of checking the address table 206 on the packets, so that the orientation information of the packets is obtained; if the packets entering the switching engine module 203 go from a downlink network interface to an uplink network interface, the packets are stored in a queue of the corresponding packet buffer 207 in conjunction with the stream identifier (stream-id); if the queue of the packet buffer 207 is to be full, the packets are discarded; if the packets entering the switching engine module 203 do not go from a downlink network interface to an uplink network interface, the packets are stored in a queue of the corresponding packet buffer 207 according to the orientation information of the packets; if the queue of the packet buffer 207 is to be full, the packets are discarded.

The switching engine module 203 polls all the packet buffer queues, and it is divided into two cases in the embodiments of the invention:

if the queue goes from a downlink network interface to an uplink network interface, it will be forwarded when the following conditions are met: 1) the port sending buffer is not full; 2) the count of the packet counter in the queue is greater than 0; and 3) a token generated by a code rate control module is obtained;

if the queue does not go from a downlink network interface to an uplink network interface, it will be forwarded when the following conditions are met: 1) the port sending buffer is not full; 2) the count of the packet counter in the queue is greater than 0.

The code rate control module 208 is configured by the CPU module 204, and a token is generated for all packet buffer queues that go from a downlink network interface to an uplink network interface in a programmable interval, for controlling the code rate of uplink forwarding.

The CPU module 204 is mainly responsible for the protocol processing with the node server, the configuring of the address table 206 and the configuring of the code rate control module 208.

Figure 3:
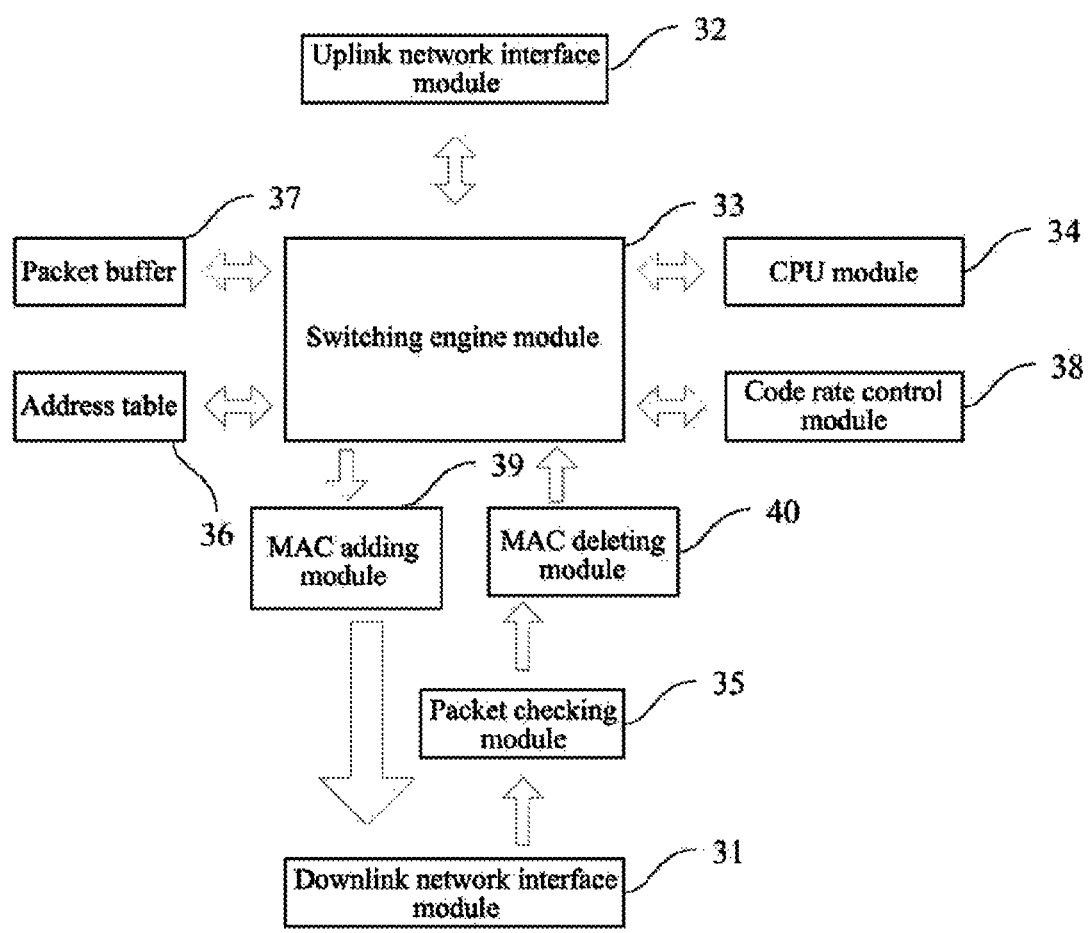
FIG. 3 shows the hardware structural representation of an Ethernet protocol conversion gateway according to the invention.

Ethernet Protocol Conversion Gateway:

As shown in FIG. 3, the Ethernet protocol conversion gateway mainly includes a network interface module (downlink network interface module 31 and uplink network interface module 32), a switching engine module 33, a CPU module 34, a packet checking module 35, a code rate control module 38, an address table 36, a packet buffer 37 and an MAC adding module 39 and an MAC deleting module 40.

Wherein, the data packets coming from the downlink network interface module 31 enter the packet checking module 35; the packet checking module 35 checks whether the Ethernet MAC DA, Ethernet MAC SA, Ethernet length or frame type, novel network destination address DA, novel network source address SA, novel network packet type and packet length of the data packets meet a requirement, if yes, a corresponding stream identifier (stream-id) will be allocated; then, the MAC deleting module 40 removes the MAC DA, the MAC SA and the length or frame type (2 byte), and puts it into a corresponding receive buffer, otherwise, it will be discarded;

The downlink network interface module 31 checks the sending buffer of the port, if there exists a packet, it acquires the Ethernet MAC DA of the corresponding terminal according to the novel network destination address DA of the packet, adds the Ethernet MAC DA of the terminal, the MAC SA of the Ethernet protocol conversion gateway and the Ethernet length or frame type, and sends it out.

The function of other modules in the Ethernet protocol conversion gateway is similar to that of the access switch.

Terminal:

The terminal mainly comprises a network interface module, a service processing module and a CPU module; for example, a set-top box mainly comprises a network interface module, a video and audio coding/decoding engine module and a CPU module; a code plate mainly comprises a network interface module, a video and audio coding engine module and a CPU module; and a storage mainly comprises a network interface module, a CPU module and a disk array module.

1.3 The device on the metropolitan area network part may be mainly divided into 2 categories: a node server, a node switch and a metropolitan area server. Wherein, the node switch mainly includes a network interface module, a switching engine module and a CPU module; the metropolitan area server mainly comprises a network interface module, a switching engine module and a CPU module.

2. The definition of novel network data packet 2.1 The definition of access network data packet The access network data packet mainly includes the following parts: destination address (DA), source address (SA), reserved byte, payload (PDU) and CRC.

As shown by the table below, the access network data packet mainly includes the following parts:

| DA | SA | Reserved | Payload | CRC |
|---|---|---|---|---|

Wherein:

Destination address (DA) is consisted of 8 bytes, wherein the first byte represents packet type (for example, protocol packet, multicast data packet and unicast data packet, etc.), and there are 256 possibilities at most; the second byte to the sixth byte represent metropolitan area network address: the seventh byte and the eighth byte represent access network address;

Source address (SA) is also consisted of 8 bytes, the definition of which is the same as that of destination address (DA);

Reserved byte is consisted of 2 bytes;

The payload part has different lengths according to different types of datagrams, if it is a protocol packet, it has a length of 64 bytes; if it is a unicast or multicast data packet, it has a length of 32+1024=1056 bytes; however, it is not limited to the above two cases;

CRC is consisted of 4 bytes, and the calculation method thereof conforms to standard Ethernet CRC algorithm.

2.2 The definition of metropolitan area network data packet

The topology of a metropolitan area network is a pattern type, and there are two or even more than two connections between two devices; that is, there may be more than two connections between a node switch and a node server, between a node switch and a node switch and between a node switch and a node server. However, the metropolitan area network address of a metropolitan area network device is unique. In order to accurately describe the connection relation between metropolitan area network devices, the following parameter is introduced in the embodiments of the invention: label, for uniquely describe a metropolitan area network device.

The definition of the label in this specification is similar to that of the label in Multi-Protocol Label Switch (MPLS). It is hypothesized that two connections exist between device A and device B, then a data packet will have two labels from device A to device B, and a data packet will have two labels from device B to device A, too. The label is divided into IN label and OUT label. It is hypothesized that the label of a data packet when it enters device A (IN label) is 0x0000, then the label of the data packet when it leaves device A (OUT label) will become 0x0001. The network access process on the metropolitan area network is a network access process that is controlled centralizedly, which means that the address allocation and label allocation of the metropolitan area network are both dominated by the metropolitan area server, and the node switch and the node server only execute passively. This is different from the label allocation in MPLS, wherein the label allocation in MPLS is a mutual negotiation result of the switch and the server.

As shown by the table below, a data packet on the metropolitan area network mainly includes the following parts:

| DA | SA | Reserved | Label | Payload | CRC |
|----|----|----------|-------|---------|-----|

That is, destination address (DA), source address (SA), reserved byte (Reserved), label, payload (PDU) and CRC. Wherein, for the format of label, reference may be made to the following definition: Label is consisted of 32 bits, wherein the high 16 bits are reserved, and only the low 16 bits are used; Label lies between reserved byte and payload of a data packet.

3. The implementation of the novel network

The network access process of a node server and an access switch and the network access process of a node server and a terminal will be discussed below. In order to simplify the design, four types of data packets are defined on the access network, respectively:

downlink protocol packet (a protocol packet sent from a node server to an access switch or a terminal);

uplink protocol packet (a protocol packet replied by an access switch or a terminal to a node server);

unicast data packet; and multicast data packet;

A access network address is consisted of 16 bits, so the total number of access switches and terminals that can be accessed will be 65536. It is hypothesized that the datagram type of the downlink protocol packet is "1000 0000" (binary system), i.e., 0x80 (hexadecimal system), then the datagram type of the uplink protocol packet will be "0000 1000" (binary system), i.e., 0x08 (hexadecimal system), the datagram type of the unicast data packet will be "0001 0000" (binary system), i.e., 0x10 (hexadecimal system), the datagram type of the multicast data packet will be "0111 1000" (binary system), i.e., 0x78 (hexadecimal system); by combining like terms, an address table with a length of 8 bits may be mapped to an address table with a length of 2 bits, for example:

"1000 0000"=>"00", the address table of a downlink protocol packet, which is defined in the embodiments of the invention as table 0;

"0000 1000"=>"01", the address table of an uplink protocol packet, which is defined as table 1 in the embodiments of the invention;

"0001 0000"=>"10", the address table of a unicast data packet, which is defined as table 2 in the embodiments of the invention;

"0111 1000"=>"11", the address table of a multicast data packet, which is defined as table 3 in the embodiments of the invention.

In conjunction with the 16-bit access network address, in practice, it only needs four address tables of 64K=4×65536, that is, 256K. The output of the address table represents the port to which a data packet is to be oriented. For example, access switch BX-008 has 1 uplink 100M network interface, 8 downlink 100M network interfaces and 1 CPU module interface. If the 8 downlink 100M network interfaces are in turn defined as port 0 to port 7, the CPU module interface is defined as port 8, and the uplink 100M network interface is defined as port 9, then an address table of totally 256K×10 bit will be needed, for example, the output "00 0000 0001" of the address table represents port 0 to which a data packet is to be oriented, "11 0000 0000" represents port 8 and port 9 to which a data packet is to be oriented, and so on.

It is hypothesized that a data packet coming from port 9 has a destination address (DA) of 0x8056 0x1500 0x0000 0x55aa, then its packet type will be 0x80, and its access network address will be 0x55aa; according to a table lookup rule, table 0 will be looked up, that is, the address is "00 0101 0101 1010 1010", and the output of the address table corresponding to this address will be "01 0000 0000", which represents that the data packet is to be oriented to port 8.

Figure 4:
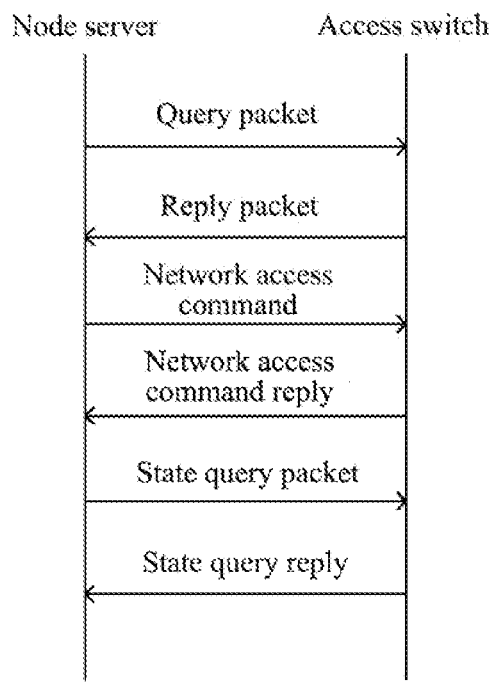
FIG. 4 is a schematic diagram showing the network access process of an access switch according to the invention.

3.1 The Network Access Process of an Access Network Device 3.1.1 The Network Access Process of an Access Switch Firstly, each access switch that is allowed to access the network must be registered on the node server, and an access switch that is not registered will be unable to access the network. As shown in FIG. 4, the process in which the access switch accesses the network relates to the following steps:

S1) A node server sends a query packet to each port, and after the access switch receives the query packet, it sends a reply packet, which contains the registration information of the current access switch;

S2) After the node server receives the reply packet issued by the access switch, it will know the port under which an access switch is connected, then the information of the access switch is found in an internal registration information table of the node server, a network access command is sent to the access switch (informing it of the access network address), and after the access switch receives the network access command, it accesses the network and sends a network access command reply to the node server simultaneously;

S3) After the node server receives the network access command reply issued by the access switch, it will know that the access switch has accessed the network, then a state query packet is sent to the port periodically to check whether the access switch works normally, and at the same, a port query packet is sent to the downlink port of the access switch to check whether other access network devices are connected under the access switch. If the current access switch works normally, it will send a state query reply to the node server after receiving a device state query instruction. When no state query reply is received by the node server in a certain period of time, it will be considered that the access switch has been removed from the network, and no state query packet will be sent any longer, instead, it continues to send a query packet to the current port.

Figure 5:
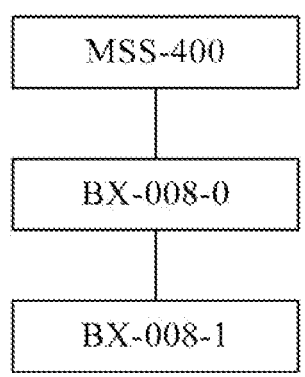
FIG. 5 is a schematic diagram showing the connection between a node server and an access switch according to the invention.

3.1.2 An Example of Interaction Between the Node Server and the Access Switch During a Network Access Process For easy description, it is hypothesized that the node server is not connected with the node switch, and the network access process on the metropolitan area network is neglected. For convenient discussion, it is hypothesized that the node server has 8 downlink 100M network interfaces in turn defined as port 0 to port 7, 1 CPU module interface defined as port 8, 1 disk array module interface defined as port 9 and 1 uplink 1000M fiber interface defined as port 10, and the type of this node server is MSS-400. As shown in FIG. 5, port 0 of MSS-400 is connected with BX-008-0, and port 1 of BX-008-0 is connected with BX-008-1.

S1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of a switch and the registration information of a terminal, etc.), and server MSS-400 configures its own access network address as 0x0000;

S2) Server MSS-400 initializes tables 0, 1, 2 and 3:
configuring table 0 as "000 0000 0000", i.e., all query packet transmission is closed;
configuring table 1 as "001 0000 0000", i.e., all reply packets are to be oriented to the CPU:
configuring tables 2 and 3 as "000 0000 0000", i.e., all unicast or multicast data packet transmission is closed;

S3) Server MSS-400 knows that it has 8 downlink ports, so it configures the 8 items of table 0 respectively as:
"00 0000 0000 0000 0001"=>"000 0000 0001", i.e., a query packet with a destination address (DA) of 0x8000 0x0000 0x0000 0x0001 is oriented to port 0;
"00 0000 0000 0000 0010"=>"000 0000 0010", i.e., a query packet with a destination address (DA) of 0x8000 0x0000 0x0000 0x0002 is oriented to port 1;
"00 0000 0000 0000 0011"=>"000 0000 0100", i.e., a query packet with a destination address (DA) of 0x8000 0x0000 0x0000 0x0003 is oriented to port 2;
"00 0000 0000 0000 0100"=>"000 0000 1000", i.e., a query packet with a destination address (DA) of 0x8000 0x0000 0x0000 0x0004 is oriented to port 3;
"00 0000 0000 0000 0101"=>"000 0001 0000", i.e., a query packet with a destination address (DA) of 0x8000 0x0000 0x0000 0x0005 is oriented to port 4;
"00 0000 0000 0000 0110"=>"000 0010 0000", i.e., a query packet with a destination address (DA) of 0x8000 0x0000 0x0000 0x0006 is oriented to port 5;
"00 0000 0000 0000 0111"=>"000 0100 0000", i.e., a query packet with a destination address (DA) of 0x8000 0x0000 0x0000 0x0007 is oriented to port 6;
"00 0000 0000 0000 1000"=>"000 1000 0000", i.e., a query packet with a destination address (DA) of 0x8000 0x0000 0x0000 0x0008 is oriented to port 7;

S4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007 and 0x8000 0x0000 0x0000 0x0008 (with an SA of 0x0000 0x0000 0x0000 0x0000), and according to the configuration of table 0, the query packets will be in turn oriented to ports 0 to 7;

S5) After switches BX-008-0 and BX-008-1 are powered on, they initializes the hardware:
configuring table 0 "00 xxxx xxxx xxxx xxxx" as "01 0000 0000", i.e., all query packets are oriented to the CPU;
configuring table 1 "01 xxxx xxxx xxxx xxxx" as "10 0000 0000", i.e., all reply packets are oriented to an uplink 100M network interface;
configuring tables 2 and 3 as "000 0000 0000", i.e., all unicast or multicast data packet transmission is closed;

S6) After switch BX-008-0 receives a query packet, it receives the query packet to its CPU module according to the configuration of its table 0, and the CPU resolves the query packet and generates a reply packet (which contains the registration information of the current switch), and sends it to server MSS-400, wherein the DA of the reply packet is 0x0800 0x0000 0x0000 0x0000, and the SA is 0x0000 0x0000 0x0000 0x0001;

S7) After server MSS-400 receives the reply packet issued by switch BX-008-0, it will know that port 0 thereof is connected with an access switch by contrasting the source address (SA) of the reply packet to the device type, then the information of the access switch is found in an internal registration information table of the node server, and a network access command is sent to the access switch (informing that the access network address thereof is 0x0001);

S8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; at the same time, a network access command reply (network access command reply packet) is sent to server MSS-400;

S9) After server MSS-400 receives the network access command reply issued by switch BX-008-0, it will know that switch BX-008-0 has accessed the network, and then a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:
"00 0000 0000 0000 1001"=>"000 0000 0001", i.e., a port downlink protocol packet with a destination address (DA) of 0x8000 0x0000 0x0000 0x0009 is oriented to port 0;
"00 0000 0000 0000 1010"=>"000 0000 0001", i.e., a port downlink protocol packet with a destination address (DA) of 0x8000 0x0000 0x0000 0x000a is oriented to port 0;

"00 0000 0000 0000 1011"=>"000 0000 0001", i.e., a port downlink protocol packet with a destination address (DA) of 0x8000 0x0000 0x0000 0x000b is oriented to port 0;

"00 0000 0000 0000 1100"=>"000 0000 0001". i.e. a port downlink protocol packet with a destination address (DA) of 0x8000 0x0000 0x0000 0x000c is oriented to port 0;

"00 0000 0000 0000 1101"=>"000 0000 0001", i.e., a port downlink protocol packet with a destination address (DA) of 0x8000 0x0000 0x0000 0x000d is oriented to port 0;

"00 0000 0000 0000 1110"=>"000 0000 0001", i.e., a port downlink protocol packet with a destination address (DA) of 0x8000 0x0000 0x0000 0x000e is oriented to port 0;

"00 0000 0000 0000 1111"=>"000 0000 0001", i.e., a port downlink protocol packet with a destination address (DA) of 0x8000 0x0000 0x0000 0x000f is oriented to port 0;

"00 0000 0000 0001 0000"=>"000 0000 0001", i.e., a port downlink protocol packet with a destination address (DA) of 0x8000 0x0000 0x0000 0x00 10 is oriented to port 0;

Server MSS-400 will notify change BX-008-0 to perform the following configurations in its table 0 via a port allocation packet containing port allocation information:

"00 0000 0000 0000 0000 1001"=>"00 0000 0001", i.e., a port downlink protocol packet with a destination address (DA) of 0x8000 0x0000 0x0000 0x0009 is oriented to port 0;

"00 0000 0000 0000 1010"=>"00 0000 0010", i.e., a port downlink protocol packet with a destination address (DA) of 0x8000 0x0000 0x0000 0x000a is oriented to port 1;

"00 0000 0000 0000 1011"=>"00 0000 0100", i.e., a port downlink protocol packet with a destination address (DA) of 0x8000 0x0000 0x0000 0x000b is oriented to port 2;

"00 0000 0000 0000 1100"=>"00 0000 1000", i.e., a port downlink protocol packet with a destination address (DA) of 0x8000 0x0000 0x0000 0x000c is oriented to port 3;

"00 0000 0000 0000 1101"=>"00 0001 0000", i.e., a port downlink protocol packet with a destination address (DA) of 0x8000 0x0000 0x0000 0x000d is oriented to port 4;

"00 0000 0000 0000 1110"=>"00 0010 0000", i.e., a port downlink protocol packet with a destination address (DA) of 0x8000 0x0000 0x0000 0x000e is oriented to port 5;

"00 0000 0000 0000 1111"=>"00 0100 0000", i.e., a port downlink protocol packet with a destination address (DA) of 0x8000 0x0000 0x0000 0x000f is oriented to port 6;

"00 0000 0000 0001 0000"=>"00 1000 0000", i.e., a port downlink protocol packet with a destination address (DA) of 0x8000 0x0000 0x0000 0x0010 is oriented to port 7;

S10) Server MSS-400 sends port downlink protocol packets with destination addresses (DA) of 0x8000 0x0000 0x0000 0x0009, 0x8000 0x0000 0x000a, 0x8000 0x0000 0x0000 0x000b, 0x8000 0x0 0x0000 0x000c, 0x8000 0x0000 0x0000 0x000d, 0x8000 0x0000 0x0000 0x000e, 0x8000 0x0000 0x0000 0x000f and 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; and the port downlink protocol packets will be in turn oriented to ports 0 to 7 of switch BX-008-0 according to the configuration of table 0 on switch BX-008-0;

S11) After switch BX-008-1 receives a port downlink protocol packet (i.e., a port downlink protocol packet with a destination address of 0x8000 0x0000 0x0000 0x000a) from port 1 of switch BX-008-0, it sends a port uplink protocol packet (which contains the registration information of the current switch), wherein DA of the packet is 0x0800 0x0000 0x0000 0x0000, and SA is 0x0000 0x0000 0x0000 0x000a;

S12) After server MSS-400 receives the port uplink protocol packet issued by switch BX-008-1 and contrasts the source address (SA) of the uplink protocol packet and the device type, it will know that port 1 of BX-008-0 is connected with an access switch, and then the information of the switch is found in the internal registration information table of the server, and a network access command is sent to the access switch (informing that the access network address thereof is 0x000a);

S13) After switch BX-008-1 receives the network access command and knows that its own access network address is 0x000a, it accesses the network, then its table 0 "00 0000 0000 0000 1010" is configured as "01 0000 0000", and the remaining items of table 0 are configured as "00 0000 0000", that is, only the downlink protocol packet of the current switch is imported to the CPU; and at the same time, a network access command reply is sent to the server;

S14) After server MSS-400 receives the network access command reply issued by the switch, it will know that switch BX-008-1 has accessed the network, and then a device state query instruction is sent to the port each second to check whether switch BX-008-1 works normally; and at the same, a port downlink protocol packet is sent to the downlink port of switch BX-008-1 to check whether other access network devices are connected under the current access switch. If the current access switch works normally, it will send a state query reply to the server after receiving a device state query instruction. When the server does not receive a state query reply in 6 seconds, it will be considered that the access switch has been removed from the network, and no device state query instruction will be sent any longer; instead, it continues to send a query packet to the current port.

3.1.3 The Network Access Process of a Terminal

Figure 6:
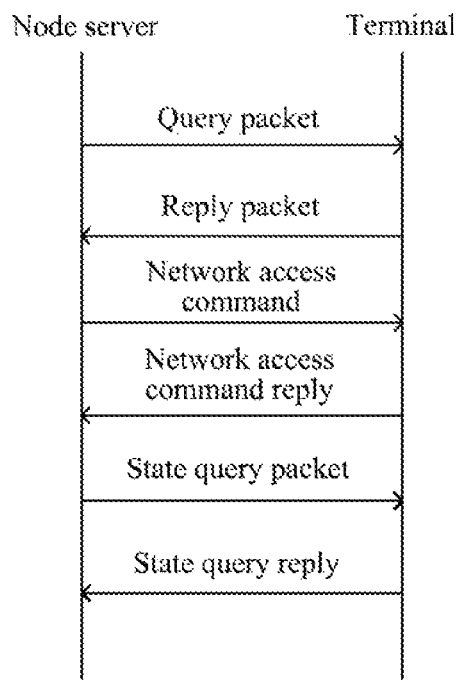
FIG. 6 is a schematic diagram showing the network access process of a terminal according to the invention.

Firstly, each terminal that is allowed to access the network must be registered on the node server, and a terminal that is not registered will be unable to access the network. As shown in FIG. 6, the process in which a terminal accesses the network relates to the following steps:

S1) A node server sends a query packet to each port, and after the terminal receives the query packet, it sends a reply packet, which contains the registration information of a terminal;

S2) After the node server receives the reply packet issued by the terminal, it will know what terminal (set-top box, code plate or storage) is connected under which port, then the information of the terminal is found in an internal registration information table of the node server, and a network access command is sent to the terminal (informing the access network address of the terminal), and after the terminal receives the network access command, it accesses the network and sends a network access command reply to the node server simultaneously;

S3) After the node server receives the network access command reply issued by the terminal, it will know that the current terminal has accessed the network, then a state query packet is sent to the port periodically to check whether the terminal works normally. If the terminal works normally, after it receives the state query packet, it will send a state query reply to the node server. When no state query reply is received by the node server in a certain period of time, it will be considered that the current terminal has been removed from the network, and no state query packet will be sent any longer, instead, it continues to send a query packet to the current port.

3.1.4 An Example of the Interaction Between a Node Server and an Access Switch, a Terminal During a Network Access Process:

The access network address may be set as 16 bits, and all access network devices have a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used. "01" represents that the address is standby (the node server uses the address to issue a port downlink protocol packet, but no network access uplink protocol packet is received), and "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, the access network address of a device connected with its network port and the uplink and downlink flow count of each of its network ports, if the device is an access switch; the access network address of a device connected with its network port and the uplink, the count of its read and write channels and uplink and downlink flow count of its network port, if the device is a storage; and so on. All the information is used to provide a decision-making foundation to the service process, and the information will be modified during each service process.

Figure 7:
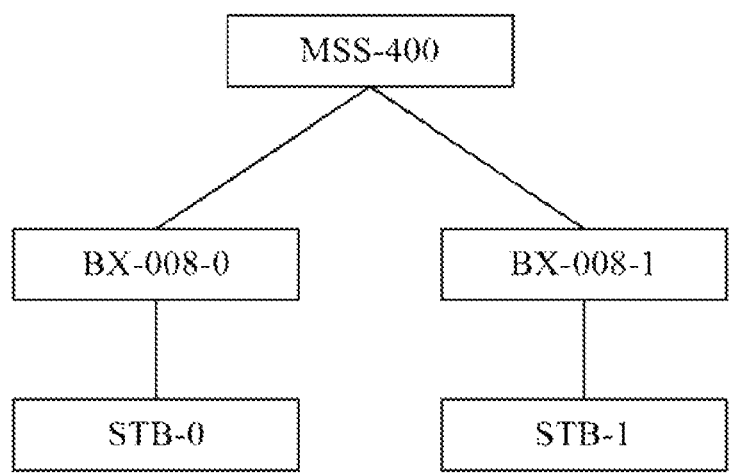
FIG. 7 is a schematic diagram showing the connection among a node server, an access switch and a terminal according to the invention.

As shown in FIG. 7, it is hypothesized that there exists a node server MSS-400, port 0 thereof is connected with an access switch BX-008-0, port 1 thereof is connected with an access switch BX-008-1, and port 0 of BX-008-0 is connected with a set-top box STB-0, port 1 of BX_008-1 is connected with a set-top box STB-1.

S1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of a switch and the registration information of a terminal, etc.), server MSS-400 initializes the address information table and clears all items (which represents that no address is used), and server MSS-400 configures its own access network address as 0x0000, that is, item 0x0000 of the address information table is configured as follows:
  address occupation descriptor: "10" represents that the address is used;
  device descriptor. "000000" represents node server;
  device resource description information: the node server has 8 downlink 100M network interfaces in turn defined as port 0 to port 7, 1 CPU module interface defined as port 8, 1 disk array interface defined as port 9 and 1 uplink 1000M fiber interface defined as port 10, and the type of this node server is MSS-400, the access network address of a device connected with its network port is not allocated, and downlink flow count of each of its network ports is 0;
  the next available address of the address information table is 0x0001;

S2) Server MSS-400 initializes tables 0, 1, 2 and 3:
  configuring table 0 as "000 0000 0000", i.e., the transmission of all downlink protocol packets is closed;
  configuring table 1 as "001 0000 0000", i.e., all uplink protocol packets are oriented to the CPU;
  configuring tables 2 and 3 as "000 0000 0000", i.e., all unicast or multicast data packet transmission is closed;

S3) Server MSS-400 knows that it has 8 downlink ports and the next available address is 0x0001, so it configures the 8 items of table 0 respectively as:
  "00 0000 0000 0000 0001"=>"000 0000 0001", i.e., a query packet with a destination address (DA) of 0x8000 0x0000 0x0000 0x0001 is oriented to port 0;
  "00 0000 0000 0000 0010"=>"000 0000 0010", i.e., a query packet with a destination address (DA) of 0x8000 0x0000 0x0000 0x0002 is oriented to port 1;
  "00 0000 0000 0000 0011"=>"000 0000 0100", i.e., a query packet with a destination address (DA) of 0x8000 0x0000 0x0000 0x0003 is oriented to port 2;
  "00 0000 0000 0000 0100"=>"000 0000 1000", i.e., a query packet with a destination address (DA) of 0x8000 0x0000 0x0000 0x0004 is oriented to port 3;
  "00 0000 0000 0000 0101"=>"000 0001 0000", i.e., a query packet with a destination address (DA) of 0x8000 0x0000 0x0000 0x0005 is oriented to port 4;
  "00 0000 0000 0000 0110"=>"000 0010 0000", i.e., a query packet with a destination address (DA) of 0x8000 0x0000 0x0000 0x0006 is oriented to port 5;
  "00 0000 0000 0000 0111"=>"000 0100 0000", i.e., a query packet with a destination address (DA) of 0x8000 0x0000 0x0000 0x0007 is oriented to port 6;
  "00 0000 0000 0000 1000"=>"000 1000 0000", i.e., a query packet with a destination address (DA) of 0x8000 0x0000 0x0000 0x0008 is oriented to port 7;

S4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x0000 0x0000 0x0008 (with an SA of 0x0000 0x0000 0x0000 0x0000), and according to the configuration of its table 0, the query packets will be in turn oriented to ports 0 to 7; at this point, items 0x0001 to 0x0008 of the address information table are configured as:
  address occupation descriptor: "01" represents that the address is standby;
  device descriptor: it will not be modified;
  device resource description information: it will not be modified;
The next available address of the address information table is 0x0009:

S5) After switches BX-008-0 and BX-008-1 are powered on, they initializes the hardware:
  configuring its table 0 "00 xxxx xxxx xxxx xxxx" as "01 0000 0000", i.e., all downlink protocol packets are oriented to the CPU;
  configuring its table 1 "01 xxxx xxxx xxxx xxxx" as "10 0000 0000", i.e., all uplink protocol packets are oriented to the uplink 100M network interface;
  configuring its tables 2 and 3 as "00 0000 0000", i.e., all unicast or multicast data packet transmission is closed;

S6) After switch BX-008-0 receives a query packet, it receives the query packet to its CPU module according to the configuration of its table 0, the CPU module resolves the query packet and generates a reply packet (which contains the registration information of the current access switch) and sends it to server MSS-400, wherein DA of the packet is 0x0800 0x0000 0x0000 0x0000, and SA is 0x0000 0x0000 0x0000 0x0001;

S7) After server MSS-400 receives the reply packet issued by switch BX-008-0 and contrasts the source address (SA) of the reply packet and the device type, it will know that its port 0 is connected with an access switch, then the information of the access switch is found in an internal registration information table of the node server, and a network access command is sent to the access switch (informing that the access network address thereof is 0x0001);

S8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; and at the same time, a network access command reply is sent to the server;

S9) After server MSS-400 receives the network access command reply issued by switch BX-008-0, it will know that switch BX-008-0 has accessed the network, then item 0x0001 of the internal address information table of the server is configured as:
- address occupation descriptor: "10" represents that the address is used;
- device descriptor: "000001" represents an access switch BX-008;
- device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port is not allocated, and downlink flow count of each of its network ports is 0;

then, a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:

"00 0000 0000 0000 1001"=>"000 0000 0001", i.e., a port downlink protocol packet with a destination address (DA) of 0x8000 0x0000 0x0000 0x0009 is oriented to port 0;

"00 0000 0000 0000 1010"=>"000 0000 0001", i.e., a port downlink protocol packet with a destination address (DA) of 0x8000 0x0000 0x0000 0x000a is oriented to port 0;

"00 0000 0000 0000 1011"=>"000 0000 0001". i.e. a port downlink protocol packet with a destination address (DA) of 0x8000 0x0000 0x0000 0x000b is oriented to port 0;

"00 0000 0000 0000 1100"=>"000 0000 0001", i.e., a port downlink protocol packet with a destination address (DA) of 0x8000 0x0000 0x0000 0x000c is oriented to port 0;

"00 0000 0000 0000 1101"=>"000 0000 0001", i.e., a port downlink protocol packet with a destination address (DA) of 0x8000 0x0000 0x0000 0x00d is oriented to port 0;

"00 0000 0000 0000 1110"=>"000 0000 0001", i.e., a port downlink protocol packet with a destination address (DA) of 0x8000 0x0000 0x0000 0x000e is oriented to port 0;

"00 0000 0000 0000 1111"=>"000 0000 0001", i.e., a port downlink protocol packet with a destination address (DA) of 0x8000 0x0000 0x0000 0x000f is oriented to port 0;

"00 0000 0000 0001 0000"=>"000 0000 0001", i.e., a port downlink protocol packet with a destination address (DA) of 0x8000 0x0000 0x0000 0x0010 is oriented to port 0;

Server MSS-400 will notify change BX-008-0 to perform the following configurations in its table 0 via a port allocation packet containing port allocation information:

"00 0000 0000 0000 1001"=>"00 0000 0001", i.e., a port downlink protocol packet with a destination address (DA) of 0x8000 0x0000 0x0000 0x0009 is oriented to port 0;

"00 0000 0000 0000 1010"=>"00 0000 0010", i.e., a port downlink protocol packet with a destination address (DA) of 0x8000 0x0000 0x0000 0x000a is oriented to port 1;

"00 0000 0000 0000 1011"=>"00 0000 0100", i.e., a port downlink protocol packet with a destination address (DA) of 0x8000 0x0000 0x0000 0x000b is oriented to port 2;

"00 0000 0000 0000 1100"=>"00 0000 1000", i.e., a port downlink protocol packet with a destination address (DA) of 0x8000 0x0000 0x0000 0x000c is oriented to port 3;

"00 0000 0000 0000 1101"=>"00 0001 0000", i.e., a port downlink protocol packet with a destination address (DA) of 0x8000 0x0000 0x0000 0x000d is oriented to port 4;

"00 0000 0000 0000 1110"=>"00 0010 0000", i.e., a port downlink protocol packet with a destination address (DA) of 0x8000 0x0000 0x0000 0x000e is oriented to port 5;

"00 0000 0000 0000 1111"=>"00 0100 0000", i.e., a port downlink protocol packet with a destination address (DA) of 0x8000 0x0000 0x0000 0x000f is oriented to port 6;

"00 0000 0000 0001 0000"=>"00 1000 0000", i.e., a port downlink protocol packet with a destination address (DA) of 0x8000 0x0000 0x0000 0x0010 is oriented to port 7;

S10) Server MSS-400 sends port downlink protocol packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f, 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0: moreover, items 0x0009 to 0x0010 of the address information table on server MSS-400 are configured as:
- address occupation descriptor: "01" represents that the address is standby;
- device descriptor: it will not be modified;
- device resource description information: it will not be modified:

The next available address is 0x0011;

S11) After STB-0 receives a port downlink protocol packet from port 0 of switch BX-008-0 (i.e., a port downlink protocol packet with a destination address of 0x8000 0x0000 0x0000 0x0009), it sends a port uplink protocol packet (which contains the registration information of the current terminal), wherein DA of the packet is 0x0800 0x0000 0x0000 0x0000, and SA is 0x0000 0x0000 0x0000 0x0009 (port 0 of the switch);

S12) After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);

S13) After STB-0 receives the network access command and knows that its own access network address is 0x0009, it accesses the network and sends a network access command reply to the server simultaneously;

S14) After server MSS-400 receives the network access command reply issued by STB-0, it will know that switch STB-0 has accessed the network, then item 0x0009 of the address information table is configured as:
- address occupation descriptor: "10" represents that the address is used;
- device descriptor: "000011" represents a terminal;
- device resource description information: the terminal has a video and audio coding/decoding engine and a 100M network interface, the type of the terminal is STB, the access network address of a device connected with its network port is 0x0001 (i.e., BX-008-0), and the downlink flow count of its network port is 0;

Item 0x0001 of the address information table is configured as:
- address occupation descriptor: it will not be modified;
- device descriptor: it will not be modified;
- device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and downlink flow count of each of its network ports is 0;

Then, server MSS-400 sends a device state query instruction to the port each second to check whether STB-0 works normally, when the server does not receive a state query reply in 6 seconds, it will be considered that STB-0 has been removed from the network, and no device state query instruction will be sent any longer; instead, it continues to send a query packet to the current port.

Referring to the above steps S6-S14, BX-008-1 may also access the network and obtain its access network address as 0x0002; and STB-1 may also access the network and obtain its access network address as 0x0012.

3.1.5 The Definition of Data Format During the Network Access Process of an Access Network Device:

The information interaction mode between the user terminal and the server is PDU, and both use Raw Socket to transfer PDU, the data format of which is as follows:

| Destination Address | Source Address | Reserved Byte | PDU |
|---|---|---|---|
| 4W | 4W | 2BYTE | 32W or 528W |

3.2 Communication Connection Process of an Access Network Device 3.2.1 An Example of the Communication Connection Process in which an Access Network Device Performs a Unicast Communication Service.

As shown in FIG. 7, it is hypothesized that there exists a node server MSS-400 (with an access network address of 0x0000), port 0 thereof is connected with an access switch BX-008-0 (with an access network address of 0x0001), port 1 thereof is connected with an access switch BX-008-1 (with an access network address of 0x0002), and port 0 of BX-008-0 is connected with a set-top box STB-0 (with an access network address of 0x0009), port 1 of BX_008-1 is connected with a set-top box STB-1 (with an access network address of 0x0012). Set-top box STB_0 issues a request to node server MSS-400 for performing a unicast communication service of visual communication with set-top box STB_1, in the following steps:

S1) Set-Top box STB_0 issues a service request protocol packet, the DA (destination address) of the packet is 0x0800 0x0000 0x0000 0x0000 (i.e. the address of MSS-400), and the SA (source address) is 0x0000 0x0000 0x0000 0x0009; the packet may further comprise reserved 0x0000 (reserved word), and the PDU part is as shown in the following table:

| 8e01 Field Number | Length | Code | Description |
|---|---|---|---|
| 0 | 1W | 8e01 | user request instruction (source terminal→node server) |
| 1 | 1W | | service type (service_type) |
| 2-4 | 3W | | user number (source terminal number) |
| 5 | 1W | | user extension number (source terminal extension number) |
| 6-31 | 26W | | service parameter (0 is added to an unoccupied part) |

The program number and the broadcast channel number related to the service request are both put in the service parameter, for example:

define SERVICE_TYPE_GTML_REQUEST 0x8000, requesting for a menu
define SERVICE_TYPE_VOD_REQUEST 0x8001, requesting for a VOD program
define SERVICE_TYPE_CHANGE_MENU 0x8002, requesting for changing background menu
define SERVICE_TYPE_BROADCAST_REQUEST 0x8003, requesting for watching broadcast
define SERVICE_TYPE_CHANGE_CHANNEL 0x8004, requesting for changing channel
define SERVICE_TYPE_TELEPHONE_DIRECT 0x8005, requesting for sending a videophone
define SERVICE_TYPE_PERMISSION 0x8006, an reply of whether access is permitted
define SERVICE_TYPE_RECORD_REQUEST 0x8007, requesting for recording define SERVICE_TYPE_END_REQUEST 0x8008, requesting for ending the current service define SERVICE_TYPE_ORG_CAST_REQUEST 0x8009, requesting for originating a living broadcast define SERVICE_TYPE_DDB_REQUEST 0x800b, requesting for watching delayed TV define SERVICE_TYPE_SKIP 0x800c, fast forward, fast rewind, pause and continue during the processing of watch a VOD or delayed TV define SERVICE_TYPE_RECORD_END 0x800e, requesting for ending recording define SERVICE_TYPE_VIEW_Monitor_DIRECT 0x8024, requesting for watching monitor define SERVICE_TYPE_RCV_CAST_DIRECT 0x8025, requesting for watching living broadcast define SERVICE_TYPE_TELEPHONE_REQUEST 0, requesting for sending a videophone define SERVICE_TYPE_RCV_CAST_REQUEST 0xa, requesting for watching living broadcast define SERVICE_TYPE_VIEW_Monitor 0xc, requesting for watching monitor

In this example, the service parameter is SERVICE_TYPE_TELEPHONE_REQUEST or SERVICE_TYPE_TELEPHONE_DIRECT.

S2) According to the configuration of table 1 on access switch BX-008-0 connected between set-top box STB_0 and node server MSS-400, the service request protocol packet is oriented to node server MSS-400, and node server MSS-400 determines that a request for visual communication (service type) is received according to the content of the packet, knows that the called terminal (target terminal) is STB_1 by looking up in a CAM table (content-address mapping table) according to the service number, knows the link topology related to the current service according to its internal address information table, and determines that the link is permitted and communication may be established between the two parts. Then, a menu protocol packet is sent respectively to the calling party (STB_0) and the called party (STB_1), and it waits the called party to reply;

Wherein, menu protocol packet sent to STB_0: DA is 0x8000 0x0000 0x0000 0x0009, SA is 0x0000 0x0000 0x0000 0x0000, reserved is 0x0000, and PDU part is as shown in the following table:

| Field Number | Length | Code | Description |
| --- | --- | --- | --- |
| 0 | 1W | 3900 | data download instruction |
| 1 | 1W | | data type (0=null, 1=gtml 2=gtmlfodder 3=set-top box program 4=start menu 5=bmp 100=dsp program on gateway 101=dsp program of 008) |
| 2 | 1W | | reserved |
| 3 | 1W | | number of valid packets |
| 4 | 1W | | sequence number of the current packet |
| 5 | 1W | | length of valid data in the current packet |
| 6-14 | 9W | | reserved |
| 15-526 | 512W | | data |
| 527 | 1W | | CRC (summarization of 512 data) | menu protocol packet sent to STB_1: DA is 0x8000 0x0000 0x0000 0x0012, SA is 0x0000 0x0000 0x0000 0x0000, reserved is 0x0000, and PDU part is as shown in the above table.

S3) According to the configuration of table 0 on node server MSS-400 and the configuration of table 0 on access switches BX-008-0 and BX-008-1, these 2 menu protocol packets will be respectively oriented to set-top boxes STB_0 and STB_1, the called STB_1 issues a request SERVICE_TYPE_PERMISSION for accepting the communication from STB_1 and sends a reply protocol packet to node server MSS-400, wherein DA the reply protocol packet is 0x0800 0x0000 0x0000 0x0000, SA is 0x0000 0x0000 0x0000 0x0012, reserved is 0x0000, service parameter is SERVICE_TYPE_PERMISSION, and PDU part is as shown in the following table:

| 8e01 Field Number | Length | Code | Description |
| --- | --- | --- | --- |
| 0 | 1W | 8e01 | user request instruction (target terminal→node server) |
| 1 | 1W | | service type (service_type) |
| 2-4 | 3W | | user number (source terminal number) |
| 5 | 1W | | user extension number (source terminal extension number) |
| 6-31 | 26W | | service parameter (SERVICE_TYPE_ PERMISSION) |

S4) According to the configuration of table 1 on access switch BX-008-1, the reply protocol packet is oriented to node server MSS-400, and node server MSS-400 determines that a request for accepting visual communication is received according to the content of the packet, knows that the called party is STB_1 by looking up in a CAM table according to the service number, and node server MSS-400 knows the link topology related to the current service according to its internal address information table, and determines that the link is permitted and communication may be established between the two parts.

In such a case, node server MSS-400 configures its own table 2 as follows:

"10 0000 0000 0001 0010"=>"000 0000 0010", i.e., a unicast data packet with a destination address (DA) of 0x1000 0x0000 0x0000 0x0012 (i.e., set-top box BX-008-1) is oriented to port 1;

"10 0000 0000 0000 1001"=>"000 0000 0001", i.e., a unicast data packet with a destination address (DA) of 0x1000 0x0000 0x0000 0x0009 (i.e., set-top box BX-008-0) is oriented to port 0;

Moreover, node server MSS-400 sends a port configuration command to all access switches on the uplink (the calling path) and the downlink (the called path), for requesting to open the uplink of the address of the opposite party and the downlink of the address of its own simultaneously.

The two packets sent to access switch BX-008-0:

1) the first packet: DA is 0x8000 0x0000 0x0000 0x0001, SA is 0x0000 0x0000 0x0000 0x0000, reserved is 0x0000, and PDU part is as shown in the following table:

| 8b54 Field Number | Length | Code | Description |
| --- | --- | --- | --- |
| 0 | 1W | 8b54 | port configuration command of access switch (node server→access switch) |
| 1 | 1W | | device type (BX-008) |
| 2-5 | 4W | | address of port to be opened: 0x1000 0x0000 0x0000 0x0012 |
| 6 | 1W | | operation mode: "10 0000 0000", which represents that uplink port 9 is opened |
| 7-10 | 4W | | 0000 |
| 11 | 1W | | data type 0x10 |
| 12 | 1W | | access switch address (access network address) 0x0001 |

-continued

| 8b54 Field Number | Length | Code | Description |
|---|---|---|---|
| 13-15 | 3W | | device flag of access switch |
| 16-31 | 18W | | 0000 |

2) the second packet: DA is 0x8000 0x0000 0x0000 0x0001. SA is 0x0000 0x0000 0x0000 0x0000, reserved is 0x0000, and PDU part is as shown in the following table:

| 8b54 Field Number | Length | Code | Description |
|---|---|---|---|
| 0 | 1W | 8b54 | port configuration command of access switch (node server→access switch) |
| 1 | 1W | | device type (BX-008) |
| 2-5 | 4W | | address of port to be opened: 0x1000 0x0000 0x0000 0x0009 |
| 6 | 1W | | operation mode: "00 0000 0001", which represents that port 0 is opened |
| 7-10 | 4W | | 0000 |
| 11 | 1W | | data type 0x10 |
| 12 | 1W | | access switch address (access network address) 0x0001 |
| 13-15 | 3W | | device flag of access switch |
| 16-11 | 18W | | 0000 |

Two packets sent to access switch BX-008-1:

1) the first packet: DA is 0x8000 0x0000 0x0000 0x0002, SA is 0x0000 0x0000 0x0000 0x0000, reserved is 0x0000 and PDU part is as shown in the following table:

| 8b54 Field Number | Length | Code | Description |
|---|---|---|---|
| 0 | 1W | 8b54 | port configuration command of access switch (node server→access switch) |
| 1 | 1W | | device type (BX-008) |
| 2-5 | 4W | | address of port to be opened: 0x1000 0x0000 0x0000 0x0009 |
| 6 | 1W | | operation mode: "10 0000 0000", which represents that uplink port 9 is opened |
| 7-10 | 4W | | 0000 |
| 11 | 1W | | data type 0x10 |
| 12 | 1W | | access switch address (access network address) 0x0002 |
| 13-15 | 3W | | device flag of access switch |
| 16-31 | 18W | | 0000 | the second packet: DA is 0x8000 0x0000 0x0000 0x0002, SA is 0x0000 0x0000 0x0000 0x0000, reserved is 0x0000, and PDU part is as shown in the following table:

| 8b54 Field Number | Length | Code | Description |
|---|---|---|---|
| 0 | 1 | 8b54 | port configuration command of access switch (node server→access switch) |
| 1 | 1W | | device type (BX-008) |
| 2-5 | 4W | | address of port to be opened: 0x1000 0x0000 0x0000 0x0012 |
| 6 | 1 | | operation mode: "00 0000 0010", which represents that port 1 is opened |
| 7-10 | 4W | | 0000 |
| 11 | 1W | | data type 0x10 |

| 8b54 Field Number | Length | Code | Description |
|---|---|---|---|
| 12 | 1W | | access switch address (access network address) 0x0002 |
| 13-15 | 3W | | device flag of access switch |
| 16-31 | 18W | | 0000 |

Packet sent to set-top box STB-0 (service processing command, and coding/decoding command in this example):

wherein, DA is 0x8000 0x0000 0x0000 0x0000 0x0009, SA is 0x0000 0x0000 0x0000 0x0000, reserved is 0x0000, and PDU part is as shown in the following table:

| 8704 Field Number | Length | Code | Description |
|---|---|---|---|
| 0 | 1W | 8704 | coding/decoding command (node server→source terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 1W | | 0x1000 0x0000 0x0000 0x0012 |
| 19-22 | 4W | | 0x1000 0x0000 0x0000 0x0009 |
| 23 | 1W | | 0xffff=maintaining the original state |
| 24 | 1W | | 0=alarm shut down |
| 25 | 1W | | 0xffff=maintaining the original state |
| 26 | 1W | | 0xffff=maintaining the original state |
| 27-31 | 5W | | 0 |

Packet sent to STB-1 (service processing command, and coding/decoding command in this example):

wherein, DA is 0x8000 0x0000 0x0000 0x0012, SA is 0x0000 0x0000 0x0000 0x0000, reserved is 0x0000, and PDU part is as shown in the following table:

| 8704 Field Number | Length | Code | Description |
|---|---|---|---|
| 0 | 1W | 8704 | coding/decoding command (node server → target terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0009 |
| 19-22 | 4W | | 0x1000 0x0000 0x0000 0x0012 |
| 23 | 1W | | 0xffff=maintaining the original state |
| 24 | 1w | | 0=alarm shut down |
| 25 | 1W | | 0xffff=maintaining the original state |
| 26 | 1W | | 0xffff=maintaining the original state |
| 27-31 | 5w | | 0 |

In the PDU of the above coding/decoding command, Field Number 13 represents coding type: 0=stopping coding, 0ffff=maintaining the original state, 0xfffe=returning data decoded, without coding locally; Field Number 14 represents decoding type: 0=stopping decoding, 0ffff=maintaining the original state; Field Number 15-18 represents coding address (DA or multicast address): 0xffff=maintaining the original state; Field Number 19-22 represents decoding address (DA or multicast address): 0xffff=maintaining the original state; Field Number 23 represents: HB: coded HDA, LB: decoded HAD; 0xffff=maintaining the original state; Field Number 24 represents alarm parameter: 0=alarm shut down, 1=alarm enabled, 0xffff=maintaining the original state; Field Number 25 represents holder operating parameter: 0xffff=maintaining the original state; Field Number 26 represents auxiliary channel operating parameter: 0xffff=maintaining the original state.

Wherein, the coding type is as shown in the following table:

| Code | Video Compression | Video System | Audio Compression | Flow Level |
|---|---|---|---|---|
| 0x3215 | MPEG4 | PAL | MP3 | 1.7M |
| 0x3217 | MPEG4 | PAL | MP3 | 3.3M |
| 0x3218 | MPEG4 | PAL | MP3 | 6.6M |

S5) According to the configuration of table 0 on node server MSS-400 and the configuration of table 0 on access switch BX-008-0 and BX-008-1, the above 4 packets sent to the access switch will be respectively oriented to BX-008-0 and BX-008-1.

In such a case, access switch BX-008-0 configures its own table 2 as follows:

"10 0000 0000 0001 0010"=>"10 0000 0000", i.e., a unicast data packet with a destination address (DA) of 0x1000 0x0000 0x0000 0x0012 is oriented to port 9;

"10 0000 0000 0000 1001"=>"00 0000 0001", i.e., a unicast data packet with a destination address (DA) of 0x1000 0x0000 0x0000 0x0009 is oriented to port 0;

Access switch BX-008-1 configures its own table 2 as follows:

"10 0000 0000 0000 0001 0010"=>"00 0000 0010", i.e., a unicast data packet with a destination address (DA) of 0x1000 0x0000 0x0000 0x0012 is oriented to port 1;

"10 0000 0000 0000 1001"=>"10 0000 0000", i.e., a unicast data packet with a destination address (DA) of 0x1000 0x0000 0x0000 0x0009 is oriented to port 9;

According to the configuration of table 0 on node server MSS-400 and the configuration of table 0 on access switch BX-008-0 and BX-008-1, the latter 2 packets sent to the set-top box will be respectively oriented to set-top boxes STB-0 and STB-1. After receiving the packet, set-top boxes STB-0 and STB-1 may start coding/decoding according to the content of the packet, and receive and send unicast data.

Specifically, after the communication link of the current service is configured, the process in which set-top boxes STB-0 and STB-1 receive and send unicast data based on the communication link is as follows:

1) Set-top box STB-0 sends a unicast data packet to set-top box STB-1, wherein DA of the packet is 0x1000 0x0000 0x0000 0x0012, and SA is 0x0000 0x0000 0x0000 0x0009;

2) The unicast data packet enters access switch BX-008-0, and the switching engine module of access switch BX-008-0 looks up in table 2 according to a combined address field, wherein the table address is "10 0000 0000 0001 0010", the output of the item is "10 0000 0000" ("10 0000 0000 0001 0010"=>"10 0000 0000", i.e., a unicast data packet with a destination address (DA) of 0x100 0x0000 0x0000 0x0000 0x0012 is oriented to port 9), which represents that uplink port 9 is opened, and the current unicast data packet enters node server MSS-400 via port 9;

3) After node server MSS-400 receives the unicast data packet, its switching engine looks up in table 2 according to a combined address field, wherein the table address is "10 0000 0000 0001 0010", the output of the item is "000 0000 0010" ("10 0000 0000 0001 0010"=>"000 0000 0010", i.e., a unicast data packet with a destination address (DA) of 0x1000 0x0000 0x0000 0x0012 is oriented to port 1), which represents that downlink port 1 is opened, and the current unicast data packet enters access switch BX-008-1 via port 1;

4) After access switch BX-008-1 receives the unicast data packet, its switching engine module looks up in table 2 according to a combined address field, wherein the table address is "10 0000 0000 0001 0010", the output of the item is "00 0000 0010" ("10 0000 0000 0001 0010"=>"00 0000 0010", i.e., a unicast data packet with a destination address (DA) of 0x1000 10x0000 0x0000 0x0000 0x0012 is oriented to port 1), which represents that downlink port 1 is opened, and the current unicast data packet enters set-top box STB-1 via port 1;

Set-top box STB-1 sends a unicast data packet to set-top box STB-0, wherein DA of the packet is 0x1000 0x0000 0x0000 0x0009, and SA is 0x0000 0x0000 0x0000 0x0012;

6) The unicast data packet enters access switch BX-008-1, and the switching engine module of access switch BX-008-1 looks up in table 2 according to a combined address field, wherein the table address is "10 0000 0000 0000 1001", the output of the item is "10 0000 0000" ("10 0000 0000 0000 1001"=>"10 0000 0000", i.e., a unicast data packet with a destination address (DA) of 0x1000 0x0000 0x0000 0x0009 is oriented to port 9), which represents that uplink port 9 is opened, and the current unicast data packet enters node server MSS-400 via port 9;

7) After node server MSS-400 receives the unicast data packet, its switching engine looks up in table 2 according to a combined address field, wherein the table address is "10 0000 0000 0000 1001", the output of the item is "000 0000 0001" ("10 0000 0000 0000 1001"=>"000 0000 0001", i.e., a unicast data packet with a destination address (DA) of 0x1000 0x0000 0x0000 0x0000 0x0009 is oriented to port 0), which represents that downlink port 0 is opened, and the current unicast data packet enters access switch BX-008-0 via port 0;

8) After access switch BX-008-0 receives the unicast data packet, its switching engine module looks up in table 2 according to a combined address field, wherein the table address is "10 0000 0000 0000 1001", the output of the item is "00 0000 0001" ("10 0000 0000 0000 1001"=>"00 0000 0001", i.e., a unicast data packet with a destination address (DA) of 0x1000 0x0000 0x0000 0x0009 is oriented to port 0), which represents that downlink port 0 is opened, and the current unicast data packet enters set-top box STB-0 via port 0.

An simple example in which unicast service communication is realized in the above process:

It is hypothesized that STB-0 requests to server MSS-400 for sending a videophone to STB-1, and the service request packet sent by STB-0 to MSS-400 contains the type of the service requested (which is videophone in this example, so it contains the number of the opposite party, for example, 8888 8888 8888)

After server MSS-400 receives the service request packet, it checks the service type and knows that the service type is videophone, and then it skips to the videophone service process; according to the number of the opposite party (8888 8888 8888), server MSS-400 may obtain the access network address of STB-1 (because at the time STB-1 accesses the network, server MSS-400 will update the content of CAM and update address 0x0012 to 8888 8888 8888) by looking up in the CAM: the topology information of STB-0 and STB-1 may be known by looking up in the address information table according to the access network address of STB-0 and STB-1, and from 0x0009, it may be know that STB-0 is connected with Port 0 of BX-008-0, and the uplink and downlink flow is 0, the link flow is 100 Mbit/s; the access network address of BX-008-0 is 0x0001, and it may be known by looking up in the address information table that BX-008-0 is connected with port 0 of MSS-400, the uplink and downlink flow is 0, and the link flow is 100 Mbit/s; the link flow information of STB-1 may be known by the same token, and the uplink and downlink bandwidth that requests for videophone is 2 Mbit/s, which meets the requirement; and then other information is checked, if it meets the requirement, the server opens the paths directed to said 2 paths of unicast data of all switches between the called set-top box and the calling set-top box (including address matching and accurate flow control on Port 0 of BX-008-0 and Port 1 of BX-008-1), the link flow information for looking up in the address information table is modified, and the server sends a coding/decoding command to the two parties of set-top boxes.

3.2.2 an Example of the Communication Connection Process in which an Access Network Device Performs Multicast Communication Service:

As shown in FIG. 7, it is hypothesized that there exists a node server MSS-400 (with an access network address of 0x0000), and port 0 thereof is connected with an access switch BX-008-0 (with an access network address of 0x0001), port 1 thereof is connected with an access switch BX-008-1 (with an access network address of 0x0002), and port 0 of BX-008-0 is connected with a set-top box STB-0 (with an access network address of 0x0009), the number of STB_0 is 0x6666 0x6666 0x6666, port 1 of BX_008-1 is connected with a set-top box STB-1 (with an access network address of 0x0012), and the number of STB_1 is 0x8888 0x8888 0x8888. Set-top box STB_0 requests to node server MSS-400 for initiating living broadcast in the following steps:

S1) Set-top box STB_0 issues a service request protocol packet for initiating living broadcast, wherein DA of the packet is 0x0800 0x0000 0x0000 0x0000, SA is 0x0000 0x0000 0x0000 0x0009, reserved is 0x0000 (reserved word), and the PDU part is as shown in the following table:

| 8e01 Field Number | Length | Code | Description |
| --- | --- | --- | --- |
| 0 | 1W | 8e01 | terminal request instruction (terminal → node server) |
| 1 | 1W | | service type (service_type) |
| 2-4 | 3W | | terminal number (number of requestor) 0000 |
| 5 | 1W | | terminal extension number (extension number of requestor) 0000 |
| 6-31 | 26W | | #define SERVICE_TYPE_ORG_CAST_REQUEST 0x8009, requesting for originating a living broadcast |

S2) According to the configuration of table 1 on access switch BX-008-0 connected between set-top box STB_0 and node server MSS-400, the service request protocol packet is oriented to node server MSS-400, the service request protocol packet is oriented to node server MSS-400, node server MSS-400 determines that a request for initiating living broadcast (service type) is received according to the content of the packet, knows that the user (source terminal) is STB_0 by looking up in a CAM table (content-address mapping table) according to the service number, and knows the link topology related to the current service according to its internal address information table, and it determines that the link is permitted and living broadcast may be initiated, then it allocates a multicast address of 0x0008. Moreover, the node server sends a port configuration command to all access switches on the current communication link for requesting to open the uplink of the address of the opposite party and the downlink of the address of its own simultaneously. At this point, it knows that only access switch BX-008-0 needs to be configured at present by link topology determination.

In such a case, the node server MSS-400 sends a packet to access switch BX-008-0:

wherein, DA is 0x8000 0x0000 0x0000 0x0001, SA is 0x0000 0x0000 0x0000 0x0000, reserved is 0x0000 (reserved word), and the PD part is as shown in the following table:

| 8b54 Field Number | Length | Code | Description |
| --- | --- | --- | --- |
| 0 | 1W | 8b54 | port configuration command of access switch (node server -> access switch) |
| 1 | 1W | | device type (BX-008) |
| 2-5 | 4W | | 0x7800 0x0000 0x0000 0x0008 |
| 6 | 1W | | "00 0000 0001", which represents that port 0 is opened |
| 7-10 | 4W | | 0000 |
| 11 | 1W | | data type 0x78 |

| 8b54 Field Number | Length | Code | Description |
|---|---|---|---|
| 12 | 1W | | access switch address (access network address) 0x0001 |
| 13-15 | 3W | | device flag of access switch |
| 16-31 | 18W | | 0000 |

Node server MSS-400 sends a packet to set-top box STB-0 (service processing command, and coding/decoding command in this example):

wherein, DA is 0x8000 0x0000 0x0000 0x0009, SA is 0x0000 0x0000 0x0000 0x0000, reserved is 0x0000, and PDU part is as shown in the following table:

| 8704 Field Number | Length | Code | Description |
|---|---|---|---|
| 0 | 1W | 8704 | coding/decoding command (node server → set-top box) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x7800 0x0000 0x0000 0x0008 |
| 19-22 | 4W | | 0x7800 0x0000 0x0000 0x0008 |
| 23 | 1W | | 0xffff=maintaining the original state |
| 24 | 1w | | 0=alarm shut down |
| 25 | 1W | | 0xffff=maintaining the original state |
| 26 | 1W | | 0xffff=maintaining the original state |
| 27-31 | 5w | | 0 |

S3) According to the configuration of table 0 on node server MSS-400, the packet sent to access switch BX-008-0 will be oriented to BX-008-0. In such a case, BX-008-0 configures its own table 3 as follows:

"11 0000 0000 0000 1000"=>"00 0000 0001", i.e. a multicast data packet with a destination address (DA) of 0x7800 0x0000 0x0000 0x0008 is oriented to port 0;

S4) According to the configuration of table 0 on node server MSS-400 and the configuration of table 0 on access switch BX-008-0, the packet sent to set-top box STB-0 will be oriented to STB-0. STB-0 starts coding/decoding according to the content of the packet, and starts receiving and sending multicast data.

Specifically, the process in which set-top box STB-0 initiates a communication link to receive and send multicast data based on the current living broadcast is as follows:

1) Set-top box STB-0 issues a multicast data packet, wherein DA of the packet is 0x7800 0x0000 0x0000 0x0008 (multicast address), and SA is 0x0000 0x0000 0x0000 0x0009;

2) The multicast data packet enters access switch BX-008-0, the switching engine module of access switch BX-008-0 looks up in table 3 according to a combined address field, wherein the table address is "11 0000 0000 0000 1000", the output of the item is "00 0000 0001" ("11 0000 0000 0000 1000"=>"00 0000 0001", i.e., a multicast data packet with a destination address (DA) of 0x7800 0x0000 0x0000 0x0008 is oriented to port 0), which represents that downlink port 0 is opened, and the current multicast data packet enters set-top box STB-0 via port 0.

Set-top box STB_1 requests to node server MSS-400 for watching living broadcast in the following steps, with a number of 0x6666 0x6666 0x6666:

S1) Set-top box STB_1 issues a service request protocol packet for watching living broadcast, wherein DA of the packet is 0x0800 0x0000 0x0000 0x0000, SA is 0x0000 0x0000 0x0000 0x00 12, reserved is 0x0000, and PDU part is as shown in the following table:

| 8e01 Field Number | Length | Code | Description |
|---|---|---|---|
| 0 | 1W | 8e01 | user request instruction (terminal → node server) |
| 1 | 1W | | service type (service_type) |
| 2-4 | 3W | | terminal number (number of requestor) 0x6666 0x6666 0x6666 |
| 5 | 1W | | terminal extension number (extension number of requestor) 0000 |
| 6-31 | 26W | | #define SERVICE_TYPE_RCV_CAST_DIRECT 0x8025, requesting for watching living broadcast |

S2) According to the configuration of table 1 on access switch BX-008-1 connected between set-top box STB_1 and node server MSS-400, the service request protocol packet is oriented to node server MSS-400, and node server MSS-400 determines that a request for watching living broadcast is received according to the content of the packet, knows that the initiator (source terminal) is STB_0 by looking up in a CAM table according to the service number, and knows the link topology related to the current service according to its internal address information table, and it determines that the link is permitted and living broadcast may be watched, then it allocates a multicast address (corresponding to the multicast address allocated to the source terminal) of 0x0008. Moreover, the node server sends a port configuration command to all access switches on the current communication link for requesting to open the uplink of the address of the opposite party and the downlink of the address of its own simultaneously. In such a case, node server MSS-400 configures its own table 3 as follows:

"11 0000 0000 0000 1000"=>"000 0000 0010", i.e., a multicast data packet with a destination address (DA) of 0x7800 0x0000 0x0000 0x0008 is oriented to port 1;

At the same time, node server MSS-400 sends a packet to access switch BX-008-O:

wherein, DA is 0x8000 0x0000 0x0000 0x0001, SA is 0x0000 0x0000 0x0000 0x0000, reserved is 0x0000, and PDU part is as shown in the following table:

| 8b54 Field Number | Length | Code | Description |
|---|---|---|---|
| 0 | 1W | 8b54 | port configuration command of access switch (node server → access switch) |
| 1 | 1W | | device type (BX-008) |
| 2-5 | 4W | | 0x7800 0x0000 0x0000 0x0008 |
| 6 | 1W | | "10 0000 0001", which represents that port 9 is opened |
| 7-10 | 4W | | 0000 |
| 11 | 1W | | data type 0x78 |
| 12 | 1W | | access switch address (access network address) 0x0001 |
| 13-15 | 3W | | device flag of access switch |
| 16-31 | 18W | | 0000 |

At the same time, node server MSS-400 sends a packet to access switch BX-008-1:

Wherein, DA is DA is 0x8000 0x0000 0x0000 0x0002, SA is 0x0000 0x0000 0x0000 0x0000, reserved is 0x0000, and PDU part is as shown in the following table:

| 8b54 Field Number | Length | Code | Description |
|---|---|---|---|
| 0 | 1W | 8b54 | port configuration command of access switch (node server → access switch) |
| 1 | 1W | | device type (BX-008) |
| 2-5 | 4W | | 0x7800 0x0000 0x0000 0x0008 |
| 6 | 1W | | "00 0000 0010" represents port 1 |
| 7-10 | 4W | | 0000 |
| 11 | 1W | | data type 0x78 |
| 12 | 1W | | access switch address (access network address) 0x0002 |
| 13-15 | 3W | | device flag of access switch |
| 16-31 | 18W | | 0000 |

At the same time, node server MSS-400 sends a packet to set-top box STB-1:

Wherein, DA is DA is 0x8000 0x0000 0x00000 0x0012, SA is 0x0000 0x0000 0x0000 0x0000, reserved is 0x0000 and PDU part is as shown in the following table:

| 8704 Field Number | Length | Code | Description |
|---|---|---|---|
| 0 | 1W | 8704 | coding/decoding command (node server → terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0 |
| 14 | 1W | | 0x3217 |
| 15-18 | 4W | | 0xffff |
| 19-22 | 4W | | 0x7800 0x0000 0x0000 0x0008 |
| 23 | 1W | | 0xffff=maintaining the original state |
| 24 | 1w | | 0=alarm shut down |
| 25 | 1W | | 0xffff=maintaining the original state |
| 26 | 1W | | 0xffff=maintaining the original state |
| 27-31 | 5w | | 0 |

S3) According to the configuration of table 0 on node server MSS-400, the packets sent to access switches BX-008-0 and BX-008-1 will be respectively oriented to access switches BX-008-0 and BX-008-1.

In such a case, access switch BX-008-0 configures its own table 3 as follows:

"11 0000 0000 0000 1000"=>"10 0000 0001", i.e., a multicast data packet with a destination address (DA) of 0x7800 0x0000 0x0000 0x0008 is oriented to port 0 and port 9;

Access switch BX-008-1 configures its own table 3 as follows:

"11 0000 0000 0000 1000"=>"00 0000 0010", i.e. a multicast data packet with a destination address (DA) of 0x7800 0x0000 0x0000 0x0008 is oriented to port 1;

S4) According to the configuration of table 0 on node server MSS-400 and the configuration of table 0 on access switch BX-008-1, the packet sent to set-top box STB-1 will be oriented to STB-1. STB-1 receives multicast data and decodes the data according to the content of the packet.

Specifically, the process in which set-top box STB-1 receives multicast data based on the current communication link on which living broadcast is watched is as follows:

1) Set-top box STB-0 issues a multicast data packet, wherein DA of the packet is 0x7800 0x0000 0x0000 0x0008 (multicast address), and SA is 0x0000 0x0000 0x0000 0x0009;

2) The multicast data packet enters access switch BX-008-0, the switching engine module of access switch BX-008-0 looks up in table 3 according to a combined address field, wherein the table address is "11 0000 0000 0000 1000", the output of the item is "10 0000 0001" ("11 0000 0000 0000 1000"=>"10 0000 0001", i.e., a multicast data packet with a destination address (DA) of 0x7800 0x0000 0x0000 0x0008 is oriented to port 0 and port 9), which represents that downlink port 0 and uplink port 9 are opened, and the current multicast data packet enters set-top box STB-0 via port 0, and enters node server MSS-400 via port 9;

3) After node server MSS-400 receives the multicast data packet, its switching engine module looks up in table 3 according to a combined address field, wherein the table address is "11 0000 0000 0000 1000", the output of the item is "000 0000 0010" ("11 0000 0000 0000 1000"=>"000 0000 0010", i.e., a multicast data packet with a destination address (DA) of 0x7800 0x0000 0x0000 0x0008 is oriented to port 1), and the current multicast data packet enters access switch BX-008-1 via port 1;

4) After access switch BX-008-1 receives the multicast data packet, its switching engine module looks up in table 3 according to a combined address field, wherein the table address is "11 0000 0000 0000 1000", the output of the item is "00 0000 0010" ("11 0000 0000 0000 1000"=>"00 0000 0010", i.e., a multicast data packet with a destination address (DA) of 0x7800 0x0000 0x0000 0x0008 is oriented to port 1), which represents that downlink port 1 is opened, and the current multicast data packet enters set-top box STB-1 via port 1.

However, the above unicast service communication process and multicast service communication process are only examples. In practice, it is feasible to perform any unicast service communication or multicast service communication by employing the embodiments of the invention.

For one skilled in the art to better understand the invention, several examples in which service communication is performed by employing the embodiments of the invention will be provided below.

3.2.3 An Example of the Service Process of an Access Network 3.2.3.1 Broadcast Interaction Process There are two types of terminal devices related to broadcast process: code plate (broadcast source), and set-top box (the party that watches broadcast).

After a code plate accesses the network via a network access process, the node server will send a command that indicates the code plate to start coding. Each code plate codes a path of broadcast data.

Start Watching:

After entering the broadcast process, firstly, a set-top box issues a request command, and after the node server receives the request command from the set-top box, it knows that the set-top box wants to watch broadcast, and moreover, it knows which path of broadcast the set-top box wants to watch. At this point, the node server finds the route between the code plate and the set-top box. A command is sent to all switches on the route, and the paths directed to this path of broadcast data of all switches between the code plate and the set-top box are opened; at the same time, a decoding command is sent to the set-top box. Then, the set-top box may watch broadcast.

Stop Watching:

The set-top box issues a stop command, and after the node server receives the stop command from the set-top box, it find the route between the code plate and the set-top box, the paths directed to this path of broadcast data of all switches between the code plate and the set-top box are shut down pertinently (it is possible that a switch on the route has other set-top boxes that are watch the current broadcast, so it cannot shut down all the paths directly); at the same time, a stop decoding command is sent to the set-top box, and a last page menu is sent for the set-top box to return to the menu.

It should be noted that: the broadcast data received by the set-top box is totally the same as the broadcast data issued by the code plate.

3.2.3.2 VOD Interaction Process

There are two types of terminal devices related to VOD process: storage (program source), and set-top box (the party that watches VOD".

Start Watching:

After entering VOD process, firstly, a set-top box issues a request command, which gives the VOD program number. After the node server receives the request command from the set-top box, it knows that the set-top box wants to watch VOD, and moreover, it knows which program the set-top box wants to watch. It may be looked up in the internal information table of the node server that on which storage is the current program stored.

Because after the set-top box accesses the network, the address will be fixed; the VOD data watched are unicast data, and the data address will be the address of the set-top box.

The node server sends a disk reading command to the storage (which contains the program number and the unicast data address) to indicate the storage to send unicast data. If the storage finds that the program exists on the current storage, it starts to send the program, and at the same time, it sends a disk reading command reply to the node server, which represents that the storage has started to send program.

After the node server receives the reply from the storage, it finds the route between the storage and the set-top box, and the paths directed to this path of unicast data of all switches between the storage and the set-top box are opened, and at the same time, a decoding command is sent to the set-top box. Then, the set-top box may watch the VOD.

Stop Watching:

The set-top box issues a stop command, and after the node server receives the stop command from the set-top box, it sends a stop disk reading command to the storage to indicate the storage to stop sending unicast data. The storage stops sending, and at the same time, it sends a stop disk reading command reply to the node server, which represents that the storage has stopped sending program.

After the node server receives the reply, it finds the route between the storage and the set-top box, and the paths directed to this path of unicast data of all switches between the storage and the set-top box are opened are shut down; at the same time, a stop decoding command is sent to the set-top box, and a last page menu is sent for the set-top box to return to the menu.

3.2.3.3 Visual Communication Interaction Process

Start Visual Communication:

The calling set-top box issues a request command, which contains the number of the called set-top box.

After the node server receives the request command from the set-top box, it first queries whether the called set-top box accesses the network, if the called set-top box does not access the network, it informs the calling set-top box that the request is failed.

If the called set-top box has accessed the network, it queries whether the called set-top box is idle; if the called set-top box is not idle, it informs the calling set-top box that the request is failed.

If the called set-top box has accessed the network and is in an idle state, the node server sends a call menu to the called set-top box and waits the called set-top box to reply. The called set-top box may select to accept or refuse, and a reply is sent to the node server.

The node server receives the reply from the called set-top box. If the reply is to refuse, it informs the calling set-top box that the request is failed.

If the reply is to accept, the node server sends a coding/decoding command to the two parties of set-top boxes. It is required by visual communication that the two parties of set-top boxes should code/decode simultaneously. The data are unicast data, the coding address is the address of the opposite party, and the decoding address is its own address.

The node server opens the paths directed to said 2 paths of unicast data of all switches between the called set-top box and the calling set-top box.

Stop Visual Communication

The called set-top box and the calling set-top box may both request to stop visual communication. After the node server receives the stop command from the set-top box, it shuts down the paths directed to said 2 paths of unicast data of all switches between the called set-top box and the calling set-top box. Then, it sends a stop coding/decoding command to the called set-top box and the calling set-top box respectively, and a last page menu is sent for the set-top boxes to return to the menu.

3.2.3.4 Living Broadcast Interaction Process

Initiate Living Broadcast

Data of living broadcast is also a path of broadcast data.

A set-top box issues a request command, and after the node server receives the request, it automatically allocates a path of broadcast data and sends a coding/decoding command to the set-top box; and at the same time, it instructs an upper-level switch of the current set-top box to open a path for this path of broadcast data. Then, the set-top box may watch the broadcast it initiates. The initiating party will be the watching party at the same time.

Watch Living Broadcast

A watching set-top box issues a request command, which contains the number of the party that initiates living broadcast. After the node server receives the request, it first queries whether the party that initiates living broadcast has accessed the network and whether it has initiated a living broadcast. If the conditions are not met, it informs the watching set-top box that the watch request is failed.

If the conditions are met, the node server finds the route between the party that initiates living broadcast and the watching set-top box, and it opens the paths directed to this path of broadcast data of all switches between the party that initiates living broadcast and the watching set-top box; at the same time, it sends a decoding command to the watching set-top box. Then, the set-top box may watch the living broadcast.

Stop Watching Living Broadcast

The watching set-top box issues a stop command, and after the node server receives the stop command from the watching set-top box, it finds the route between the party that initiates living broadcast and the watching set-top box, and the paths directed to this path of broadcast data of all switches between the party that initiates living broadcast and the watching set-top box are shut down pertinently (it is possible that a switch on the route has other set-top boxes that are watching the current living broadcast, so it cannot shut down all the paths directly); and at the same time, a stop decoding command is sent to the watching set-top box, and a last page menu is sent for the watching set-top box to return to the menu.

Stop Initiating Living Broadcast

The party that initiates living broadcast issues a stop command. After the node server receives the stop command, it first queries that how many users are watching the current living broadcast, and ends the process of all the users that are watching the living broadcast according to the stop watching process, and then it sends a stop coding/decoding command to the party that initiates living broadcast; at the same time, it indicates the upper-level switch of the current set-top box to shut down the path for this path of broadcast data.

3.2.3.5 In Addition to the Above Examples, the Following Service Communication Applications May also be Realized in the Embodiments of the Invention.

1. Controllable Broadcast

1) Broadcast And Restricted Broadcast: (Multicast Service)

Node Server maintains a broadcast operation table.

Broadcast Source: real-time analog encoder, real-time digital converter and stored programs.

Node Server, restricted broadcast viewer counter, new viewers will be rejected after it exceeds a set value.

Node Server carries out authentication of restricted broadcast user group.

After a user terminal enters watching, an OSD menu may be displayed according to HLP key, and the broadcast content may be stored into an individual mailbox.

Controllable broadcast may provide a service selectively to only a part of the users (for example, charged channel).

Controllable broadcast may count the audience rating at any moment (even viewer-classified audience rating).

Restricted broadcast: a wide price range may be set for thousands of broadcast channels according to different restricted values, which may be rented to commercial clients (advertisement and education, etc.) in large amounts.

2) Vote Feedback (which may be pay-per-view)

A media center MPC edits and records the content of OSD.

A node server periodically sends the content of OSD with the same address (DA) as the broadcast remote resource.

A user set-top box forwards the feedback value of a remote control according to the content of OSD displayed via HLP key.

A user proxy server receives the user feedback and user information table record (multicast DA, score and ballot).

The user proxy server searches in the user information table each second, and sends the user vote result to the node server.

Viewer Feedback Information: total participating man-time, ballot number and viewer rating (YES/NO or 5 points system) at each target point. The vote feedback on a broadcast channel may be used for designed questionnaire public-opinion poll and future star mass-election, etc.

2. VOD and MOD: (unicast service)

3) Process Operation of VOD

A node server edits and records a VOD confirmation content, which contains program information, price information and viewer feedback information).

After receiving a user request, the node server sends a VOD confirmation menu and the content of OSD.

A user set-top box forwards the feedback value of a remote control according to the content of OSD displayed via HLP key (program play location and rating prompt).

The user proxy server records the user information table, and sends the user rating result to the node server after VOD is ended.

The user set-top box performs play operation (pause/play, continuous fast forward/fast rewind, 15-minute forward/rewind).

Viewer Feedback Information: total click number, and viewer rating (5 points system).

VOD Service: the content may be mass media, or alternative media (TV Blog, professional education and product operation maintenance, etc.)

4) Kara-Ok:

It is the same as VOD, wherein audio employs independent double tracks.

5) TV Magazine (MOD):

A node server adds voiced text on demand and voiced picture on demand based on VOD.

The node server arranges or selects a plurality of media contents in an order.

6) Interactive Multimedia Website:

A user proxy server is equipped with a mailbox opened to the public for receiving picture, text and voice feedback from readers.

Interactive multimedia website may be a window of an enterprise or the government that is opened to the public (electronic government affairs).

3. TVOD (Controllable Broadcast+VOD): (Multicast+Unicast Service)

7) Centralized Monitoring:

A media center or a user proxy server MPC edits and maintains a monitor operation table, and it may be selected to switch on video recording periodically.

After a user terminal enters watching, it may store the monitor content into an individual mailbox according to an OSD menu displayed via HLP key.

Centralized monitoring may be applicable to large-scale remote monitoring, and a security service may be provided to a plurality of companies at the same time via user group separation.

8) TV Playback (Network TiVo):

A user proxy memory may store all the contents in recent 3-7 days of tens of channels.

After a user terminal enters watching, it may store the program content into an individual mailbox according to an OSD menu displayed via HLP key.

TV playback: A user may watch TV in VOD mode and select any program content in recent 7 days at any moment.

Well-Chosen Program

A media center MPC edits and maintains a well-chosen broadcast program table, classifies programs periodically and records automatically.

A user proxy memory may store all contents of tens of splendid programs in recent 60 days.

After a user terminal enters watching, it may store the program content into an individual mailbox according to an OSD menu displayed via HLP key.

Well-Chosen Program: TV programs are classified and stored automatically, and edited into a menu form for convenient watching by consumers.

4. Living Broadcast: (Multicast Service)

1) Simple Living Broadcast:

A user proxy server in living broadcast is the same as that in restricted broadcast.

The user proxy server may record a living broadcast content under the control of a living broadcast terminal.

Living Broadcast: viewers may be network-wide, and the broadcast source is set in the customer site.

2) Video Chat, Web Classroom and Citizen Hotline:

After entering a chat room, a participating-party terminal may request for video upload according to the content of OSD displayed via HLP key, and present flowers to an anchorman.

The anchoring-party user proxy server records the user request, and sends an OSD prompt to a living broadcast terminal.

A living broadcast-party terminal may display multiple video upload request OSDs, select a path to upload via a remote control, and automatically shut down the previous path.

The user proxy server sends a special charging packet to a running account when video upload is shut down.

The user proxy server records the flower presentation value of the user, notifies the living broadcast party, and sends a special charging packet to a running account when video upload is shut down.

After entering a chat room, a user presents flowers and participates in audio conversation; the cost for opening video conversation is automatically stored into an individual mailbox proportionally.

Video Chat: the image broadcasted by the anchorman at home (on site) may reach network-wide, the anchorman may see viewer requests and hear multiple viewer audios, but only 1 path of viewer image can be seen selectively.

A viewer obtains a chat room via a program table and dials in; the viewer may present flowers to the anchorman (charged additionally) and request for audio or video conversation.

3) Shopping Channel:

A living broadcast terminal or an MPC connected therewith maintains the shopping information (commodities and clients).

After entering a shopping channel, a user terminal displays an OSD order (commodity, specification, number and price) via HLP key.

The user terminal fills in and submits an order via a remote control.

After receiving the order, the user proxy server forwards it to a living broadcast-party terminal or an MPC connected therewith.

The living broadcast-party terminal or the MPC authenticates the order and returns the confirmed order to the user.

The user terminal displays the order again, and confirms via a remote control.

The user proxy server sends the user confirmation to the living broadcast party, and sends a special charging packet to a running account when video upload is shut down.

After a user terminal enters watching, it may store the shopping content into an individual mailbox according to an OSD menu displayed via HLP key.

MPC is a PC machine installed with special software for reinforcing the operating performance of a TV set-top box.

4) Auction Channel:

A living broadcast terminal or an MPC maintains the auction information (commodities and clients).

After entering an auction channel, a user terminal displays an OSD introduction (commodity, specification and selling price) via HLP key.

The user terminal fills in and submits a bid via a remote control.

After receiving the bid, the user proxy server forwards it to the living broadcast-party terminal or the MPC.

The living broadcast-party terminal or the MPC connected therewith authenticates the user bid and returns the confirmed bit to the user.

The user terminal displays the bid again and confirms via a remote control.

The user proxy server sends the user confirmation to the living broadcast party, and sends a special charging packet to a running account when video upload is shut down.

After a user terminal enters watching, it may store the auction content into an individual mailbox according to an OSD menu displayed via HLP key.

MPC is a PC machine installed with special software, which is connected directly with a terminal for reinforcing the operating performance of a TVset-top box.

5) Video Call Center:

A living broadcast-party terminal or an MPC connected therewith binds multiple paths of video chat to a number (or name) for resource sharing.

The video call center may be directly linked to a shopping channel or an auction channel for providing a subsequent service.

5. Conference (multiple paths of living broadcast bond together): (Multicast Service)

A conference initiating-party terminal or an MPC connected therewith edits and maintains a conference operation table, and realizes the binding of multiple paths of processes.

1) Speech on a General Meeting:

An initiating-party terminal directly controls the designated participating-party terminals, and shuts down the remote operation of the participating party in order to force it to participate passively.

Initiating-party speech is realized compulsively, and the participating party is forced to watch the speech.

The initiating-party terminal may watch any participating-party or designate it to speak without informing the participating party in advance.

Speech on a General Meeting is applicable to leader report, engineering event direction, and routine dispatch meeting between enterprise headquarters and remote subdivisions.

2) Classroom Teaching:

Any participating-party terminal may issue a speech request to the initiating-party terminal, and it may speak after being authorized by the initiating party.

Classroom teaching may realize a conference chat room, and the difference from living broadcast chat room lies in that: a living broadcast viewer always watches the supporter, while a conference chat viewer watches the speaker or watches the supporter and the speaker simultaneously via a multi-screen terminal.

3) Round-Table Discussion:

Any participating-party terminal may interrupt others and scrambles for speaking (without being interrupted for at least 10 seconds) by pressing a single ENTER key.

Round-table discussion may realize a conference chat room, and the difference from living broadcast chat room lies in that: a living broadcast viewer always watches the supporter, while a conference chat viewer watches the speaker or watches the supporter and the speaker simultaneously via a multi-screen terminal.

4) Multi-Screen Conference:

A user proxy server may insert a VOD.

A PBOX terminal must be used, which can display the initiating party (chairman), the speaker, the local meeting place, VOD or the screen of a PC simultaneously.

A conference mode, for example, general meeting speech, classroom teaching and round-table discussion, etc., may be selected.

5) TV Wall:

It may display the initiating party (chairman), the speaker, multiple branch meeting places, VOD or a PC screen at the same time.

A conference mode, for example, general meeting speech, classroom teaching and round-table discussion, etc., may be selected.

6. Video Telephone: (Unicast Service)

6) Ordinary Video Telephone:

A user proxy server maintains a telephone-number list, and it supports ordinary dialing and compulsive dialing.

After entering a conversation, a user terminal may store the communication content into a mailbox according to an OSD menu displayed via HLP key, and it may select or adjust the camera angle of the opposite party.

7) Collect Videophone (Video 800)

A number of this type starts with 800, which is free for users. The other aspects are the same as those of an ordinary videophone.

Collect videophone is applicable to advertisements, client services and commonweal service, etc.

8) Video Service Telephone (Video 900):

A number of this type starts with 900, the calling party is an ordinary user terminal, and the service charge thereof contains a high content fee (in seconds) in addition to communication fee. The other aspects are the same as those of an ordinary videophone.

The called party is a content provider (the content includes real-time communication, VOD and TV magazine).

9) Home Monitoring:

Home monitoring is a unidirectional communication that is realized via a user proxy server, and it may be performed with other services simultaneously so long as the video sending resources do not conflict with each other.

After dialing and entering the monitoring, a user terminal may store the monitoring content into a mailbox according to an OSD menu displayed via HLP key, and it may select multiple paths of cameras or adjust the camera angle of the opposite party.

A monitored terminal may set the monitoring right (that is, designating a group of numbers that are authorized to monitor, opening all numbers or barring all numbers).

Home monitoring is applicable to homes, small shops and bank branches, etc.

7. TV Mail and TV Blog: (Unicast Service)

10) Individual Network Storage

A user proxy server maintains the mailbox list of a user.

A user terminal uploads the content, including video, audio, picture and text, which is saved in the mailbox in the form of a draft and may be called out and viewed at any moment.

The upload content may be input via a USB port (which may be directly connected to a PC, a USB Disk and a removable hard disk, etc.).

11) Ordinary Video Mail:

A user terminal designates content in the mailbox, inputs the number of a sending object, and requests to send the mail.

The user proxy server issues a new mail notification to the sending object, but in fact, it does not forward the mail content. VOD operation is only executed when the receiving-party terminal watches the content.

If the receiving-party terminal requests to save the mail content for a long time, the content may be stored into the mailbox according to an OSD menu displayed via HLP key.

12) Short Message and Voice Message:

It will be processed like a video mail, and the content may be stored in a dedicated VDOS-SD storage device.

13) TV Blog:

The node server classifies and maintains a public large mailbox according to contents.

A user terminal uploads a mail to the public large mailbox of a media center (including user-defined price).

A media center MPC receives and authenticates the mail uploaded, converts it into VOD content, and registers and stores it into a Blog with a corresponding classification.

The node server maintains viewer feedback information, and maintains a VOD account bill.

If a receiving-party terminal requests to save the Blog content for a long time, the content may be stored into the mailbox according to an OSD menu displayed via HLP key.

A part of the content fee of TV Blog may be automatically transferred to the account of the content uploading party (department store mode).

8. Computer Network:

14) Internet Wideband Access

Due to the existence of an Ethernet gateway, a user may access the novel network at home via an ordinary Ethernet switch. Thus, a convergence of the Internet and the novel network may be realized by the user at home, and IP data may be connected to the public Internet.

Internet wideband access is applicable for consumers in decentralized communities.

15) Multimedia Computer Local Area Network:

Due to the existence of an Ethernet gateway, an enterprise may access the novel network via an ordinary Ethernet switch, thus a convergence of the Internet and the novel network may be realized by the enterprise.

Multimedia computer local area network is applicable for schools, enterprises and government offices.

9. Voice Telephone: (Multicast+Unicast Service)

Novel network telephone uses uncompressed PCM (G.711) directly, and it has a PSTN quality and low delay (transparent transmission FAX and Modem), but its functions ride over those of PSTN, and its cost is lower than that of IP telephone. It can meet the telephone service of all users by only occupying one percent of the bandwidth resources of the novel network.

16) Novel Network Telephone:

On-net calling of the novel network telephone: directly dialing the number of the novel network telephone.

Calling from the novel network to the PSTN network: 99+PSTN telephone number

Calling from the PSTN network to the novel network: 077+MP number (for 077 or other numbers, it cooperate with the telecommunication company).

After entering a conversation, if a user dials "***" continuously, the conversation content of the two parties will be stored into a mailbox automatically.

17) Recording Telephone:

A user may select: "if an incoming call is missed, automatically play a record in mailbox", then the call content will be recorded in the mailbox.

Monthly payment may be selected.

18) Voice Telephone Conference:

The node server is equipped with a dedicated multi-path speech synthesis device, which has clear tone colour and low delay.

A conference initiating party appoints the conference time, number of participants, corresponding numbers and off-net PSTN code, and overall recording may be selected.

The node server sends a short message notification (including conference number) to designated users.

The users dial the designated number in designated time and add in the telephone conference.

The node server automatically authenticates the time, the conference number and the user numbers, and it may automatically call the conference participating party.

19) Voice Automatic Service Center:

It is similar to the function of a multimedia website, except for being limited in voice. Generally, this function may be realized in an enterprise via 1 PC. This function can be automatically set for each user on the novel network, with no additional hardware required; and only a little monthly fee is charged.

Voice automatic service center is applicable to services such as weather, stocks, traffic, public service and client service, etc.

20) Voice Call Center:

An initiating-party terminal or an MPC connected therewith binds multiple paths of telephones to a number (or name) for resource sharing.

The initiating party may select overall recording.

21) Cable Music Broadcast Station:

It is similar to TV broadcast, except for being limited to music.

3.3 Convergence of the Novel Network of the Invention and the Existing Ethernet

In order to realize the convergence of the above novel network and the existing Ethernet and make full use of the functions of the existing Ethernet protocol conversion gateway at the same time, in the invention, the standard Ethernet gateway is reconstructed as a special-type access switch, which plays the role of connection and conversion between the novel network and the Ethernet. The reconstructed Ethernet gateway is referred to as Ethernet protocol conversion gateway. In the novel network, the Ethernet protocol conversion gateway lies on the access network part, and it may be connected with the access switch, or it may be directly connected with the node server. In the Ethernet, an Ethernet protocol conversion gateway is connected with an Ethernet switch (L2 switch, for short below), and the Ethernet switch is connected with a terminal.

In the invention, the data transmission between the novel network and the Ethernet mainly relates to the following 4 data types:

1) Query Packet: a protocol packet sent from a node server to an access switch, an Ethernet protocol conversion gateway or a terminal:

2) Reply Packet: a protocol packet replied by an access switch, an Ethernet protocol conversion gateway or a terminal to a node server;

3) Unicast Data packet; and

4) Multicast Data packet.

The Ethernet protocol conversion gateway mainly carries out the forwarding of the above 4 types of data between the novel network and the Ethernet, and the core implementation concept is as follows:

The Ethernet protocol conversion gateway accesses the novel network, and it obtains the MAC address of the Ethernet protocol conversion gateway and the terminal MAC address registered under the Ethernet protocol conversion gateway from the node server that has centralized control function. When the Ethernet protocol conversion gateway receives a data packet or a protocol packet sent from the novel network, it adds the MAC address of the Ethernet protocol conversion gateway and the MAC address of the target terminal into the data packet or the protocol packet and then sends it to the Ethernet, and data packet or the protocol packet is transmitted in the Ethernet via Ethernet protocol; when the Ethernet protocol conversion gateway receives the data packet or the protocol packet sent from the Ethernet, it removes the MAC address of the Ethernet protocol conversion gateway and the MAC address of the source terminal in the data packet or the protocol packet and then sends it to the novel network, and the data packet or the protocol packet is transmitted in the novel network via the novel network protocol.

Wherein, the target terminal and the source terminal conform to the novel network protocol. Thus, the target terminal and the source terminal not only can enter the Ethernet via the MAC address, but only can enter the novel network by conforming to the novel network protocol. Therefore, compatible transmission can be realized on two different types of networks.

In the novel network, a data structure conforming to the novel network protocol is defined (2.1 The definition of access network data packet). The above 4 data types (data packet or protocol packet) all conform to such a data structure.

It the target terminal and the source terminal want to conform to the novel network protocol, they must conform to the above data structures of the novel network. Therefore, for a data packet or protocol packet sent from the novel network to the target terminal and a data packet or protocol packet sent from the source terminal in the Ethernet to the novel network, the packet headers both contain the addresses of the two transmission ends in the novel network, wherein the address is the source address (SA) and destination address (DA) of the packet or protocol packet. That is, a packet or protocol packet sent from the novel network to the target terminal has the address of the novel network, and the DA and SA of the packet header are both novel network addresses, as shown in the following table:

| DA | SA | Reserved | Payload | CRC |
|----|----|----------|---------|-----|

When passing through an Ethernet protocol conversion gateway, an Ethernet protocol conversion gateway MAC (i.e., MAC SA) and a target terminal MAC (i.e., MAC DA) will be added to the packet header, then it enters the Ethernet, and it is transmitted to the target terminal according to Ethernet protocol; the packet or protocol packet sent from the source terminal in the Ethernet to the novel network has an address of the novel network and an MAC address of the Ethernet at the same time, that is, the packet header not only contains an DA and SA of the novel network, but also contains an Ethernet protocol conversion gateway MAC (i.e., MAC DA) and a source terminal MAC (i.e., MAC SA), as shown in the following table:

| MAC DA | MAC SA | Length or frame type | DA | SA | Reserved | Payload | CRC |
|--------|--------|----------------------|----|----|----------|---------|-----|

When passing through an Ethernet protocol conversion gateway, the Ethernet protocol conversion gateway MAC and the source terminal MAC are removed from the packet header, then the packet enters the novel network, and it is transmitted according to novel network protocol.

During the above process in which the novel network and the Ethernet are made compatible with each other, terminals connected under L2 switch also establish a binding relation with an Ethernet protocol conversion gateway, wherein said binding represents that a one-to-many mapping relation exists between the MAC address of the Ethernet protocol conversion gateway and the MAC addresses of the terminals, that is, a plurality of terminals may be registered under one Ethernet protocol conversion gateway. Such mapping and binding between terminal MAC address and Ethernet protocol conversion gateway MAC address are preset in a node server of the novel network at the time the terminal and the Ethernet protocol conversion gateway are sold, and the Ethernet protocol conversion gateway is informed of the mapping and binding by the node server. If the terminal is moved to another place, it must be re-registered by the operator. Thus, Ethernet MAC addresses may be flexibly allocated to an Ethernet protocol conversion gateway and a terminal bond thereto that are to be sold, thereby MAC address resources may be fully utilized. However, the MAC address of the Ethernet protocol conversion gateway may be solidified in each Ethernet protocol conversion gateway, and the MAC address of the terminal may also be solidified in each terminal. In such as case, it cannot flexibly allocate the MAC addresses.

It can be known from the above that, the Ethernet protocol conversion gateway and the terminal both have an address of the novel network and an MAC address of the Ethernet. Moreover, the address of the novel network and the MAC address of the Ethernet have a one-to-one mapping relation. Such a mapping relation may also be maintained by a node server of the novel network, and the Ethernet protocol conversion gateway may be informed of mapping relation. Thus, when an Ethernet protocol conversion gateway receives a packet or a protocol packet sent from the novel network, it may look up a target terminal MAC address corresponding to the novel network destination address (DA) in the packet according to such a mapping relation, and add it to the packet.

It has been briefly described above how the novel network and the Ethernet are made compatible with each other. The whole process will be described in detail below via the network access process and service process of a novel network node server and an Ethernet protocol conversion gateway, and of a node server and a terminal, according to specific examples.

Figure 8:
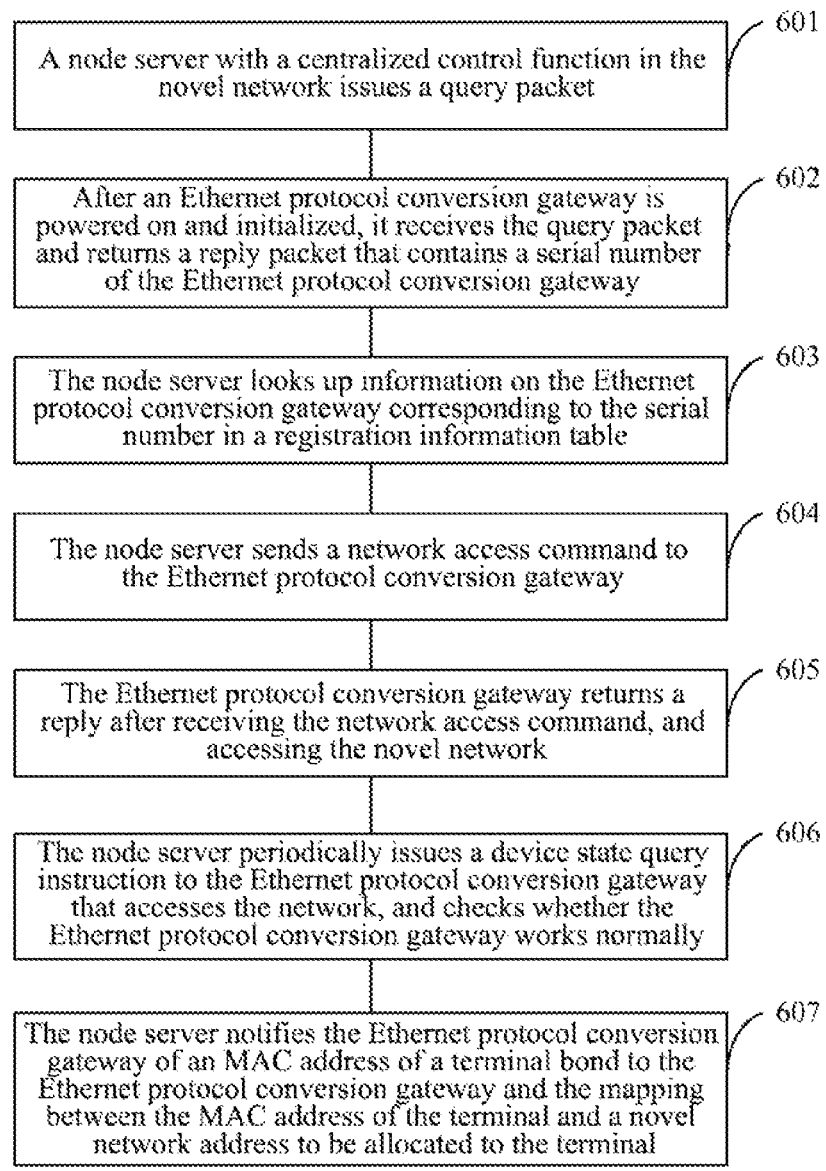
FIG. 8 is a flow chart showing the process in which an Ethernet protocol conversion gateway accesses a novel network according to an embodiment of the invention.

3.3.1 The Network Access Process of a Node Server and an Ethernet Protocol Conversion Gateway Referring to FIG. 8, it is a flow chart showing the process in which an Ethernet protocol conversion gateway accesses a novel network according to an embodiment of the invention.

Firstly, each Ethernet protocol conversion gateway that is allowed to access the network registers on the node server, and the registration information of the Ethernet protocol conversion gateway contains intrinsic information such as the serial number of the Ethernet protocol conversion gateway (including device type and device identification information), number of downlink ports and mask zone, etc. An Ethernet protocol conversion gateway that is not registered will be unable to access the network.

Step 601: A node server with a centralized control function in the novel network issues a query packet;

The node server sends the query packet to each port.

Step 602: After the Ethernet protocol conversion gateway is powered on and initialized, it receives the query packet and returns a reply packet that contains a serial number of the Ethernet protocol conversion gateway;

It is hypothesized that the Ethernet protocol conversion gateway receives a query packet issued by a certain port (for example, port 0).

Step 603: The node server looks up the Ethernet protocol conversion gateway information corresponding to the serial number in the registration information table, wherein the Ethernet protocol conversion gateway information includes Ethernet protocol conversion gateway MAC address and terminal MAC address bond to the Ethernet protocol conversion gateway;

After node server receives the reply packet issued by the Ethernet protocol conversion gateway, it will know that port 0 is connected with an Ethernet protocol conversion gateway, then it looks up in an internal registration information table.

Step 604: The node server sends a network access command to the Ethernet protocol conversion gateway, wherein the network access command contains the address of the Ethernet protocol conversion gateway in the novel network and the MAC address of the Ethernet protocol conversion gateway;

That is, the node server notifies the Ethernet protocol conversion gateway of the novel network address of the Ethernet protocol conversion gateway and the Ethernet MAC address registered in advance, via a network access command.

Step 605: The Ethernet protocol conversion gateway returns a reply after receiving the network access command, and accessing the novel network;

After receiving the network access command, the Ethernet protocol conversion gateway will know the address of the novel network accessed and the MAC address of the Ethernet.

Step 606: The node server periodically issues a device state query instruction to the Ethernet protocol conversion gateway that accesses the network, and checks whether the Ethernet protocol conversion gateway works normally;

After the node server receives a network access command reply, it will know that the Ethernet protocol conversion gateway has accessed the network, and then it periodically (for example, each second) sends a device state query instruction to port 0. If the node server does not receive a state query reply in a certain period of time (for example, 6 seconds), it will be considered that the Ethernet protocol conversion gateway has been removed from the network, and no device state query instruction will be sent any longer. It continues to send a query packet to port 0.

Step 607: The node server notifies the Ethernet protocol conversion gateway of the terminal MAC address bond to the Ethernet protocol conversion gateway, and the mapping between the terminal MAC address and the novel network address to be allocated to the terminal.

The node server knows according to the registration information table that a terminal is bond to the Ethernet protocol conversion gateway, so it sends the terminal MAC address bond to the Ethernet protocol conversion gateway, and the mapping between the terminal MAC address and the novel network address to be allocated, to the Ethernet protocol conversion gateway.

Via the above network access process, the Ethernet protocol conversion gateway will know its own novel network address, Ethernet MAC address, the terminal MAC address bond thereto and the mapping between the terminal MAC address and the novel network address to be allocated to the terminal.

Preferably, based on the above process, data transmission on the novel network may be specifically realized by looking up in an address table. Each node on the novel network, including node server, access switch and Ethernet protocol conversion gateway, maintains its own address table, and each time data are received, it performs data transmission and orientation according to the address table. Because the data transmission between the novel network and the Ethernet mainly relates to the transmission of a query packet, a reply packet, a unicast data packet and a multicast data packet, the address table is also divided into:

1) protocol packet address table: table 0 for short below, for transmitting and orienting a query packet or a service request protocol packet;

2) reply packet address look-up table: table 1 for short below, for transmitting and orienting a reply packet;

3) unicast data packet address table: table 2 for short below, for transmitting and orienting a unicast data packet; and 4) multicast data packet address table: table 3 for short below, for transmitting and orienting a multicast data packet.

In conjunction with the above network access process of an Ethernet protocol conversion gateway, during the powering and initializing process of the Ethernet protocol conversion gateway at step 302, table 0, table 1, table 2 and table 3 will be initialized. Then, after the Ethernet protocol conversion gateway receives the network access command at step 305, it will configure table 0: orienting the query packet or service request protocol packet sent to local machine to the CPU module port of the local machine. Then, after the Ethernet protocol conversion gateway sends a reply and accesses the network, the node server will further sends a configuration instruction to the Ethernet protocol conversion gateway for configuring table 0 on the Ethernet protocol conversion gateway: orienting the query packet or service request protocol packet sent to the terminal bond to the Ethernet protocol conversion gateway to a corresponding port of the Ethernet protocol conversion gateway respectively.

3.3.2 The Network Access Process of a Node Server and a Terminal

After the Ethernet protocol conversion gateway accesses the novel network, a terminal bond thereto also accesses the novel network.

Figure 9:
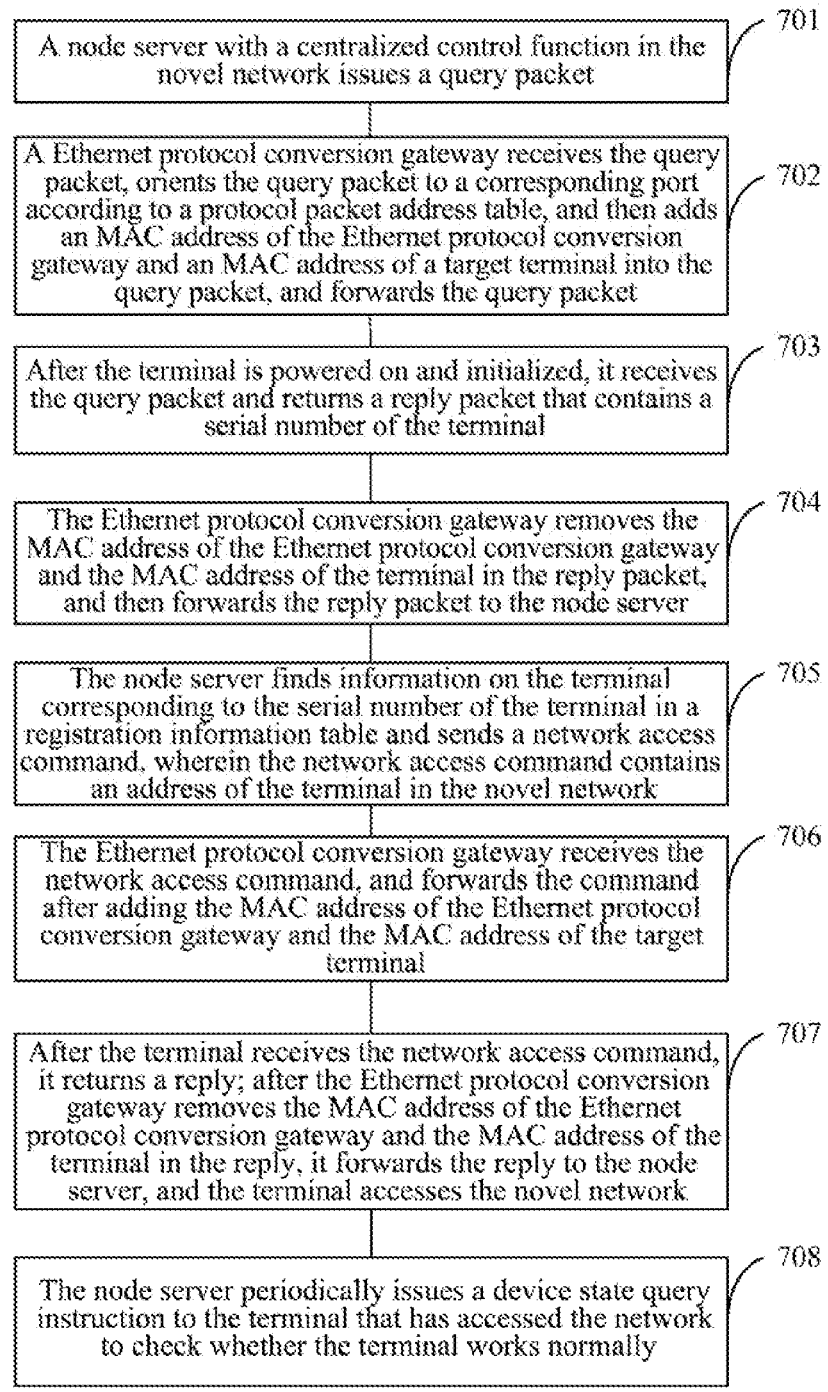
FIG. 9 is a flow chart showing the process in which a terminal accesses a novel network according to an embodiment of the invention.

Referring to FIG. 9, it is a flow chart showing the process in which a terminal accesses a novel network according to an embodiment of the invention.

Similarly, each terminal that is allowed to access the network is registered on the node server, and it is registered under the Ethernet protocol conversion gateway to which it is bond, wherein the registration information of a terminal contains terminal serial number (including device type and device identification information) and intrinsic information. A terminal that is not registered will be unable to access the network.

Step 701: A node server with a centralized control function in the novel network issues a query packet;

After an Ethernet protocol conversion gateway accesses the network, the node server will send a query packet to a downlink port of the Ethernet protocol conversion gateway to check whether a terminal device is connected under the Ethernet protocol conversion gateway.

Step 702: The Ethernet protocol conversion gateway receives the query packet, orients the query packet to a corresponding port according to a protocol packet address table, and then adds the MAC address of the Ethernet protocol conversion gateway and the MAC address of the target terminal into the query packet, and forwards the query packet.

The destination address (DA) of the query packet is the novel network address to be allocated by the node server to the terminal. Therefore, after the Ethernet protocol conversion gateway receives the query packet, it may look up the corresponding terminal MAC address according to the mapping between the novel network address and the Ethernet MAC address, and then adds it to the packet and sends the packet. After the query packet enters the Ethernet, it is transmitted according to the Ethernet protocol, and finally it is delivered to the target terminal.

Step 703: After the terminal is powered on and initialized, it receives the query packet and returns a reply packet that contains the terminal serial number.

Step 704: The Ethernet protocol conversion gateway removes the Ethernet protocol conversion gateway MAC address and the terminal MAC address in the reply packet, and then forwards the reply packet to the node server;

The reply packet contains the Ethernet protocol conversion gateway MAC address, the terminal MAC address, the destination address (DA) and source address (SA) of the novel network. After the Ethernet protocol conversion gateway removes the Ethernet protocol conversion gateway MAC address and the terminal MAC address, it orients the packet by looking up in table 1. The reply packet enters the novel network, and it is transmitted according to the novel network protocol.

Step 705: The node server finds the terminal information corresponding to the terminal serial number in a registration information table and sends a network access command, wherein the network access command contains the terminal address in the novel network;

After the node server receives the reply packet issued by the terminal, it will know that a terminal device is connected with the Ethernet protocol conversion gateway, and then it looks up in an internal registration information table.

Step 706: The Ethernet protocol conversion gateway receives the network access command, and forwards the command after adding the MAC address of the Ethernet protocol conversion gateway and the MAC address of the target terminal;

Step 707: After the terminal receives the network access command, it returns a reply; after the Ethernet protocol conversion gateway removes the Ethernet protocol conversion gateway MAC address and the terminal MAC address in the reply, it forwards the reply to the node server, and the terminal accesses the novel network;

After the terminal receives the network access command, it will know the address of the novel network accessed.

Step 708: The node server periodically issues a device state query instruction to the terminal that has accessed the network to check whether the terminal works normally.

After the node server receives a network access command reply, it knows that the terminal bond to the Ethernet protocol conversion gateway has accessed the network, and then it periodically (for example, each second) sends a device state query instruction to the terminal. If the node server does not receive a state query reply in a certain period of time (for example, 6 seconds), it will be considered that the terminal has been removed from the network, and no device state query instruction will be sent any longer; instead, it continues to send a query packet to the current port.

In the above process, data transmission inside the Ethernet conforms to an Ethernet protocol. In the Ethernet protocol, L2 switch can directly send a packet to a destination node, rather than sending a packet to all the nodes in broadcast mode just like a hub; the most crucial technology thereof is that the switch may identify the network card MAC address of a node connected to the network and put it into a place named MAC address table. The MAC address table is stored in a buffer of the switch, and the address is remembered. Thus, when it needs to send data to the destination address, the switch may look up the node location of the MAC address in the MAC address table, and then it sends the data to said location directly. So-called number of MAC addresses represents the maximum number of MAC addresses that may be stored in the MAC address table of the switch. The more MAC addresses are stored, the higher the data forwarding speed and efficiency will be. Sufficient buffers are needed on each port of the switch to memorize these MAC addresses. Therefore, the number of MAC addresses that can be memorized by a switch will be determined by the size of the Buffer capacity correspondingly. Generally, it will be enough for a switch to memorize 1024 MAC addresses. 1024 MAC addresses may be memorized on an office end. On a terminal, 16 MAC addresses are supported due to a FLASH problem and actual demand.

In the Ethernet protocol, an MAC address is needed when information is transmitted between the hosts on one and the same subnet: but when information is sent for the first time, there exists only an IP address, without MAC address. At this point, a packet will be sent, wherein the IP address is the IP address of the target machine, and the MAC address is ff-ff-ff-ff-ff-ff-ff, which represents broadcast, that is, all machines on the subnet can receive the packet; after other hosts receive the packet, if they find that the IP address is not the IP address of their own, the packet will be discarded; and if the IP address is that of its own, it sends a packet to the source machine, which contains its MAC address. After the source machine receives the packet, it will know the MAC address of the target machine, which is called MAC address self-learning.

MAC address self-learning on a switch represents that: a correspondence table between an MAC address and each interface of the switch (for example, four interfaces for a household switch) exists on the switch, each time a packet is forwarded via the switch, it will be forwarded to all ports if no correspondence relation of the MAC address exists in the correspondence table; when the target machine returns information from a certain port, it will know to which port this MAC address corresponds, then this correspondence relation will be added into the table, which is MAC address self-learning of the switch.

3.3.3 An Example of Interaction Between a Node Server and an Ethernet Protocol Conversion Gateway, Terminal During a Network Access Process 3.3.3.1 Interaction Example 1

It will be illustrated by a specific example, based on the above network access process of an Ethernet protocol conversion gateway and a terminal.

Figure 10:
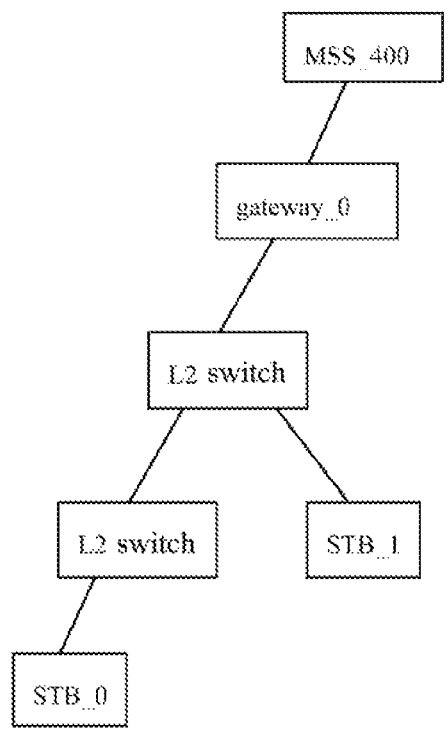
FIG. 10 is an exemplary connection diagram showing the interaction among a node server, an Ethernet protocol conversion gateway and a terminal during a network access process according to an embodiment of the invention.

For convenient discussion, the Ethernet protocol conversion gateway may be connected with an access switch or connected with a node server directly: referring to FIG. 10, it is hypothesized that port 1 of Ethernet protocol conversion gateway gateway_0 is directly connected with port 0 of node server MSS-400, and port 0 of Ethernet protocol conversion gateway gateway_0 is connected with a group of L2 switches, and four terminals are registered under this Ethernet protocol conversion gateway, but only two terminals, STB_0 and STB_1, are connected under the L2 switches.

The MAC address of gateway_0 is 0x0005 0x5dfd 0x3ebf, and the MAC addresses of four novel network terminals registered under gateway_0 are 0x0005 0x5dfd 0x0000, 0x0005 0x5dfd 0x0001, 0x0005 0x5dfd 0x0002 and 0x0005 0x5dfd 0x0003 respectively, and STB_0 and STB_1 are the first two terminals thereof.

1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of a switch and the registration information of a terminal, etc.), and server MSS-400 configures its own access network address as 0x0000;

2) Server MSS-400 initializes tables 0, 1, 2 and 3:
configuring table 0 as "000 0000 0000", i.e., all query packet transmission is closed;
configuring table 1 as "001 0000 0000", i.e., all reply packets are to be oriented to the CPU;
configuring tables 2 and 3 as "00 0000 0000", i.e., all unicast or multicast data packet transmission is closed;

3) Server MSS-400 knows that it has 8 downlink ports, so it configures the 8 items of table 0 respectively as:
"00 0000 0000 0000 0001"=>"000 0000 0001", i.e., a query packet with a destination address (DA) of 0x8000 0x0000 0x0000 0x0001 is oriented to port 0;
"00 0000 0000 0000 0010"=>"000 0000 0010", i.e., a query packet with a destination address (DA) of 0x8000 0x0000 0x0000 0x0002 is oriented to port 1;
"00 0000 0000 0000 0011"=>"000 0000 0100", i.e., a query packet with a destination address (DA) of 0x8000 0x0000 0x0000 0x0003 is oriented to port 2;
"00 0000 0000 0000 0100"=>"000 0000 1000", i.e., a query packet with a destination address (DA) of 0x8000 0x0000 0x0000 0x0004 is oriented to port 3;
"00 0000 0000 0000 0101"=>"000 0001 0000", i.e., a query packet with a destination address (DA) of 0x8000 0x0000 0x0000 0x0005 is oriented to port 4;
"00 0000 0000 0000 0110"=>"000 0010 0000", i.e., a query packet with a destination address (DA) of 0x8000 0x0000 0x0000 0x0006 is oriented to port 5;
"00 0000 0000 0000 0111"=>"000 0100 0000", i.e., a query packet with a destination address (DA) of 0x8000 0x0000 0x0000 0x0007 is oriented to port 6;
"00 0000 0000 0000 1000"=>"000 1000 0000", i.e., a query packet with a destination address (DA) of 0x8000 0x0000 0x0000 0x0008 is oriented to port 7;

4) Server MSS-400 sends port query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x0000 0x0000 0x0008 (with an SA of 0x0000 0x0000 0x0000 0x0000), and according to the configuration of table 0, the port query packet will be in turn oriented to ports 0 to 7;

5) After Ethernet protocol conversion gateway gateway_0 is powered on, it initializes the hardware:
configuring table 0 "00 xxxx xxxx xxxx xxxx" as "100". i.e., all query packets are oriented to the CPU;
configuring table 1"01 xxxx xxxx xxxx xxxx" as "010", i.e., all reply packets are oriented to uplink 100M network interface;
configuring table 2 and table 3 as "000". i.e., all unicast or multicast data packet transmission is closed;

6) After Ethernet protocol conversion gateway gateway_0 receives the port query packet, it sends a reply (the reply contains the device type and device identification of the current switch, which is the intrinsic information of each switch), wherein DA of the packet is 0x0800 0x000 0x000 0x0x0000, and SA is 0x0000 0x0000 0x0000 0x0001;

7) After server MSS-400 receives the reply issued by Ethernet protocol conversion gateway gateway_0, it will know that port 0 is connected with an Ethernet protocol conversion gateway by contrasting the source address (SA) of the reply packet to the device type, then the Ethernet protocol conversion gateway information is found in the internal registration information table of the server, which includes Ethernet MAC address of gateway_0 and Ethernet MAC address of a novel network terminal registered under gateway_0, then a network access command is sent to the access switch (which informs that the access network address of gateway_0 is 0x0001, and the MAC address of gateway_0 is 0x0005 0x5dfd 0x3ebf);

8) After Ethernet protocol conversion gateway gateway_0 receives the network access command, it knows that its own access network address is 0x0001 and MAC address is 0x0005 0x5dfd 0x3cbf, and it accesses the network, and then it configures table 0 "00 0000 0000 0000 0001" as "100", and the remaining items of table 0 are configured as "000", i.e., only the query packet of the current switch is imported to the CPU, and the rest query packets are discarded; at the same time, a network access command reply is sent to the server;

9) After server MSS-400 receives the network access command reply issued by Ethernet protocol conversion gateway gateway_0, it will know that Ethernet protocol conversion gateway gateway_0 has accessed the network, and then a device state query instruction is sent to the port each second to check whether Ethernet protocol conversion gateway gateway_0 works normally, and at the same, a port query packet is sent to a downlink port of Ethernet protocol conversion gateway gateway_0 to check whether a terminal device is connected under Ethernet protocol conversion gateway gateway_0; because server MSS-400 knows that four novel network terminals are registered under Ethernet protocol conversion gateway gateway_0, the following configurations will be performed by server MSS-400:
"00 0000 0000 0000 1001"=>"000 0000 0001", i.e., a query packet with a destination address (DA) of 0x8000 0x0000 0x0000 0x0009 is oriented to port 0;
"00 0000 0000 0000 1010"=>"000 0000 0001", i.e., a query packet with a destination address (DA) of 0x8000 0x0000 0x0000 0x000a is oriented to port 0;
"00 0000 0000 0000 1011"=>"000 0000 0001", i.e., a query packet with a destination address (DA) of 0x8000 0x0000 0x0000 0x000b is oriented to port 0;
"00 0000 0000 0000 1100"=>"000 0000 0001", i.e., a query packet with a destination address (DA) of 0x8000 0x0000 0x0000 0x000c is oriented to port 0;
Server MSS-400 will notify gateway_0 to perform the following configurations:
"00 0000 0000 0000 1001"=>"001". i.e., a query packet with a destination address (DA) of 0x8000 0x0000 0x0000 0x0009 is oriented to port 0, wherein the corresponding MAC address thereof is 0x0005 0x5dfd 0x0000;
"00 0000 0000 0000 1010"=>"001", i.e., a query packet with a destination address (DA) of 0x8000 0x0000 0x0000 0x000a is oriented to port 0, wherein the corresponding MAC address thereof is 0x0005 0x5dfd 0x0001;
"00 0000 0000 0000 1011"=>"001", i.e., a query packet with a destination address (DA) of 0x8000 0x0000 0x0000 0x000b is oriented to port 0, wherein the corresponding MAC address thereof is 0x0005 0x5dfd 0x0002;
"00 0000 0000 0000 1100"=>"001", i.e., a query packet with a destination address (DA) of 0x8000 0x0000 0x0000 0x000c is oriented to port 0, wherein the corresponding MAC address thereof is 0x0005 0x5dfd 0x0003;

10) Server MSS-400 sends port query packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c (with an SA of 0x0000 0x0000 0x0000 0x0000), according to the configuration of table 0 on server MSS-400, the port query packets will be in turn oriented to port 0 of server MSS-400, and according to the configuration of table 0 on Ethernet protocol conversion gateway gateway_0, the port query packets will be in turn oriented to port 0 of Ethernet protocol conversion gateway gateway_0, and the sending module on port 0 of Ethernet protocol conversion gateway gateway_0 knows the Ethernet MAC DA of the corresponding terminal (6 byte) according to the novel network destination address DA of the packet, and adds the Ethernet MAC DA of the terminal (6 byte), the MAC SA of the Ethernet protocol conversion gateway (6 byte) and Ethernet length or frame type (2 byte), i.e., 0x0005 0x5dfd 0x0000 0x0005 0x5dfd 0x3ebf 0x0000 (user-defined) 0x8000 0x0000 0x0000 0x0009, 0x0005 0x5dfd 0x0001 0x0005 0x5dfd 0x3ebf 0x0000 (user-defined) 0x8000 0x0000 0x0000 0x000a, 0x0005 0x5dfd 0x0002 0x0005 0x5dfd 0x3ebf 0x0000 (user-defined) 0x8000 0x0000 0x0000 0x000b, 0x0005 0x5dfd 0x0003 0x0005 0x5dfd 0x3ebf 0x0000 (user-defined) 0x8000 0x0000 0x0000 0x000c, and sends the packets;

11) According to an appendix, the L2 switches in the local area network may know that the tables thereof do not contain the correspondence relation with these MAC addresses (i.e. 0x0005 0x5dfd 0x0000, 0x0005 0x5dfd 0x0001, 0x0005 0x5dfd 0x0002, 0x0005 0x5dfd 0x0003), then these packets will be forwarded to all the ports. STB_0 and STB_1 will both receive the four packets, and they compare the MAC DA of the packets to their own MAC address (burned in a flash of the terminal when leaving the factory); if they are the same, the packets will be received; otherwise, they will be discarded. After STB_0 receives the port query packet, it sends a reply (the reply contains the device type and device identification of the current terminal, which is the intrinsic information of each terminal), the header of the packet is 0x0005 0x5dfd 0x3ebf 0x0005 0x5dfd 0x0000 0x0000 (user-defined) 0x0800 0x0000 0x0000 0x0000 0x0000 0x0000 0x0000 0x000a; after STB_1 receives the port query packet, it sends a reply (the reply contains the device type and device identification of the current terminal, which is the intrinsic information of each terminal), the header of the packet is 0x0005 0x5dfd 0x3ebf 0x0005 0x5dfd 0x0001 0x0000 (user-defined) 0x0800 0x0000 0x0000 0x0000 0x0000 0x0000 0x0000 0x000b.

12) According to an appendix, the L2 switches in the local area network may know that the two packets will be oriented to port 0 of Ethernet protocol conversion gateway gateway_0. After being checked by the packet checking module on port 0, totally 14 bytes are removed, i.e., MAC DA (6 byte), MAC SA (6 byte) and length or frame type (2 byte), then it enters the corresponding receive buffer, and the switching engine polls each receive buffer, if yes, it performs combined address field table lookup, so that the orientation information of the packet is obtained; and according to table 1 of gateway_0, the packet from which MAC is removed will be oriented to port 1;

13) After server MSS-400 receives the reply issued by STB_0 and STB_1, by contrasting the source address (SA) of the reply packet to the device type, it will know that two registered terminals are connected under gateway_0, then the terminal information is found in the internal registration information table of the server, and a network access command is sent to STB_0 and STB_1 (informing that the access network addresses of STB_0 and STB_1 are 0x000a and 0x000b): according to 10), gateway_0 adds an MAC to the reply and then orients it to port 0.

14) According to an appendix, the L2 switches in the local area network may know that the two packets will be respectively oriented to STB_0 and STB_1, rather than being broadcasted.

15) After receiving the network access command, STB_0 and STB_will know that their own access network addresses are 0x000a and 0x000b, they access the network and send a network access command reply to the server at the same time;

After server MSS-400 receives the network access command replies issued by STB_0 and STB_1, it will know that STB_0 and STB_1 have accessed the network, and then a device state query instruction is sent to the port each second to check whether STB_0 and STB_1 work normally. When the server does not receive a state query reply in 6 seconds, it will be considered that terminal has been removed from the network, and no device state query instruction will be sent any longer; instead, it continues to send a port query packet to the current port.

3.3.3.2 Interaction Example 2

During the network access process of a node server and an Ethernet protocol conversion gateway, a terminal, the node server manages the network access address via an address information table it maintains. The management of the address information table will be illustrated below via another example.

The access network address may be set as 16 bits, and all access network devices have a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used, "01" represents that the address is standby (the node server uses the address to issue a port downlink protocol packet, but no network access uplink protocol packet is received), "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, the access network address of a device connected with its network port and the uplink and downlink flow count of each of its network ports, if the device is an access switch; the access network address of a device connected with its network port and the uplink, the count of its read and write channels and uplink and downlink flow count of its network port, if the device is a storage; and so on. All the information is used to provide a decision-making foundation to the service process, and the information will be modified during each service process.

Figure 11:
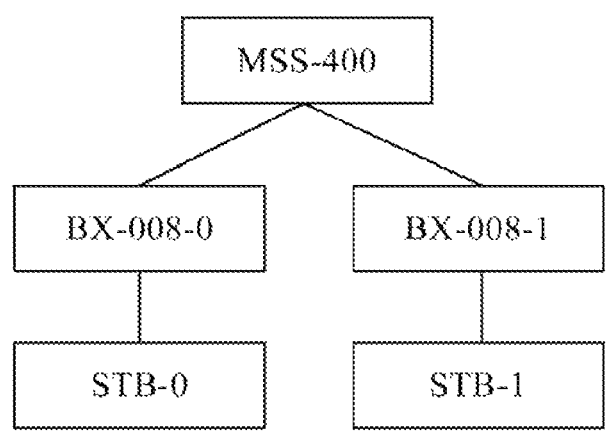
FIG. 11 is an exemplary connection diagram showing the interaction among a node server, an access switch and a terminal during a network access process according to an embodiment of the invention.

As shown in FIG. 11, It is hypothesized that there exists a node server MSS-400, port 0 thereof is connected with an access switch BX-08-0 (in fact, by adding an MAC adding and removing function of the invention to BX-008-0, it can be regarded as the Ethernet protocol conversion gateway of the invention), port 1 thereof is connected with an access switch BX-008-1, and port 0 of BX-008-0 is connected with set-top box STB-0, port 1 of BX_008-1 is connected with set-top box STB-1.

1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of a switch and the registration information of a terminal, etc.), and server MSS-400 initializes the address information table and clears all items (which represents that no address is used), and server MSS-400 configures its own access network address as 0x0000, that is, item 0x0000 of the address information table is configured as follows:

address occupation descriptor: "10" represents that the address is used;
device descriptor: "000000" represents node server;
device resource description information: the node server has 8 downlink 100M network interfaces in turn defined as port 0 to port 7, 1 CPU module interface defined as port 8, 1 disk array interface defined as port 9, 1 uplink 1000M fiber interface defined as port 10, and the type of this node server is MSS-400, the access network address of a device connected with its network port is not allocated, and downlink flow count of each of its network ports is 0;

The next available address of the address information table is 0x0001;

2) Server MSS-400 initializes tables 0, 1, 2 and 3:
configuring table 0 as "000 0000 0000", i.e., the transmission of all downlink protocol packets is closed;
configuring table 1 as "001 0000 0000", i.e., all uplink protocol packets are oriented to the CPU;
configuring tables 2 and 3 as "000 0000 0000", i.e., all unicast or multicast data packet transmission is closed;

3) Server MSS-400 knows it has 8 downlink ports and the next available address is 0x0001, so it configures the 8 items of table 0 respectively as:
"00 0000 0000 0000 0001"=>"000 0000 0001", i.e., a query packet with a destination address (DA) of 0x8000 0x0000 0x0000 0x0001 is oriented to port 0;
"00 0000 0000 0000 0010"=>"000 0000 0010", i.e., a query packet with a destination address (DA) of 0x8000 0x0000 0x0000 0x0002 is oriented to port 1;
"00 0000 0000 0000 0011"=>"000 0000 0100", i.e., a query packet with a destination address (DA) of 0x8000 0x0000 0x0000 0x0003 is oriented to port 2;
"00 0000 0000 0000 0100"=>"000 0000 1000", i.e., a query packet with a destination address (DA) of 0x8000 0x0000 0x0000 0x0004 is oriented to port 3;
"00 0000 0000 0000 0101"=>"000 0001 0000", i.e., a query packet with a destination address (DA) of 0x8000 0x0000 0x0000 0x0005 is oriented to port 4;
"00 0000 0000 0000 0110"=>"000 0010 0000", i.e., a query packet with a destination address (DA) of 0x8000 0x0000 0x0000 0x0006 is oriented to port 5;
"00 0000 0000 0000 0111"=>"000 0100 0000", i.e., a query packet with a destination address (DA) of 0x8000 0x0000 0x0000 0x0007 is oriented to port 6;
"00 0000 0000 0000 1000"=>"000 1000 0000", i.e., a query packet with a destination address (DA) of 0x8000 0x0000 0x0000 0x0008 is oriented to port 7;

4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x000 0x0000 0x0008 (with an SA of 0x0000 0x000 0x0000 0x0000), and according to the configuration of its table 0, the query packets will be in turn oriented to ports 0 to 7; at this point, items 0x0001 to 0x0008 of the address information table are configured as:

address occupation descriptor: "01" represents that the address is standby;
device descriptor: it will not be modified;
device resource description information: it will not be modified;

The next available address of the address information table is 0x0009:

5) After switches BX-008-0 and BX-008-1 are powered on, they initializes the hardware:
configuring its table 0 "00 xxxx xxxx xxxx xxxx" as "01 0000 0000", i.e., all downlink protocol packets are oriented to the CPU;
configuring its table 1"01 xxxx xxxx xxxx xxxx" as "10 0000 0000", i.e., all uplink protocol packets are oriented to the uplink 100M network interface;
configuring its tables 2 and 3 as "00 0000 0000", i.e., all unicast or multicast data packet transmission is closed;

6) After switch BX-008-0 receives a query packet, it receives the query packet to its CPU module according to the configuration of its table 0, the CPU module resolves the query packet and generates a reply packet (which contains the registration information of the current access switch) and sends it to server MSS-400, wherein DA of the packet is 0x0800 0x0000 0x0000 0x0000, and SA is 0x0000 0x0000 0x0000 0x0001;

7) After server MSS-400 receives the reply packet issued by switch BX-008-0 and contrasts the source address (SA) of the reply packet and the device type, it will know that its port 0 is connected with an access switch, then the information of the access switch is found in an internal registration information table of the node server, and a network access command is sent to the access switch (informing that the access network address thereof is 0x0001);

8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; and at the same time, a network access command reply is sent to the server;

9) After server MSS-400 receives the network access command reply issued by switch BX-008-0, it will know that switch BX-008-0 has accessed the network, then item 0x0001 of the internal address information table of the server is configured as:
address occupation descriptor: "10" represents that the address is used;
device descriptor: "000001" represents an access switch BX-008;
device resource description information:
the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port is not allocated, and downlink flow count of each of its network ports is 0;

Then, a device state query instruction is sent to the port each second to check whether switch BX-008-0 works normally; and at the same, a port downlink protocol packet is sent to the downlink port of switch BX-008-0 to check whether other access network devices are connected under the current access switch. In such as case, In such a case, the following configurations will be done by server MSS-400 in its table 0:
  "00 0000 0000 0000 1001"=>"000 0000 0001", i.e., a port downlink protocol packet with a destination address (DA) of 0x8000 0x0000 0x0000 0x0009 is oriented to port 0;
  "00 0000 0000 0000 1010"=>"000 0000 0001", i.e., a port downlink protocol packet with a destination address (DA) of 0x8000 0x0000 0x0000 0x000a is oriented to port 0;
  "00 0000 0000 0000 1011"=>"000 0000 0001". i.e. a port downlink protocol packet with a destination address (DA) of 0x8000 0x0000 0x0000 0x000b is oriented to port 0;
  "00 0000 0000 0000 1100"=>"000 0000 0001", i.e., a port downlink protocol packet with a destination address (DA) of 0x8000 0x0000 0x0000 0x000c is oriented to port 0;
  "00 0000 0000 0000 1101"=>"000 0000 0001", i.e., a port downlink protocol packet with a destination address (DA) of 0x8000 0x0000 0x0000 0x000d is oriented to port 0;
  "00 0000 0000 0000 1110"=>"000 0000 0001", i.e., a port downlink protocol packet with a destination address (DA) of 0x8000 0x0000 0x0000 0x000e is oriented to port 0;
  "00 0000 0000 0000 1111"=>"000 0000 0001", i.e., a port downlink protocol packet with a destination address (DA) of 0x8000 0x0000 0x0000 0x000f is oriented to port 0;
  "00 0000 0000 0001 0000"=>"000 0000 0001", i.e., a port downlink protocol packet with a destination address (DA) of 0x8000 0x0000 0x0000 0x0010 is oriented to port 0;
  Server MSS-400 will notify change BX-008-0 to perform the following configurations in its table 0 via a port allocation packet containing port allocation information:
  "00 0000 0000 0000 1001"=>"00 0000 0001", i.e., a port downlink protocol packet with a destination address (DA) of 0x8000 0x0000 0x0000 0x0009 is oriented to port 0;
  "00 0000 0000 0000 1010"=>"00 0000 0010", i.e., a port downlink protocol packet with a destination address (DA) of 0x8000 0x0000 0x0000 0x000a is oriented to port 1;
  "00 0000 0000 0000 1011"=>"00 0000 0100", i.e., a port downlink protocol packet with a destination address (DA) of 0x8000 0x0000 0x0000 0x000b is oriented to port 2;
  "00 0000 0000 0000 1100"=>"00 0000 1000", i.e., a port downlink protocol packet with a destination address (DA) of 0x8000 0x0000 0x0000 0x000c is oriented to port 3;
  "00 0000 0000 0000 1101"=>"00 0001 0000", i.e., a port downlink protocol packet with a destination address (DA) of 0x8000 0x0000 0x0000 0x000d is oriented to port 4;
  "00 0000 0000 0000 1110"=>"00 0010 0000", i.e., a port downlink protocol packet with a destination address (DA) of 0x8000 0x0000 0x0000 0x000e is oriented to port 5;
  "00 0000 0000 0000 1111"=>"00 0100 0000", i.e., a port downlink protocol packet with a destination address (DA) of 0x8000 0x0000 0x0000 0x000f is oriented to port 6;
  "00 0000 0000 0001 0000"=>"00 1000 0000", i.e., a port downlink protocol packet with a destination address (DA) of 0x8000 0x0000 0x0000 0x0010 is oriented to port 7;

10) Server MSS-400 sends port downlink protocol packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f, 0x8000 0x0000 0x0000 0x0010 (with an SA of 0x00 0000 0x0000 0x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0; Moreover, items 0x0009 to 0x0010 of the address information table on server MSS-400 are configured as:
  address occupation descriptor: "01" represents that the address is standby;
  device descriptor: it will not be modified;
  device resource description information: it will not be modified:
  The next available address is 0x0011;

11) STB-0 receives a port downlink protocol packet from port 0 of switch BX-008-0 (i.e., a port downlink protocol packet with a destination address of 0x8000 0x0000 0x0000 0x0009); and after receiving a port downlink protocol packet, it sends a port uplink protocol packet (which contains the registration information of the current terminal), wherein DA of the packet is 0x0800 0x0000 0x0000 0x0000, and SA is 0x0000 0x0000 0x0000 0x0009 (port 0 of the switch);

12) After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);

13) After STB-0 receives the network access command and knows that its own access network address is 0x0009, it accesses the network and sends a network access command reply to the server at the same time;

14) After server MSS-400 receives the network access command reply issued by STB-0, it will know that switch STB-0 has accessed the network, then item 0x0009 of the address information table is configured as:
  address occupation descriptor: "10" represents that the address is used;
  device descriptor: "000011" represents a terminal;
  device resource description information: the terminal has a video and audio coding/decoding engine and a 100M network interface, the type of the terminal is STB, the access network address of a device connected with its network port is 0x0001 (i.e. BX-008-0), and the downlink flow count of its network port is 0;

Item 0x0001 of the address information table is configured as:
  address occupation descriptor: it will not be modified;
  device descriptor: it will not be modified;
  device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and downlink flow count of each of its network ports is 0;

Then, server MSS-400 sends a device state query instruction to the port each second to check whether STB-0 works normally; when the server does not receive a state query reply in 6 seconds, it will be considered that STB-0 has been removed from the network, and no device state query instruction will be sent any longer; instead, it continues to send a query packet to the current port.

Referring to the above steps 6-14, BX-008-1 may also access the network and obtain its access network address as 0x0002; and STB-1 may also access the network and obtain its access network address as 0x0012.

After accessing the network, the node server may carry out a communication service (including unicast communication service and multicast communication service) with the Ethernet protocol conversion gateway and the terminal. For one skilled in the art to better understand the invention, an example in which a node server carries out a unicast communication service with an Ethernet protocol conversion gateway and a terminal will be provided below.

3.3.4 An Example of the Communication Connection Process of a Unicast Communication Service As shown in FIG. 7, it is hypothesized that there exists a node server MSS-400 (with an access network address of 0x0000), port 0 thereof is connected with Ethernet protocol conversion gateway BX-008-0 (with an access network address of 0x0001), port 1 thereof is connected with Ethernet protocol conversion gateway BX-008-1 (with an access network address of 0x0002), and port 0 of BX-008-0 is connected with set-top box STB-0 (with an access network address of 0x0009), port 1 of BX_008-1 is connected with set-top box STB-1 (with an access network address of 0x012). Set-top box STB_0 issues a request to node server MSS-400 for performing a unicast communication service of visual communication with set-top box STB_1, in the following steps:

S1) Set-Top box STB_0 issues a service request protocol packet, the DA (destination address) of the packet is 0x0800 0x0000 0x0000 0x0000 (i.e., the address of MSS-400), and the SA (source address) is 0x0000 0x0000 0x0000 0x0009; the packet further comprises the MAC address (MAC DA) of Ethernet protocol conversion gateway BX-008-0 and the MAC address (MAC SA) of set-top box STB_0: additionally, it may further comprise reserved 0x0000 (reserved word), and the PDU part is as shown in the following table:

define SERVICE_TYPE_GTML_REQUEST 0x8000, requesting for a menu
define SERVICE_TYPE_VOD_REQUEST 0x8001, requesting for a VOD program
define SERVICE_TYPE_CHANGE_MENU 0x8002, requesting for changing background menu
define SERVICE_TYPE_BROADCAST_REQUEST 0x8003, requesting for watching broadcast
define SERVICE_TYPE_CHANGE_CHANNEL 0x8004, requesting for changing channel
define SERVICE_TYPE_TELEPHONE_DIRECT 0x8005, requesting for sending a videophone
define SERVICE_TYPE_PERMISSION 0x8006, an reply of whether access is permitted
define SERVICE_TYPE_RECORD_REQUEST 0x8007, requesting for recording
define SERVICE_TYPE_END_REQUEST 0x8008, requesting for ending the current service
define SERVICE_TYPE_ORG_CAST_REQUEST 0x8009, requesting for originating a living broadcast
define SERVICE_TYPE_DDB_REQUEST 0x800b, requesting for watching delayed TV
define SERVICE_TYPE_SKIP 0x800c, fast forward, fast rewind, pause and continue during the processing of watch a VOD or delayed TV
define SERVICE_TYPE_RECORD_END 0x800e, requesting for ending recording
define SERVICE_TYPE_VIEW_Monitor_DIRECT 0x8024, requesting for watching monitor
define SERVICE_TYPE_RCV_CAST_DIRECT 0x8025, requesting for watching living broadcast
define SERVICE_TYPE_TELEPHONE_REQUEST 0, requesting for sending a videophone
define SERVICE_TYPE_RCV_CAST_REQUEST 0xa, requesting for watching living broadcast
define SERVICE_TYPE_VIEW_Monitor 0xc, requesting for watching monitor In this example, the service parameter is SERVICE_TYPE_TELEPHONE_REQUEST or SERVICE_TYPE_TELEPHONE_DIRECT.

S2) Ethernet protocol conversion gateway BX-008-0 connected between set-top box STB_0 and node server MSS-400 receives the service request protocol packet; firstly, it removes the MAC address (MAC DA) of Ethernet protocol conversion gateway BX-008-0 and the MAC address (MAC SA) of set-top box STB_0 in the packet.

Then, according to the configuration of table 1, the service request protocol packet is oriented to node server MSS-400, and node server MSS-400 determines that a request for visual communication (service type) is received according to the content of the packet, knows that the called terminal (target terminal) is STB_1 by looking up in a CAM table (content-address mapping table) according to the service number, 8e01

| Field Number | Length | Code | Description |
|---|---|---|---|
| 0 | 1W | 8e01 | user request instruction (source terminal → node server) |
| 1 | 1W | | service type (service_type) |
| 2-4 | 3W | | user number (source terminal number) |
| 5 | 1W | | user extension number (source terminal extension number) |
| 6-31 | 26W | | service parameter (0 is added to an unoccupied part) |

The program number and the broadcast channel number related to the service request are both put in the service parameter, for example:

knows the link topology related to the current service according to its internal address information table, and determines that the link is permitted and communication may be established between the two parts. Then, a menu protocol packet is sent respectively to the calling party (STB_0) and the called party (STB_1), and it waits the called party to reply:

Wherein, the menu protocol packet sent to STB_0: DA is 0x8000 0x0000 0x0000 0x0009, SA is 0x0000 0x0000 0x0000 0x0000, reserved is 0x00000, and PDU part is as shown in the following table:

| Field Number | Length | Code | Description |
| --- | --- | --- | --- |
| 0 | 1W | 3900 | data downoad instruction |
| 1 | 1W | | data type (0 = null, 1 = gtml 2 = gtmlfodder 3 = set-top box program 4 = start menu 5 = bmp 100 = dsp program on gateway 101 = dsp program of 008) |
| 2 | 1W | | reserved |
| 3 | 1W | | number of valid packets |
| 4 | 1W | | sequence number of the current packet |
| 5 | 1W | | length of valid data in the current packet |
| 6-14 | 9W | | reserved |
| 15-526 | 512W | | data |
| 527 | 1W | | CRC (summarization of 512 data) |

Menu protocol packet sent to STB_1: DA is 0x8000 0x0000 0x0000 0x0012. SA is 0x0000 0x0000 0x0000 0x0000, reserved is 0x0000, and PDU part is as shown in the above table.

S3) According to the configuration of table 0 on node server MSS-400 and the configuration of table 0 on Ethernet protocol conversion gateway BX-008-0 and BX-008-1, these 2 menu protocol packets will be respectively oriented to set-top boxes STB_0 and STB_1, and during this process, BX-008-0 and BX-008-1 add MAC DA and MAC SA to these 2 menu protocol packets respectively.

The called STB_1 issues a request SERVICE_TYPE_PERMISSION for accepting the communication from STB_1 and sends a reply protocol packet to node server MSS-400, wherein the packet contains the MAC address (MAC DA) of Ethernet protocol conversion gateway BX-008-1 and the MAC address (MAC SA) of set-top box STB_1, and further, DA is 0x0800 0x0000 0x0000 0x000, SA is 0x0000 0x0000 0x0000 0x012, reserved is 0x0000, service parameter is SERVICE_TYPE_PERMISSION, and PDU art is as shown in the following table:

according to the configuration of table 1, the reply protocol packet is oriented to node server MSS-400, and node server MSS-400 determines that a request for accepting visual communication is received according to the content of the packet, knows that the called party is STB_1 by looking up in a CAM table according to the service number, and node server MSS-400 knows the link topology related to the current service according to its internal address information table, and determines that the link is permitted and communication may be established between the two parts.

In such a case, node server MSS-400 configures its own table 2 as follows:

"10 0000 0000 0001 0010"=>"000 0000 0010", i.e., a unicast data packet with a destination address (DA) of 0x1000 0x0000 0x0000 0x0012 (i.e., set-top box BX-008-1) is oriented to port 1;

"10 0000 0000 0000 1001"=>"000 0000 0001", i.e., a unicast data packet with a destination address (DA) of 0x1000 0x0000 0x0000 0x0009 (i.e., set-top box BX-008-0) is oriented to port 0;

Moreover, node server MSS-400 sends a port configuration command to all Ethernet protocol conversion gateways on the uplink (the calling path) and the downlink (the called path), for requesting to open the uplink of the address of the opposite party and the downlink of the address of its own and at the same time.

| 8e01 Field Number | Length | Code | Description |
| --- | --- | --- | --- |
| 0 | 1W | 8e01 | user request instruction (target terminal → node server) |
| 1 | 1W | | service type (service_type) |
| 2-4 | 3W | | user number (source terminal number) |
| 5 | 1W | | user extension number (source terminal extension number) |
| 6-31 | 26W | | service parameter (SERVICE_TYPE_PERMISSION) |

S4) Ethernet protocol conversion gateway BX-008-1 removes the MAC address (MAC DA) of Ethernet protocol conversion gateway BX-008-1 and the MAC address (MAC SA) of set-top box STB_1 in the reply protocol packet, then Two packets sent to Ethernet protocol conversion gateway BX-008-0:

1) the first packet: DA is 0x8000 0x0000 0x0000 0x0001, SA is 0x0000 0x0000 0x0000 0x0000, reserved is 0x0000, and PDU part is as shown in the following table:

| 8b54 Field Number | Length | Code | Description |
| --- | --- | --- | --- |
| 0 | 1W | 8b54 | Ethernet protocol conversion gateway port configuration command (node server → Ethernet protocol conversion gateway) |
| 1 | 1W | | device type (BX-008) |
| 2-5 | 4W | | address of port to be opened: 0x1000 0x0000 0x0000 0x0012 |
| 6 | 1W | | operation mode: "10 0000 0000", which represents that uplink port 9 is opened |

| 8b54 Field Number | Length | Code | Description |
|---|---|---|---|
| 7-10 | 4W | | 0000 |
| 11 | 1W | | data type 0x10 |
| 12 | 1W | | Ethernet protocol conversion gateway address (access network address) 0x0001 |
| 13-15 | 3W | | Ethernet protocol conversion gateway device flag |
| 16-31 | 18W | | 0000 |

2) the second packet: DA is 0x8000 0x0000 0x0000 0x0001, SA is 0x0000 0x0000 0x0000 0x0000, reserved is 0x0000, and PDU part is as shown in the following table:

| 8b54 Field Number | Length | Code | Description |
|---|---|---|---|
| 0 | 1W | 8b54 | Ethernet protocol conversion gateway port configuration command (node server → Ethernet protocol conversion gateway) |
| 1 | 1W | | device type (BX-008) |
| 2-5 | 4W | | address of port to be opened: 0x1000 0x0000 0x0000 0x0009 |
| 6 | 1W | | operation mode: "00 0000 0001", which represents that port 0 is opened |
| 7-10 | 4W | | 0000 |
| 11 | 1W | | data type 0x10 |
| 12 | 1W | | Ethernet protocol conversion gateway address (access network address) 0x0001 |
| 13-15 | 3W | | Ethernet protocol conversion gateway device flag |
| 16-31 | 18W | | 0000 |

Two packets sent to Ethernet protocol conversion gateway BX-008-1:

1) the first packet: DA is 0x8000 0x0000 0x0000 0x0002, SA is 0x0000 0x0000 0x0000 0x0000, reserved is 0x0000, and PDU is as shown in the following table:

| 8b54 Field Number | Length | Code | Description |
|---|---|---|---|
| 0 | 1W | 8b54 | Ethernet protocol conversion gateway port configuration command (node server → Ethernet protocol conversion gateway) |
| 1 | 1W | | device type (BX-008) |
| 2-5 | 4W | | address of port to be opened: 0x1000 0x0000 0x0000 0x0009 |
| 6 | 1W | | operation mode: "10 0000 0000", which represents that uplink port 9 is opened |
| 7-10 | 4W | | 0000 |
| 11 | 1W | | data type 0x10 |
| 12 | 1W | | Ethernet protocol conversion gateway address (access network address) 0x0002 |
| 13-15 | 3W | | Ethernet protocol conversion gateway device flag |
| 16-31 | 18W | | 0000 |

2) the second packet: DA is 0x8000 0x0000 0x0000 0x0002. SA is 0x0000 0x0000 0x0000 0x0000, reserved is 0x0000, and PDU is as shown in the following table:

| 8b54 Field Number | Length | Code | Description |
|---|---|---|---|
| 0 | 1W | 8b54 | Ethernet protocol conversion gateway port configuration command (node server → Ethernet protocol conversion gateway) |
| 1 | 1W | | device type (BX-008) |
| 2-5 | 4W | | address of port to be opened: 0x1000 0x0000 0x0000 0x0012 |
| 6 | 1W | | operation mode: "00 0000 0010", which represents that port 1 is opened |
| 7-10 | 4W | | 0000 |
| 11 | 1W | | data type 0x10 |
| 12 | 1W | | Ethernet protocol conversion gateway address (access network address) 0x0002 |
| 13-15 | 3W | | Ethernet protocol conversion gateway device flag |
| 16-31 | 18W | | 0000 |

Packet sent to set-top box STB-0 (service processing command, and coding/decoding command in this example):

wherein, DA is 0x8000 0x0000 0x0000 0x0009, SA is 0x0000 0x0000 0x0000 0x0000, reserved is 0x0000, and PDU part is as shown in the following table:

| 8704 Field Number | Length | Code | Description |
|---|---|---|---|
| 0 | 1W | 8704 | coding/decoding command (node server → source terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |

-continued

| 8704 Field Number | Length | Code | Description |
|---|---|---|---|
| 25 | 1W | | 0xffff = maintaining the original state |
| 26 | 1W | | 0xffff = maintaining the original state |
| 27-31 | 5w | | 0 |

Packet sent to STB-1 (service processing command, and coding/decoding command in this example):

wherein, DA is 0x8000 0x0000 0x0000 0x0012, SA is 0x0000 0x0000 0x0000 0x0000, reserved is 0x0000, and PDU part is as shown in the following table:

| 8704 Field Number | Length | Code | Description |
|---|---|---|---|
| 0 | 1W | 8704 | coding/decoding command (node server → target terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0009 |
| 19-22 | 4W | | 0x1000 0x0000 0x0000 0x0012 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

In the PDU of the above coding/decoding command, field number 13 represents coding type: 0=stopping coding, 0ffff=maintaining the original state, 0xfffe=returning data decoded, without coding locally; Field Number 14 represents decoding type: 0=stopping decoding, 0ffff=maintaining the original state; Field Number 15-18 represents coding address (DA or multicast address): 0xffff=maintaining the original state; Field Number 19-22 represents decoding address (DA or multicast address): 0xffff=maintaining the original state; Field Number 23 represents: HB: coded HDA, LB: decoded HAD; 0xffff=maintaining the original state; Field Number 24 represents alarm parameter: 0=alarm shut down, 1=alarm enabled, 0xffff=maintaining the original state; Field Number 25 represents holder operating parameter: 0xffff=maintaining the original state; Field Number 26 represents auxiliary channel operating parameter: 0xffff=maintaining the original state.

Wherein, the coding type is as shown in the following table:

| Code | Video Compression | Video System | Audio Compression | Flow Level |
|---|---|---|---|---|
| 0x3215 | MPEG4 | PAL | MP3 | 1.7M |
| 0x3217 | MPEG4 | PAL | MP3 | 3.3M |
| 0x3218 | MPEG4 | PAL | MP3 | 6.6M |

S5) According to the configuration of table 0 on node server MSS-400 and the configuration of table 0 on Ethernet protocol conversion gateways BX-008-0 and BX-008-1, the above 4 packets sent to the Ethernet protocol conversion gateways will be respectively oriented to BX-008-0 and BX-008-1.

In such a case, Ethernet protocol conversion gateway BX-008-0 configures its own table 2 as follows:
"10 0000 0000 0001 0010"=>"10 0000 0000", i.e., a unicast data packet with a destination address (DA) of 0x1000 000 0x0000 0x0000 0x0012 is oriented to port 9;
"10 0000 0000 0000 1001"=>"00 0000 0001", i.e., a unicast data packet with a destination address (DA) of 0x1000 0x0000 0x0000 0x0009 is oriented to port 0;

Ethernet protocol conversion gateway BX-008-1 configures its own table 2 as follows:
"10 0000 0000 0001 0010"=>"00 0000 0010", i.e., a unicast data packet with a destination address (DA) of 0x1000 0x0000 0x0000 0x0012 is oriented to port 1;
"10 0000 0000 0000 1001"=>"10 0000 0000", i.e., a unicast data packet with a destination address (DA) of 0x1000 0x0000 0x0000 0x0009 is oriented to port 9;

According to the configuration of table 0 on node server MSS-400 and the configuration of table 0 on Ethernet protocol conversion gateways BX-008-0 and BX-008-1, the latter 2 packets sent to the set-top box will be respectively oriented to set-top boxes STB-0 and STB-1. During this process, BX-008-0 and BX-008-1 will respectively add the corresponding MAC DA and MAC SA into the 2 packets. After receiving the packet, set-top boxes STB-0 and STB-1 may start coding/decoding according to the content of the packet, and receive and send unicast data.

Specifically, after the communication link of the current service is configured, the process in which set-top boxes STB-0 and STB-1 receive and send unicast data based on the communication link is as follows:

1) Set-top box STB-0 sends a unicast data packet to set-top box STB-1, wherein the packet contains the MAC address (MAC DA) of Ethernet protocol conversion gateway BX-008-0 and the MAC address (MAC SA) of set-top box STB_0, wherein DA of the packet is 0x1000 0x0000 0x0000 0x0012, and SA is 0x0000 0x0000 0x0000 0x0009;

2) The unicast data packet enters Ethernet protocol conversion gateway BX-008-0, and firstly, the MAC DA and MAC SA are removed, then a switching engine module of Ethernet protocol conversion gateway BX-008-0 looks up in table 2 according to a combined address field, wherein the table address is "10 0000 0000 0001 0010", the output of the item is "10 0000 0000" ("10 0000 0000 0001 0010"=>"10 0000 0000", i.e., a unicast data packet with a destination address (DA) of 0x1000 0x0000 0x0000 0x0012 is oriented to port 9), which represents that uplink port 9 is opened, and the current unicast data packet enters node server MSS-400 via port 9;

3) After node server MSS-400 receives the unicast data packet, its switching engine looks up in table 2 according to a combined address field, wherein the table address is "10 0000 0000 0001 0010", the output of the item is "000 0000 0010" ("10 0000 0000 0001 0010"=>"000 0000 0010", i.e., a unicast data packet with a destination address (DA) of 0x1000 0x0000 0x0000 0x0012 is oriented to port 1), which represents that downlink port 1 is opened, and the current unicast data packet enters Ethernet protocol conversion gateway BX-008-1 via port 1;

4) Ethernet protocol conversion gateway BX-008-1 receives the unicast data packet, its switching engine module looks up in table 2 according to a combined address field, wherein the table address is "10 0000 0000 0001 0010", the output of the item is "00 0000 0010" ("10 0000 0000 0001 0010"=>"00 0000 0010", i.e., a unicast data packet with a destination address (DA) of 0x1000 0x0000 0x0000 0x0012 is oriented to port 1), which represents that downlink port 1 is opened, and the current unicast data packet enters set-top box STB-1 via port 1; and during this process, BX-008-1 adds the MAC address (MAC SA) of Ethernet protocol conversion gateway BX-008-1 and the MAC address (MAC DA) of set-top box STB-1 into the packet.

5) Set-top box STB-1 sends a unicast data packet to set-top box STB-0, wherein DA of the packet is 0x1000 0x0000 0x0000 0x0009, and SA is 0x0000 0x0000 0x0000 0x0012; the packet further contains the MAC address (MAC DA) of Ethernet protocol conversion gateway BX-008-1 and the MAC address (MAC SA) of set-top box STB_1;

6) The unicast data packet enters Ethernet protocol conversion gateway BX-008-1, and firstly, the MAC DA and MAC SA are removed, then a switching engine module of Ethernet protocol conversion gateway BX-008-1 looks up in table 2 according to a combined address field, wherein the table address is "10 0000 0000 0000 1001", the output of the item is "10 0000 0000" ("10 0000 0000 0000 1001"=>"10 0000 0000", i.e. a unicast data packet with a destination address (DA) of 0x1000 0x0000 0x0000 0x0009 is oriented to port 9), which represents that uplink port 9 is opened, and the current unicast data packet enters node server MSS-400 via port 9;

7) After node server MSS-400 receives the unicast data packet, its switching engine looks up in table 2 according to a combined address field, wherein the table address is "10 0000 0000 0000 1001", the output of the item is "000 0000 0001" ("10 0000 0000 0000 1001"=>"000 0000 0001", i.e., a unicast data packet with a destination address (DA) of 0x1000 0x0000 0x0000 0x0009 is oriented to port 0), which represents that downlink port 0 is opened, and the current unicast data packet enters Ethernet protocol conversion gateway BX-008-0 via port 0;

8) Ethernet protocol conversion gateway BX-008-0 receives the unicast data packet, its switching engine module looks up in table 2 according to a combined address field, wherein the table address is "10 0000 0000 0000 1001", the output of the item is "00 0000 0001" ("10 0000 0000 0000 1001"=>"00 0000 0001", i.e., a unicast data packet with a destination address (DA) of 0x1000 0x0000 0x0000 0x0009 is oriented to port 0), which represents that downlink port 0 is opened, and the current unicast data packet enters set-top box STB-0 via port 0. During this process, BX-008-0 adds the MAC address (MAC SA) of Ethernet protocol conversion gateway BX-008-0 and the MAC address (MAC DA) of set-top box STB-0 into the packet.

3.3.5 An Example of the Communication Connection Process of a Multicast Communication Service Again referring to FIG. 7, it is hypothesized that there exists a node server MSS-400 (with an access network address of 0x0000), port 0 thereof is connected with Ethernet protocol conversion gateway BX-008-0 (with an access network address of 0x0001), port 1 thereof is connected with Ethernet protocol conversion gateway BX-008-1 (with an access network address of 0x0002), and port 0 of BX-008-0 is connected with set-top box STB-0 (with an access network address of 0x0009), the number of STB_0 is 0x6666 0x6666 0x6666, port 1 of BX_008-1 is connected with set-top box STB-1 (with an access network address of 0x0012), and the number of STB_1 is 0x8888 0x8888 0x8888. Set-top box STB_0 requests to node server MSS-400 for initiating living broadcast in the following steps:

1) Set-top box STB_0 issues a service request protocol packet for initiating living broadcast, which contains the MAC address (MAC DA) of Ethernet protocol conversion gateway BX-008-0 and the MAC address (MAC SA) of set-top box STB_0, wherein DA of the packet is 0x0800 0x0000 0x0000 0x0000, SA is 0x0000 0x0000 0x0000 0x0009, reserved is 0x0000 (reserved word), and the PDU part is as shown in the following table:

| 8e01 Field Number | Length | Code | Description |
|---|---|---|---|
| 0 | 1W | 8e01 | terminal request instruction (terminal → node server) |
| 1 | 1W | | service type (service_type) |
| 2-4 | 3W | | terminal number (number of requestor) 0000 |
| 5 | 1W | | terminal extension number (extension number of requestor) 0000 |
| 6-31 | 26W | | #define SERVICE_TYPE_ORG_CAST_REQUEST 0x8009, requesting for originating a living broadcast |

2) Ethernet protocol conversion gateway BX-008-0 connected between set-top box STB_0 and node server MSS-400 receives the service request protocol packet; firstly, it removes the MAC address (MAC DA) of Ethernet protocol conversion gateway BX-008-0 and the MAC address (MAC SA) of set-top box STB_0 in the packet.

Then, according to the configuration of table 1, the service request protocol packet is oriented to node server MSS-400, node server MSS-400 determines that a request for initiating living broadcast (service type) is received according to the content of the packet, knows that the user (source terminal) is STB_0 by looking up in a CAM table (content-address mapping table) according to the service number, knows the link topology related to the current service according to its internal address information table, and it determines that the link is permitted and living broadcast may be initiated, then it allocates a multicast address of 0x0008. Moreover, the node server sends a port configuration command to all Ethernet protocol conversion gateways on the current communication link, for requesting to open the uplink of the address of the opposite party and the downlink of the address of its own and at the same time. At this point, it knows that only Ethernet protocol conversion gateway BX-008-0 needs to be configured at present by link topology determination.

In such a case, node server MSS-400 sends a packet to Ethernet protocol conversion gateway BX-008-0;

wherein, DA is 0x8000 0x0000 0x0000 0x0001, SA is 0x0000 0x0000 0x0000 0x0000, reserved is 0x001 (reserved word), and the PDU part is as shown in the following table:

| 8b54 Field Number | Length | Code | Description |
|---|---|---|---|
| 0 | 1W | 8b54 | Ethernet protocol conversion gateway port configuration command (node server -> Ethernet protocol conversion gateway) |
| 1 | 1W | | device type (BX-008) |
| 2-5 | 4W | | 0x7800 0x0000 0x0000 0x0008 |
| 6 | 1W | | "00 0000 0001", which represents that port 0 is opened |
| 7-10 | 4W | | 0000 |
| 11 | 1W | | data type 0x78 |
| 12 | 1W | | Ethernet protocol conversion gateway address (access network address) 0x0001 |
| 13-15 | 3W | | Ethernet protocol conversion gateway device flag |
| 16-31 | 18W | | 0000 |

Node server MSS-400 sends a packet to set-top box STB-0 (service processing command, and coding/decoding command in this example):

wherein, DA is 0x8000 0x0000 0x0000 0x0009SA is 0x0000 0x0000 0x0000 0x0000, reserved is 0x0000, and PDU part is as shown in the following table:

| 8704 Field Number | Length | Code | Description |
|---|---|---|---|
| 0 | 1W | 8704 | coding/decoding command (node server → set-top box) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x7800 0x0000 0x0000 0x000 |
| 19-22 | 4W | | 0x7800 0x0000 0x0000 0x0008 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

3) According to the configuration of table 0 on node server MSS-400, the packet sent to Ethernet protocol conversion gateway BX-008-0 will be oriented to BX-008-0. In such a case, BX-008-0 configures its own table 3 as follows:

"11 0000 0000 0000 1000"=>"00 0000 0001", i.e., a multicast data packet with a destination address (DA) of 0x7800 0x0000 0x0000 0x0008 is oriented to port 0;

4) According to the configuration of table 0 on node server MSS-400 and the configuration of table 0 on Ethernet protocol conversion gateway BX-008-0, the packet sent to set-top box STB-0 will be oriented to STB-0. During this process, BX-008-0 adds the MAC (MAC SA) of BX-008-0 and the MAC (MAC DA) of STB-0 into the packet and sends it. STB-0 starts coding/decoding according to the content of the packet, and starts receiving and sending multicast data.

Specifically, the process in which set-top box STB-0 initiates a communication link to receive and send multicast data based on the current living broadcast is as follows:

1) Set-top box STB-0 issues a multicast data packet, wherein the packet contains the MAC (MAC DA) of BX-008-0 and the MAC (MAC SA) of STB-0, wherein DA of the packet is 0x7800 0x0000 0x0000 0x0008 (multicast address), and SA is 0x0000 0x0000 0x0000 0x0000 0x0009:

2) The multicast data packet enters Ethernet protocol conversion gateway BX-008-0, and firstly, the MAC DA and MAC SA are removed, then a switching engine module of Ethernet protocol conversion gateway BX-008-0 looks up in table 3 according to a combined address field, wherein the table address is "11 0000 0000 0000 1000", the output of the item is "00 0000 0001" ("11 0000 0000 0000 1000"=>"00 0000 0001", i.e., a multicast data packet with a destination address (DA) of 0x7800 0x0000 0x0000 0x0008 is oriented to port 0), which represents that downlink port 0 is opened, and the current multicast data packet enters set-top box STB-0 via port 0. During this process, BX-008-0 further adds the MAC (MAC SA) of BX-008-0 and the MAC (MAC DA) of STB-0 into the packet, and sends the packet via port 0.

Set-top box STB_1 requests to node server MSS-400 for watching living broadcast in the following steps, with a number of 0x6666 0x6666 0x6666:

1) Set-top box STB_1 issues a service request protocol packet for watching living broadcast, wherein the packet contains the MAC (MAC DA) of BX-008-1 and the MAC (MAC SA) of STB_1, wherein DA of the packet is 0x0800 0x0000 0x0000 0x0000, SA is 0x0000 0x0000 0x0000 0x0012, reserved is 0x0000, and PDU part is as shown in the following table:

| 8e01 Field Number | Length | Code | Description |
|---|---|---|---|
| 0 | 1W | 8e01 | user request instruction (terminal → node server) |
| 1 | 1W | | service type (service_type) |
| 2-4 | 3W | | terminal number (number of requestor) 0x6666 0x6666 0x6666 |
| 5 | 1W | | terminal extension number (extension number of requestor) 0000 |
| 6-31 | 26W | | #define SERVICE_TYPE_RCV_CAST_DIRECT 0x8025, requesting for watching living broadcast |

2) Ethernet protocol conversion gateway BX-008-1 connected between set-top box STB_1 and node server MSS-400 firstly removes the MAC DA and MAC SA, and then according to the configuration of table 1, node server MSS-400 determines that a request for watching living broadcast is received according to the content of the packet, knows that the initiator (source terminal) is STB_0 by looking up in a CAM table according to the service number, knows the link topology related to the current service according to its internal address information table, and it determines that the link is permitted and living broadcast may be watched, thus it allocates a multicast address (corresponding to the multicast address allocated to the source terminal) of 0x0008. Moreover, the node server sends a port configuration command to all Ethernet protocol conversion gateways on the current communication link, for requesting to open the uplink of the address of the opposite party and the downlink of the address of its own and at the same time. In such a case, node server MSS-400 configures its own table 3 as follows:

"11 0000 0000 0000 1000"=>"000 0000 0010", i.e., a multicast data packet with a destination address (DA) of 0x7800 0x0000 0x0000 0x0008 is oriented to port 1;

At the same time, node server MSS-400 sends a packet to Ethernet protocol conversion gateway BX-008-0:

wherein, DA is 0x8000 0x0000 0x0000 0x0001, SA is 0x0000 0x0000 0x0000 0x0000, reserved is 0x0000, and PDU part is as shown in the following table:

| 8b54 Field Number | Length | Code | Description |
|---|---|---|---|
| 0 | 1W | 8b54 | Ethernet protocol conversion gateway port configuration command (node server → Ethernet protocol conversion gateway) |
| 1 | 1W | | device type (BX-008) |
| 2-5 | 4W | | 0x7800 0x0000 0x0000 0x0008 |
| 6 | 1W | | "10 0000 0001", which represents that port 9 is opened |
| 7-10 | 4W | | 0000 |
| 11 | 1W | | data type 0x78 |
| 12 | 1W | | Ethernet protocol conversion gateway address (access network address) 0x0001 |
| 13-15 | 3W | | Ethernet protocol conversion gateway device flag |
| 16-31 | 18W | | 0000 |

At the same time, node server MSS-400 sends a packet to Ethernet protocol conversion gateway BX-008-1:

wherein, DA is DA is 0x8000 0x0000 0x0000 0x0002, SA is 0x0000 0x0000 0x0000 0x0000, reserved is 0x0000, and PDU part is as shown in the following table:

| 8b54 Field Number | Length | Code | Description |
|---|---|---|---|
| 0 | 1W | 8b54 | Ethernet protocol conversion gateway port configuration command (node server → Ethernet protocol conversion gateway) |
| 1 | 1W | | device type (BX-008) |
| 2-5 | 4W | | 0x7800 0x0000 0x0000 0x0008 |
| 6 | 1W | | "00 0000 0010", represents port 1 |
| 7-10 | 4W | | 0000 |
| 11 | 1W | | data type 0x78 |
| 12 | 1W | | Ethernet protocol conversion gateway address (access network address) 0x0002 |
| 13-15 | 3W | | Ethernet protocol conversion gateway device flag |
| 16-31 | 18W | | 0000 |

At the same time, node server MSS-400 sends a packet to set-top box STB-1:

wherein, DA is DA is 0x8000 0x0000 0x0000 0x0012, SA is 0x0000 0x0000 0x0000 0x0000, reserved is 0x0000, and PDU part is as shown in the following table:

| 8704 Field Number | Length | Code | Description |
|---|---|---|---|
| 0 | 1W | 8704 | coding/decoding command (node server → terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0 |
| 14 | 1W | | 0x3217 |
| 15-18 | 4W | | 0xffff |
| 19-22 | 4W | | 0x7800 0x0000 0x0000 0x0008 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

3) According to the configuration of table 0 on node server MSS-400, the packets sent to Ethernet protocol conversion gateways BX-008-0 and BX-008-1 will be respectively oriented to Ethernet protocol conversion gateways BX-008-0 and BX-008-1.

In such a case, Ethernet protocol conversion gateway BX-008-0 configures its own table 3 as follows:

"11 0000 0000 0000 1000"=>"10 0000 0001", i.e. a multicast data packet with a destination address (DA) of 0x7800 0x0000 0x0000 0x0008 is oriented to port 0 and port 9;

Ethernet protocol conversion gateway BX-008-1 configures its own table 3 as follows:

"11 0000 0000 0000 1000"=>"00 0000 0010", i.e., a multicast data packet with a destination address (DA) of 0x7800 0x0000 0x0000 0x0008 is oriented to port 1;

4) According to the configuration of table 0 on node server MSS-400 and the configuration of table 0 on Ethernet protocol conversion gateway BX-008-1, the packet sent to set-top box STB-1 will be oriented to STB-1. STB-1 receives multicast data and decodes the data according to the content of the packet. BX-008-1 will add the MAC (MAC SA) of BX-008-1 and the MAC (MAC DA) of STB-1 into the packet and then send the packet.

Specifically, the process in which set-top box STB-1 receives multicast data based on the current communication link on which living broadcast is watched is as follows:

1) Set-top box STB-0 issues a multicast data packet, wherein the packet contains the MAC address (MAC DA) of Ethernet protocol conversion gateway BX-008-0 and the MAC address (MAC SA) of set-top box STB_0, wherein DA of the packet is 0x7800 0x0000 0x0000 0x0008 (multicast address), and SA is 0x0000 0x0000 0x0000 0x0009;

2) The multicast data packet enters Ethernet protocol conversion gateway BX-008-0, and firstly, the MAC DA and MAC SA are removed, then a switching engine module of Ethernet protocol conversion gateway BX-008-0 looks up in table 3 according to a combined address field, wherein the table address is "11 0000 0000 0000 1000", the output of the item is "10 0000 0001" ("11 0000 0000 0000 1000"=>"10 0000 0001", i.e., a multicast data packet with a destination address (DA) of 0x7800 0x0000 0x0000 0x0008 is oriented to port 0 and port 9), which represents that downlink port 0 and uplink port 9 are opened, and the current multicast data packet enters set-top box STB-0 via port 0, and enters node server MSS-400 via port 9;

wherein, BX-008-0 adds the MAC address (MAC SA) of BX-008-0 and the MAC address (MAC DA) of set-top box STB_0 to the packet that enters set-top box STB-0 via port 0.

3) After node server MSS-400 receives the multicast data packet, its switching engine module looks up in table 3 according to a combined address field, wherein the table address is "11 0000 0000 0000 1000", the output of the item is "000 0000 0010" ("11 0000 0000 0000 1000"=>"000 0000 0010", i.e. a multicast data packet with a destination address (DA) of 0x7800 0x0000 0x0000 0x0008 is oriented to port 1), which represents that downlink port 1 is opened, the current multicast data packet enters Ethernet protocol conversion gateway BX-008-1 via port 1;

4) After Ethernet protocol conversion gateway BX-008-1 receives the multicast data packet, its switching engine module looks up in table 3 according to a combined address field, wherein the table address is "11 0000 0000 0000 1000", the output of the item is "00 0000 0010" ("11 0000 0000 0000 1000"=>"00 0000 0010", i.e., a multicast data packet with a destination address (DA) of 0x7800 0x0000 0x0000 0x0008 is oriented to port 1), which represents that downlink port 1 is opened, the current multicast data packet enters set-top box STB-1 via port 1. The MAC (MAC SA) of BX-008-1 and the MAC (MAC DA) of STB-1 are added into the packet.

3.3.6 Flow Control of an Ethernet Protocol Conversion Gateway

Figure 12:
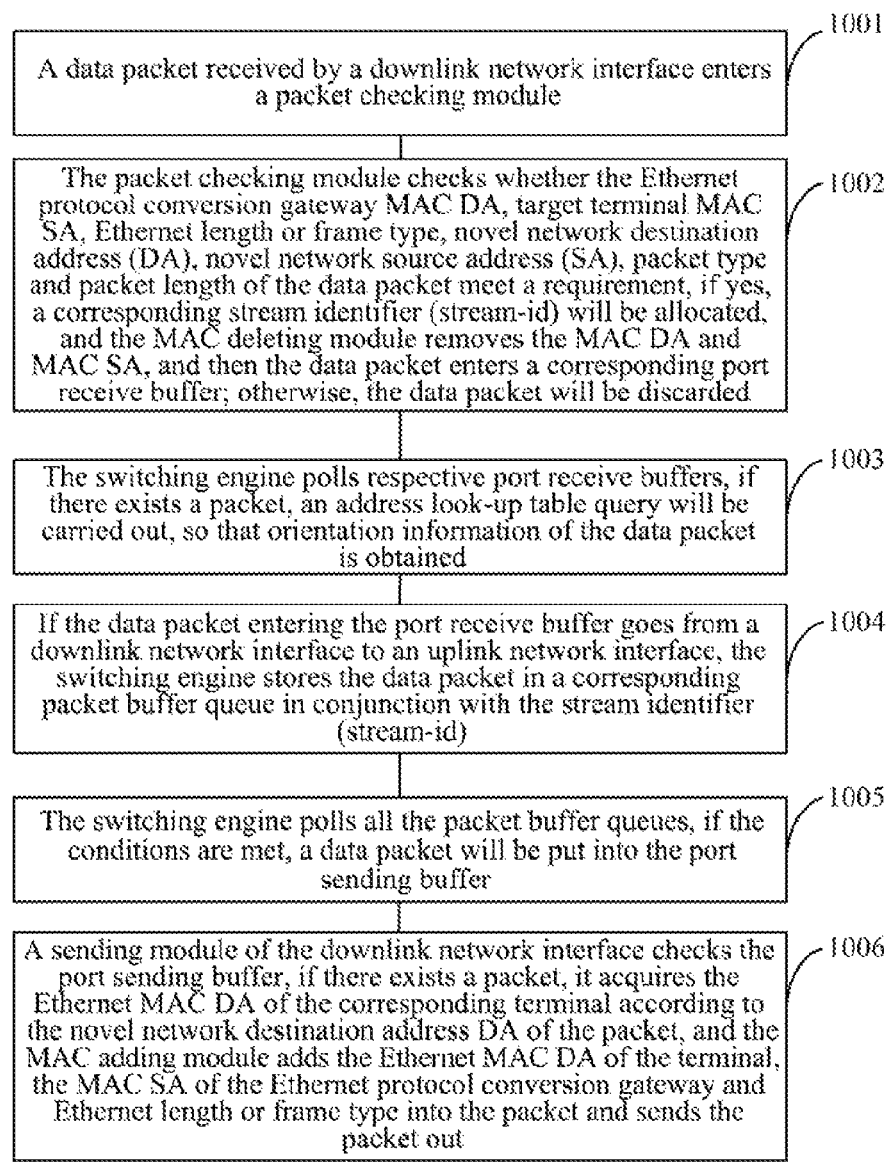
FIG. 12 is a flow chart showing the process in which an Ethernet protocol conversion gateway performs flow control according to an embodiment of the invention.
Figure 13:
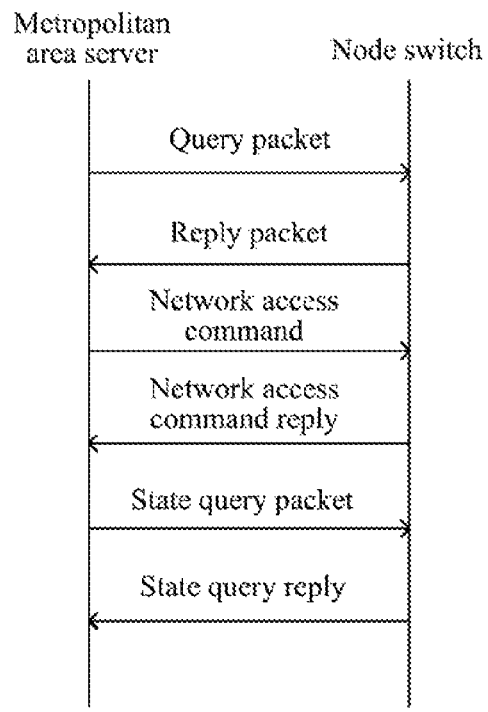
FIG. 13 is a schematic diagram showing the network access process of a node switch according to the invention.

The Ethernet protocol conversion gateway may also performs accurate flow control on a packet or a protocol packet passing through it. Referring to FIG. 12, the process is as follows:

Step 1001: A data packet received by a downlink network interface enters a packet checking module;

Step 1002: The packet checking module checks whether the Ethernet protocol conversion gateway MAC DA, target terminal MAC SA, Ethernet length or frame type, novel network destination address (DA), novel network source address (SA), packet type and packet length of the data packet meet a requirement, if yes, a corresponding stream identifier (stream-id) will be allocated, and the MAC deleting module removes the MAC DA and MAC SA, and then the data packet enters a corresponding port receive buffer otherwise, the data packet will be discarded;

However, a data packet received by the uplink network interface directly enters the corresponding port receive buffer, and a data packet received by the CPU module interface also directly enters the corresponding port receive buffer. This is because that only uplink forwarding is controlled in this embodiment. Therefore, the data packets received by the uplink network interface and the CPU module interface will not be checked.

In this embodiment, stream identifier (stream-id) may be of 8 bit, which corresponds to 256 streams.

Step 1003: The switching engine polls respective port receive buffers, if there exists a packet, an address look-up table query will be carried out, so that orientation information of the data packet is obtained;

The packet address table will be looked up for a data packet; if it is a unicast data packet, table 2 will be looked up, and if it is a multicast data packet, table 3 will be looked up.

Step 1004: If the data packet entering the port receive buffer goes from a downlink network interface to an uplink network interface, the switching engine stores the data packet in a corresponding packet buffer queue in conjunction with the stream identifier (stream-id); if the packet buffer queue is to be full, the data packet is discarded;

If the data packet entering the port receive buffer does not go from a downlink network interface to an uplink network interface (for example, it goes from an uplink network interface to a downlink network interface, or goes from a CPU module interface to a downlink network interface, etc.), the switching engine stores the data packet in a corresponding packet buffer according to the orientation information of the packets; if the packet buffer queue is to be full, the packets are discarded;

In the packet buffer, it is hypothesized that there exist 256 stream types, then there may be 256 buffers, for buffering the data packets corresponding different streams respectively.

The above describes the receiving part of a packet, and the sending part of a packet will be described below.

Step 1005: A switching engine polls all the packet buffer queues, which may be divided into the following two situations:

First Situation: if the queue goes from a downlink network interface to an uplink network interface, it will be forwarded when the following conditions are met:

1) the port sending buffer is not full;
2) the count of the packet counter in the queue is larger than 0; and
3) a token generated by a code rate control module is obtained;

wherein, so-called forwarding represents that a packet is read by the switching engine from the packet buffer queue sequentially, and then written into the port sending buffer of the uplink network interface.

Second Situation: if the queue does not go from a downlink network interface to an uplink network interface, it will be forwarded when the following conditions are met:

1) the port sending buffer is not full; and
2) the count of the packet counter in the queue is larger than 0.

Step 1006: A sending module of the downlink network interface checks the port sending buffer, if there exists a packet, it acquires the Ethernet MAC DA of the corresponding terminal according to the novel network destination address DA of the packet, and the MAC adding module adds the Ethernet MAC DA of the terminal, the MAC SA of the Ethernet protocol conversion gateway and Ethernet length or frame type into the packet and sends the packet out.

The sending module of the uplink network interface checks the sending buffer of the port, if there exists a packet, it sends the packet.

In this embodiment, the Ethernet protocol conversion gateway is based on a storing-forwarding mechanism, all ports have a receive buffer and a sending buffer, and these buffers are set inside the switch chip, so they cannot be too large, and the size of each receive buffer or sending buffer is between 2 kbyte to 4 kbyte, which can buffer about 2 to 3 maximum Ethernet packet (about 1556 bytes). However, these buffers are not enough, so packet buffers need to be added outside the switch chip, and grain packet buffers such as SDRAM and SRAM, etc., are usually employed; for example, a 16-Mbyte SDRAM may be used as a packet buffer, which may store 10K maximum Ethernet packets (about 1556 bytes). So-called port sending buffer not full represents that the port sending buffer can at least store a further maximum Ethernet packet (about 1556 bytes), thus it may guarantee that no sending buffer will be overflown.

The process in which a code rate control module generates a token will be illustrated in detail below according to an example.

A code rate control module of an access network switch configures a group of counters for each stream, which are respectively defined as follows:

| | |
|---|---|
| bit (68) = op | '0'--->reset, '1'--->normal |
| bit (67 downto 60) = frame_cnt | 0-255 |
| bit (59 downto 50) = frame_4byte | −511-511 |
| bit (49 downto 41) = max_frame_4byte | 0-511 |
| bit (40 downto 32) = add_4byte | 0-511 |
| bit (31 downto 16) = timer_set | |
| bit (15 downto 0) = timer_cnt | | bit (68)=op, when op='0', it represents that the counter is initialized as zero; when op='1', it represents a normal operation.

bit (67 downto 60)=frame_cnt, it represents the packet count in the packet buffer queue, which is hypothesized as 8 bit (0-255);

bit (59 downto 50)=frame_4byte, it represents the number of bytes that may be sent (it should be noted that frame_4 byte is a 4-byte counter, and it is hypothesized that frame_4byte=4, which represents that the number of bytes that may be sent is 16, and at the same time, the counter may be negative, which is hypothesized here as 10 bit, so the range is −511-511);

bit (49 downto 41)=max_frame_4 byte, it represents the maximum value of the number of bytes that may be sent, which is hypothesized here as 9 bit (0-511);

bit (40 downto 32)=add_4byte, it represents the number of bytes that may be sent, which is added each time a fixed time elapses (it should be noted that add_4byte is a 4-byte counter, and It is hypothesized that add_4byte=4, which represents that the added number of bytes that may be sent is 16, which is hypothesized here as 9 bit, so the range is 0-511);

bit (31 downto 16)=timer_set, it represents a time interval that is set, it is hypothesized that the system query period is 50 us, if timer_set=100, it represents that the time interval that is set will be 50us×100=5 ms, which is hypothesized here as 16 bit;

bit (15 downto 0)=timer_cnt, it represents a system query period counter, it is hypothesized that the system query period is 50us, it represents that timer_cnt is increased by 1 each 50us, which is hypothesized here as 16 bit.

It is hypothesized that there are totally 256 streams, then 256 groups of counters will be maintained in the code rate control module. The processing time of the code rate control module on each group of counters is 10 clock cycles, the frequency of the system clock is 125 MHz, that is, the clock cycle is 8 ns. Then, the time needed to processing 256 groups of counters will be 256×10×8 ns=20480 ns=20.48us, and it is hypothesized that the system query period is 50us, then a very large redundancy exists.

For easy description, it is hypothesized here that the counter of the 50$^{th}$ stream is respectively set as follows:
timer_set=100.
add__4byte=16,
frame__4byte=−10,
max_frame__4byte=400,
frame_cnt=2.

The code rate control module checks the counter of the 50$^{th}$ stream, if timer_cnt=timer_set (100), which represents that the packet sending time is found according to the time interval that is set, then frame__4byte=frame__4byte+add__4byte, and it determines whether frame_4byte is larger than max_ frame__4byte, if Yes, frame__4byte=max_frame__4byte. In the above example, frame 4 byte=frame__4byte+add__ 4byte=−10+16=6, which is less than max_frame__4byte (400).

Then, if frame__4byte is larger than 0 and frame_cnt is larger than 0, the code rate control module sends a token to the switching engine (in the example, the token number is 50). The switching engine takes a packet from the corresponding packet buffer queue (in this example, packet buffer queue 50) according to the token number, and sends it; and at the same time, it returns the packet length to the code rate control module. The code rate control module subtracts the corresponding packet length from frame__4byte, it is hypothesized that the packet length frame_length=20 (an integral multiple of 4 byte), then frame__4byte=frame__4byte−frame_ length=6−20=−14.

The above counters op, max_frame__4byte, add__4byte and timer_set will be flow control information, which are all configured by the CPU module (which are obtained via the protocol interaction with the node server), timer_cnt is initialized as 0, and it is increased by 1 each time a system query period elapses; frame_cnt is initialized as 0, and if a packet is added to the packet buffer queue, frame_cnt will be increased by 1. The code rate control module may convert a nonuniform data flow that is input into a uniform data flow for sending by controlling the parameters of max_frame__4byte, add__ 4byte, timer_set. For example, if it needs to output a data flow with a packet length of 1024 byte and an interval of 5 ms, it sets as follows:
max_frame__4byte=256 (1024 byte),
add__4byte=256 (1 024 byte),
timer_set=100 (it is hypothesized that system query period is 50 μs).

It can be known from the above that, for different services, the corresponding flow will be different, then the flow control information obtained by the CPU module from the node server will be different, too. Moreover, the above code rate control not only can control a packet with a fixed packet length, but also can control a packet with a variable packet length, wherein a packet with a variable packet length represents that the packet length is variable each time it is input into the switch. This is because that the data size that can be sent each time is determined by the maximum value max_frame__ 4byte of byte that can be sent and the parameter add__4byte for adjusting the sending of a packet with a variable packet length.

More specifically, the above process in which an Ethernet protocol conversion gateway carries out flow control will be illustrated by an example in conjunction with the above 3.3.4 Unicast Communication Process.

In 3.3.4, it illustrates in detail a process in which node server MSS-400 sends a protocol packet and completes table configuration, and notifies each Ethernet protocol conversion gateway on the communication link of the current service to open the corresponding port. Preferably, in the communication route setting process for the current service, the node server MSS-400 may also realize the transfer of flow control information by sending a protocol packet, that is, it sends the flow control information for the current service to the first Ethernet protocol conversion gateway BX-008-0 on the uplink from set-top box STB-0 to set-top box STB-1, and Ethernet protocol conversion gateway BX-008-0 performs flow control on the data of the current service.

Because when node server MSS-400 sets a route for the current service, it determines the flow occupied by the current service (i.e., the flow allocated to the current service) according to the attribute information of the current service, such as type and so on at the same time, and records it in the device resource description information in the address information table of node server MSS-400 (i.e., the flow occupied the current service is increased in the flow information of the port). Thus, at the time the next service request is issued, it may know the actual flow of the port.

The reason that node server MSS-400 sends flow control information to switch BX-008-0 is to ensure that the flow allocated to the current service by the node server MSS-400 can guarantee the implementation, rather than randomly increasing or reducing (including the change in the sense of bandwidth statistics and the change of bandwidth on discrete time points).

Flow control information may guarantee that a packet may be sent according to a certain time interval when switch BX-008-0 receives a packet of the current service, and a requirement is also laid on the size of data sent each time. When the length of a packet sent by the terminal is large, two or more time intervals may be accumulated for sending the packet, thus the user packet will not be dismantled or disassembled, and at the same time, it can also guarantee the stability and uniformity of data transmission basically. However, in the invention, preferably, the switch and the terminal may be notified to limit the packet length when a service is established, for example, the length of the packet initiated by a terminal will meet the requirement of flow control information, and at the same time, the switch may also discard a packet that does not meet the packet length requirement, thus the stability and uniformity of data transmission may be further guaranteed.

In a word, it may guarantee via flow control information that the data flow sent by switch BX-008-0 at each moment is stable and uniform and meet the flow limit allocated, and it will not be changed at random. Thus, it can guarantee that accurate flow allocation and control on each service and each port of the network may be realized in the invention.

However, in the invention, in order to guarantee accurate flow control, a flow control may also be performed on a protocol packet for requesting a service. Specifically, node server MSS-400 may assign flow control information to bottom-layer switches of an access terminal, that is, when each switch receives an uplink protocol packet, it only needs to perform data transmission according to the flow control information informed by node server MSS-400 when the current switch is powered on and accesses the network. Thus, the invention may guarantee that the flow distribution of the whole network will not be influenced even if a large amount of service request protocol packets are initiated at the same time; that is, the invention can perform flow control on the service request process, and it can also perform flow control on the data transmission process in which a service link has been established.

In the multicast link establishment process of 3.3.5, it also relates to the setting, recording and notifying of flow control information of a port in the above unicast service, and the implementation process and the technical theory are basically the same, so it will not be described again here.

4) Implementation of Metropolitan Area Network

In order to simplify the design, there are totally 4 types of packets in the metropolitan area network, respectively:

metropolitan area query label packet (a protocol packet containing a label sent by a metropolitan area server to a node switch and a node server);

metropolitan area reply label packet (a protocol packet containing a label replied by a node switch and a node server to a metropolitan area server);

unicast label data packet (formed by a node server by adding a label to a unicast or multicast data packet);

multicast label data packet (formed by a node server by adding a label to a unicast or multicast data packet).

The address of a metropolitan area network has a total length of 40 bit, which is divided into 3 layers here, respectively: 8 bit, 16 bit and 16 bit, which are in turn defined as state network, wide area network and metropolitan area network. The data transmission between terminals on the same metropolitan area network and on the same access network is controlled by a node server of the access network.

It is hypothesized that STB_0 lies on access network A, STB_1 lies on access network B, wherein access network A and access network B belong to one and the same metropolitan area network C. The implementation process is as follows:

1) STB_0 issues a request for carrying out videophone with STB_1;

2) A node server on access network A checks that STB_1 does not belong to access network A according to the number of STB_1, then it issues a query to a metropolitan area server on metropolitan area network C;

3) The metropolitan area server on metropolitan area network C checks that STB_1 belongs to access network B according to the number of STB_1, and it issues a query to a node server on access network B;

4) The node server on access network B check that STB_1 is on access network B according to the number of STB_1, and it sends a call menu to STB_1;

5) STB_1 may select to accept or refuse, and it sends a reply to the node server on access network B, it is hypothesized here that STB_1 select to accept;

6) The node server on access network B issues a reply to the metropolitan area server on metropolitan area network C;

7) The metropolitan area server on metropolitan area network C issues a reply to the node server on access network A;

8) The node server on access network A issues a reply to STB_0.

It may be known from the above description that, the terminal only interacts with a node server of the local access network, and the node server interacts with the local metropolitan area network, and so on; the metropolitan area server interacts with a wide area server on the local wide area network.

It is hypothesized that the datagram type of the metropolitan area query packet is "1001 0000" (binary system), i.e., 0x90 (hexadecimal system); the datagram type of metropolitan area reply packet is "0000 1001" (binary system), i.e. 0x09 (hexadecimal system); the datagram type of the unicast label packet is "0001 0000" (binary system), i.e., 0x10 (hexadecimal system); the datagram type of the multicast label packet is "0111 1000" (binary system), i.e., 0x78 (hexadecimal system); and four look-up tables are needed, for example:

metropolitan area query label packet label look-up table, defined as table 4, with a size of 64K;

metropolitan area reply label packet label look-up table, defined as table 5, with a size of 64K;

unicast label packet label look-up table, defined as table 6, with a size of 64K;

multicast label packet label look-up table, defined as table 7, with a size of 64K;

In addition to the port to which a packet is to be oriented, the output of the label look-up table for metropolitan area query label packet, metropolitan area reply label packet, unicast label packet, and multicast label packet further has a 16 bit OUT label. For example, wherein, a node switch MX-4 has four 1000M fiber interfaces and one CPU module interface. If the four 1000M fiber interfaces are in turn defined as port 0 to port 3 and the CPU module interface is defined as port 4, then a 64k×21 bit (5 bit+16 bit) metropolitan area query label packet address look-up table, a 64k×21 bit (5 bit+16 bit) metropolitan area reply label packet address look-up table, a 64K×21 bit (5 bit+16 bit) unicast label packet and a 64K×21 bit (5 bit+16 bit) multicast label packet will be required. For example, the output of the metropolitan area query label packet look-up table with an IN label of 0x0001 is "1 0000 0000 0000 0000 0000", which represents that the packet is oriented to port 4 (CPU port), and the OUT label is 0x0000; the output of the multicast label packet look-up table with an IN label of 0x0001 is "0 0011 0000 0011 0000 0000", which represents that the packet is oriented to port 0 and port 1, and the OUT label is 0x0300, and so on.

The example of unicast and multicast label data packet is as follows:

It is hypothesized that a data packet enters from port 0, and its header data are 0x1056 0x1500 0x0000 0x55aa 0x0056 0x1500 0001 0xaa55 0x0000 0x0000 0x00001, wherein DA is 0x1056 0x1500 0x0000 0x55aa, SA is 0x0056 0x1500 0001 0xaa55, reserved byte is 0x0000 and label is 0x0001, then its packet type will be 0x10; according to a table lookup rule, table 6 will be looked up, that is, the address is "0000 0000 0000 0001", and the output of the look-up table corresponding this address is "0 1100 1000 0000 0000 0001", which represents port 2 and port 3 to which a data packet is to be oriented, and label is replaced 0x8001; thus, when a data packet is output from port 2 and port 3, its header data will be 0x1056 0x1500 0x0000 0x55aa 0x0056 0x1500 0001 0xaa55 0x0000 0x0000 0x8001.

Communication in the metropolitan area network will be illustrated in detail below according to an embodiment of the invention, which specifically comprises a network access process and a service process of a metropolitan area server and a node switch and of a metropolitan area server and a node server.

4.1 The Network Access Process of a Metropolitan Area Network 4.1.1 The Network Access Process of a Metropolitan Area Server and a Node Switch, a Node Server Firstly, each switch that is allowed to access the network must be registered on a server, the registration information of a switch includes the device type and device identification of the switch, and a switch that is not registered will be unable to access the network.

Firstly, each switch that is allowed to access the network must be registered on a server, the registration information of a switch includes the device type and device identification of the switch, and a switch that is not registered will be unable to access the network. As shown in FIG. 7, the process in which the node switch accesses the network relates to the following steps:

S1) a metropolitan area server sends a query packet to each port, after a node switch receives the query packet, it sends a reply packet (the reply contains the device type and device identification of the switch, which is the intrinsic information of each switch);

S2) after the metropolitan area server receives the reply issued by the node switch, it knows that the current port is connected with a node switch, then it finds the node switch information in an internal registration information table of the metropolitan area server, and sends a network access command to the node switch (informing the metropolitan area network address and label of the switch), and after the node switch receives the network access command, it accesses the network and sends a network access command reply to the metropolitan area server at the same time;

S3) after the metropolitan area server receives the network access command reply issued by the switch, it knows that the node switch has accessed the network, and then a state query packet is sent to the port each second to check whether the node switch works normally; and at the same, a port query packet is sent to other ports of the node switch to check whether other devices are connected under the node switch. If the node switch works normally, after it receives the state query packet, it will send a state query reply to the metropolitan area server. When the metropolitan area server does not receive a state query reply in a certain period of time (for example, in 6 seconds), it will be considered that the node switch has been removed from the network, and no state query packet will be sent any longer; instead, it continues to send a query packet to the current port.

The network access process of a node server connected under the node switch is similar to the above process, so it will not be again described in detail here.

4.1.2 An Example of Network Access Interaction Between a Metropolitan Area Server and a Node Switch, a Node Server All devices on the metropolitan area network are described with a device information table, and a device may be uniquely identified by a device type of 2 bytes and a device identification of 6 bytes: generally, it will be described according to that different device types have different device information tables, for example, node switch information table and node server information table. The items of a device information table are consisted as follows:

1) device identification: 6 bytes, which is written into a hard disk or flash of a metropolitan area server when a device is registered, and imported to the CPU memory after the metropolitan area server is powered on;

2) device state: 2 bytes, wherein 0x0000 represents that the device does not access the network, and 0x0001 represents that the device is to be accessed to the network (the metropolitan area server issues a network access command packet, but no network access command reply is received), 0x0002 represents that the device has accessed the network (set by the metropolitan area server after receiving a network access reply packet);

3) device address: 2 bytes, the metropolitan area network address allocated to the device.

The metropolitan area network address has a length of 16 bits, all devices on the metropolitan area network have a unique access network address (including metropolitan area server, node switch and node server). A table with a size of the sixteenth power of two, i.e., 64K, is maintained by a CPU module of the metropolitan area server, which is called metropolitan area address information table, and each item of the table is consisted as follows:

1) address occupation descriptor: 2 bytes, wherein 0x0000 represents that the address is not used, 0x0001 represents that the address is standby (the metropolitan area server issues a network access command packet by this address, but no network access command reply is received), and 0x0002 represents that the address is used (set by the metropolitan area server after receiving a network access reply packet);

2) device type: 2 bytes, for example, 0x0000 represents metropolitan area server MS-1000, 0x0001 represents node switch MX-4, and 0x0002 represents node server MSS-400;

3) device resource description information: several bytes, for example, if the device is a node switch, it contains the metropolitan area network address of a device connected to a network port thereof and downlink flow count of each network port thereof; if the device is a node server, it contains the access network address of a device connected with its network port and the downlink flow count of a network port thereof, etc.; all such information provides a decision-making foundation for the service process, and the information will be modified during each service process.

Similarly, a metropolitan area query label describes the connection from a metropolitan area server to a node switch or a node server, while a metropolitan area reply label describes the connection from a node switch or a node server to a metropolitan area server. In order to simplify the design, it is hypothesized that the two has a one-to-one correspondence, for example, if the metropolitan area query label from the metropolitan area server to a node switch is 0x0008, the metropolitan area reply label from the node switch to the metropolitan area server is also 0x0008; moreover. OUT label equals to IN label. Thus, another table with a size of the sixteenth power of two, i.e., 64K, is maintained by a CPU module of the metropolitan area server, which is called metropolitan area protocol label information table, and each item of the table is consisted as follows:

1) label occupation descriptor: 2 bytes, wherein 0x0000 represents that this label is not used, 0x0001 represents that this label is standby (the metropolitan area server issues a port query packet by this label, but no network access reply packet is received), and 0x0002 represents that this label is used (set by the metropolitan area server after receiving a network access reply packet);

2) label descriptor: 2 bytes, the metropolitan area network address of a device corresponding the label:

3) label route description information: 4 bytes, for describing the metropolitan area network address and port number of the previous-hop switch of the metropolitan area query label packet, wherein the first 2 bytes represents the metropolitan area network address of the previous-hop switch, and the last 2 bytes represents the port number of the previous-hop switch.

Figure 14:
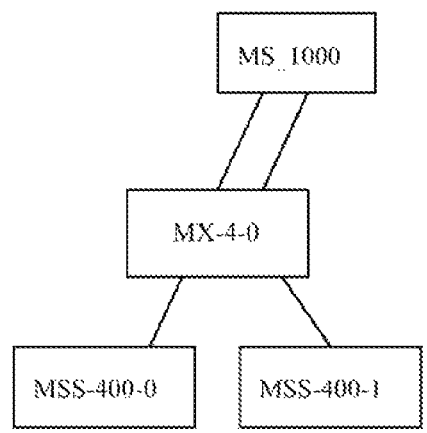
FIG. 14 is an exemplary connection diagram showing the network management interaction among a metropolitan area server, a node switch and a node server according to an embodiment of the invention.

As shown in FIG. 14, for example, it is hypothesized that the metropolitan area server has four 1000M fiber interfaces and one CPU module interface. If the four 1000M fiber interfaces are in turn defined as port 0 to port 3 and the CPU module interface is defined as port 4, the type of the metropolitan area server will be MS-1000, and port 0 and port 1 of MS-1000 are respectively connected with port 2 and port 3 of MX-4-0, and port 0 of MX-4-0 is connected with MSS-400-0, and port 1 of MSS-400-0 is connected with MSS-400-1.

The network access interaction process is as follows:

1) After server MS-1000 is powered on, it initializes the hardware and imports a configuration file from the hard disk to the CPU memory (for example, the registration information of a node switch and the registration information of a node server, etc.), server MS-1000 initializes the metropolitan area address information table and the metropolitan area protocol label information table, and all the items are cleared (which represents that all addresses and labels are not used), and server MS-1000 configures its own metropolitan area network address as 0x0000, that is, item 0x0000 of the metropolitan area address information table is configured as follows:
  address occupation descriptor: 0x0002 represents that the address is used;
  device descriptor: 0x0000 represents metropolitan area server,
  device resource description information: the metropolitan area server has four 1000M fiber interfaces, which are in turn defined as port 0 to port 3, and the CPU module interface is defined as port 4, the type of this node server is MS-1000, the metropolitan area network address of a device connected to a network port thereof is not allocated, and downlink flow count of each of its network ports is 0;
The next available address is 0x0001, and the next metropolitan area protocol label is 0x0000;
  2) Server MS-1000 initializes tables 4, 5, 6 and 7;
  configuring table 4 as "0 0000 0000 0000 0000 0000" to "0 0000 1111 1111 1111 1111", i.e., the transmission of all metropolitan area query label packets is shut down;
  configuring table 5 as "1 0000 0000 0000 0000 0000" to "1 0000 1111 1111 1111 1111", i.e. all metropolitan area reply label packets are oriented to the CPU;
  configuring tables 6 and 7 as "0 0000 0000 0000 0000 0000", i.e., the transmission of all unicast or multicast data packets is closed;
  3) Server MS-1000 knows that it has four 1000M fiber interfaces and the next metropolitan area protocol label is 0x0000, so it configures the 4 items of table 4 as, respectively:
  "100 0000 0000 0000 0000"=>"0 0001 0000 0000 0000", i.e., a query packet with a metropolitan area protocol label of 0x0000 is oriented to port 0;
  "100 0000 0000 0000 0001"=>"0 0010 0000 0000 0001". i.e., a query packet with a metropolitan area protocol label of 0x0001 is oriented to port 1;
  "100 0000 0000 0000 0010"=>"0 0100 0000 0000 0010". i.e., a query packet with a metropolitan area protocol label of 0x0002 is oriented to port 2;
  "100 0000 0000 0000 0011"=>"0 1000 0000 0000 0011", i.e., a query packet with a metropolitan area protocol label of 0x0003 is oriented to port 3;
  The next metropolitan area protocol label is 0x0004;
  4) Server MS-1000 issues port query packets with a header information of 0x9000 0x0000 0x0000 0x0000 0x0000 0x0000 0x0000 0x0000 0x0000 0x0000, 0x9000 0x0000 0x0000 0x0000 0x0000 0x0000 0x0000 0x0000 0x0000 0x0001, 0x9000 0x0000 0x0000 0x0000 0x0000 0x0000 0x0000 0x0000 0x0000 0x0002, 0x9000 0x0000 0x0000 0x0000 0x0000 0x0000 0x0000 0x0000 0x0000 0x0003, and because the packets are switched according to labels, it does not matter even if the DA is the same. According to the configuration of table 4, the port query packets will be in turn oriented to port 0 to port 3;
  Item 0x0000 of the label information table is configured as follows:
  label occupation descriptor: 0x0001 represents that this label is standby;
  label descriptor it will not be modified;
  label route description information: 0x0000 (the metropolitan area network address of the previous-hop switch i.e., the metropolitan area network address of MS-1000), 0x0000 (port 0 of MS-1000).

Item 0x0001 of the label information table is configured as follows:
  label occupation descriptor: 0x0001 represents that this label is standby;
  label descriptor it will not be modified;
  label route description information: 0x0000 (the metropolitan area network address of the previous-hop switch, i.e., the metropolitan area network address of MS-1000), 0x0001 (port 1 of MS-1000).
Item 0x0002 of the label information table is configured as follows:
  label occupation descriptor: 0x0001 represents that this label is standby;
  label descriptor it will not be modified;
  label route description information: 0x0000 (the metropolitan area network address of the previous-hop switch, i.e., the metropolitan area network address of MS-1000), 0x0002 (port 2 of MS-1000).
Item 0x0003 of the label information table is configured as follows:
  label occupation descriptor 0x0001 represents that this label is standby;
  label descriptor: it will not be modified;
  label route description information: 0x0000 (the metropolitan area network address of the previous-hop switch, i.e., the metropolitan area network address of MS-1000), 0x0003 (port 3 of MS-1000).
The next available label is 0x0004;
  5) After switch MX-4-0 is powered on, it initializes the hardware:
  configuring table 4 as "1 0000 0000 0000 0000 0000" to "1 0000 1111 1111 1111 1111". i.e., all metropolitan area query label packets are oriented to the CPU;
  configuring table 5 as "0 0000 0000 0000 0000 0000" to "0 0000 1111 1111 1111 1111", i.e., the transmission of all metropolitan area reply label packets is shut down;
  configuring tables 6 and 7 as "0 0000 0000 0000 0000 0000", i.e., the transmission of all unicast or multicast data packets is closed;
  6) Port 2 of switch MX-4-0 receives a query packet with a metropolitan area protocol label of 0x0000 according to the topological graph, then:
  configuring table 5 "101 0000 0000 0000 0000"=>"0 0100 0000 0000 0000 0000", i.e., a reply packet with a metropolitan area protocol label of 0x0000 is oriented to port 2;
  Port 3 of switch MX-4-0 receives a query packet with a metropolitan area protocol label of 0x0001 according to the topological graph, then:
  configuring table 5 "101 0000 0000 0000 0001"=>"0 1000 0000 0000 0000 0000", i.e., a reply packet with a metropolitan area protocol label of 0x0001 is oriented to port 3;
  Two reply packets (which contains the device type and device identification of the current switch and the port number that receives the query packet) are sent, wherein the header of one packet is 0x0900 0x0000 0x0000 0x0000 0x0000 0x0000 0x0000 0x0000 0x0000 0x0000, and at the same time, it marks in the packet that the port number receiving the query packet is port 2;
  The header of the other packet is 0x0900 0x0000 0x0000 0x0000 0x0000 0x0000 0x0000 0x0000 0x0000 0x0001, and at the same time, it marks in the packet that the port number receiving the query packet is port 3;
  7) After port 0 of server MS-1000 receives a query reply packet with a metropolitan area protocol label of 0x0000, 1) according to the device type in the reply packet, server MS-1000 knows that it is a node switch, and compares the device identification in the reply packet with the device identification items in the device information table on the node switch one by one, until a totally identical item is found, this indicates that the device has been registered, and it finds that the device state item is 0x0000, so it knows that the device does not access the network;

2) it checks item 0x0000 of the metropolitan area protocol label information table according to the metropolitan area protocol label 0x0000 in the reply packet, and knows that the previous-hop switch is server MS-1000 (with an address of 0x0000), and the port number is port 0;

3) according to field number 5 in the reply packet PDU (which indicates the switch port number that receives the query packet), server MS-1000 knows that port 0 is connected with port 2 of a switch.

A network access command is sent (informing that the metropolitan area network address of the switch is 0x0001), the head of the packet is 0x9000 0x0000 0x0001 0x0000 0x0000 0x0000 0x0000 0x0000 0x0000 0x0000 0x0000;

Item 0x0001 of the address information table is configured as follows:
  address occupation descriptor: 0x0001 represents that the address is standby (the metropolitan area server issues a network access command packet by this address, but no network access command reply is received);
  device descriptor: it will not be modified;
  device resource description information: it will not be modified;

The items of the corresponding device information table are configured as follows:
  device identification: it will not be modified;
  device state: 0x0001 represents that the device is to be accessed to the network (the metropolitan area server issues a network access command packet, but no network access command reply is received);
  device address: 0x0001;

8) After port 1 of server MS-1000 receives a query reply packet with a metropolitan area protocol label of 0x0001:

1) according to the device type in the reply packet, server MS-1000 knows that it is a node switch, and compares the device identification in the reply packet with the device identification items in the device information table on the node switch one by one, until a totally identical item is found, this indicates that the device has been registered, and it finds that the device state item is 0x0001, so it knows that the device is to be accessed to the network;

2) according to the metropolitan area protocol label 0x0001 in the reply packet, it checks item 0x0001 of the metropolitan area protocol label information table, and knows that the previous-hop switch is server MS-1000 (with an address of 0x0000), and the port number is port 1;

3) according to field number 5 in the reply packet PDU (which indicates the switch port number that receives the query packet), server MS-1000 knows that port 1 is connected with port 3 of a switch.

A network access command is sent (informing that the metropolitan area network address of the switch is 0x0001), the head of the packet is 0x9000 0x0000 0x0001 0x0000 0x0000 0x0000 0x0000 0x0000 0x0000 0x0000 0x0001;

Item 0x0001 of the address information table is configured as follows:
  address occupation descriptor: 0x0001 represents that the address is standby (the metropolitan area server issues a network access command packet by this address, but no network access command reply is received);
  device descriptor: it will not be modified;
  device resource description information: it will not be modified:

The items of the corresponding device information table are configured as follows:
  device identification: it will not be modified;
  device state: 0x0001 represents that the device is to be accessed to the network (the metropolitan area server issues a network access command packet, but no network access command reply is received);
  device address: 0x0001;

9) After port 2 of switch MX-4-0 receives a network access command packet with a metropolitan area protocol label of 0x0000 (the header of the packet is 0x9000 0x0000 0x0001 0x0000 0x0000 0x0000 0x0000 0x0000 0x0000 0x0000 0x0000), it compares the device type and the device identification thereof, knows that its own metropolitan area network address is 0x0001, and it accesses the network and sends a network access command reply to the server at the same time, the header of the packet is 0x0900 0x0000 0x0000 0x0000 0x0000 0x0000 0x0001 0x0000 0x0000 0x0000 0x0000;

10) After port 3 of switch MX-4-0 3 receives a network access command packet with a metropolitan area protocol label of 0x0001 (the header of the packet is 0x9000 0x0000 0x0001 0x0000 0x0000 0x0000 0x0000 0x0000 0x0000 0x0000 0x0001), it compares the device type and the device identification thereof, knows that its own metropolitan area network address is 0x0001, and it accesses the network and sends a network access command reply to the server at the same time, the header of the packet is 0x0900 0x0000 0x0000 0x0000 0x0000 0x0000 0x0001 0x0000 0x0000 0x0000 0x0001;

11) after port 0 of server MS-1000 receives a network access command reply packet with a metropolitan area protocol label of 0x0000, 1) according to the metropolitan area protocol label 0x0000 in the network access command reply packet, it checks the label route description information in item 0x0000 of the label information table and knows that the previous-hop switch of the switch is server MS-1000 (with an address of 0x0000), and the port number is port 0.

2) according to field number 9 in the network access command reply packet PDU (which indicates the switch port number that receives the query packet), server MS-1000 knows that port 0 is connected with port 2 of a switch;

3) according to the metropolitan area address 0x0001 in the network access command reply packet, it knows that the metropolitan area address of the switch is 0x0001.

It may be known that switch MX-4-0 has accessed the network by integrating 1), 2) and 3).

Item 0x0001 of the address information table is configured as follows:
  address occupation descriptor: 0x0002 represents that the address is used;
  device descriptor: 0x0001 represents node switch MX-4-0;
  device resource description information: four 1000M fiber interfaces are in turn defined as port 0 to port 3, and the CPU module interface is defined as port 4; port 2 thereof is connected with port 0 of MS-1000 with a metropolitan area address of 0x0000, the metropolitan area network address of a device connected with other network port is unknown, and downlink flow count of each of its network ports is 0.

Item 0x0000 of the label information table is configured as follows:
  label occupation descriptor: 0x0002 represents that this label is used;

label descriptor: 0x0000;
label route description information: 0x0000 (the metropolitan area network address of the previous-hop switch, i.e., the metropolitan area network address of MS-1000), 0x0000 (port 0 of MS-1000).

The items of the corresponding device information table are configured as follows:
device identification: it will not be modified;
device state: 0x0002 represents that the device has accessed the network (the metropolitan area server issues a network access command packet, and receives a network access command reply);
device address: 0x0001.

Item 0x0000 of the metropolitan area address information table is configured as follows:
address occupation descriptor: it will not be modified;
device descriptor: it will not be modified;
device resource description information: the metropolitan area server has four 1000M fiber interfaces, which are in turn defined as port 0 to port 3, and the CPU module interface is defined as port 4, the type of this node server is MS-1000, port 0 thereof is connected with port 2 of MX-4-0 with a metropolitan area address of 0x0001, the metropolitan area network address of a device connected with other network ports is not allocated, and downlink flow count of each of its network ports is 0;

Then, it periodically (for example, each second) sends a device state query instruction to port 0, if server MS-1000 does not receive a state query reply in a certain period of time (for example, 6 seconds), it will not send a device state query instruction any longer, and it continues to send a query packet to port 0.

12) After port 1 of server MS-1000 receives a network access command reply packet with a metropolitan area protocol label of 0x0001, 1) according to the metropolitan area protocol label 0x0001 in the network access command reply packet, it checks the label route description information of item 0x0001 of the label information table and knows that the previous-hop switch of the switch is server MS-1000 (with an address of 0x000), and the port number is port 1;

2) according to field number 9 in the network access command reply packet PDU (which indicates the switch port number that receives the query packet), server MS-1000 knows that port 1 is connected with port 3 of a switch.

3) according to the metropolitan area address 0x0001 in the network access command reply packet, it knows that the metropolitan area address of the switch is 0x0001.

It may be known that switch MX-4-0 has accessed the network by integrating 1), 2) and 3).

Item 0x0001 of the address information table is configured as follows:
address occupation descriptor: 0x0002 represents that the address is used;
device descriptor: 0x0001 represents node switch MX-4-0;
device resource description information: four 1000M fiber interfaces are in turn defined as port 0 to port 3, and the CPU module interface is defined as port 4; port 2 thereof is connected with port 0 of MS-1000 with a metropolitan area address of 0x0000, and port 3 thereof is connected with port 1 of MS-1000 with a metropolitan area address of 0x0000, the metropolitan area network address of a device connected with other network port is unknown, and downlink flow count of each of its network ports is 0.

Item 0x0001 of the label information table is configured as follows:
label occupation descriptor: 0x0002 represents that this label is used;
label descriptor: 0x0001;
label route description information: 0x0000 (the metropolitan area network address of the previous-hop switch, i.e., the metropolitan area network address of MS-1000), 0x0001 (port 0 of MS-1000).

The items of the corresponding device information table are configured as follows:
device identification: it will not be modified;
device state: 0x0002 represents that the device has accessed the network (the metropolitan area server issues a network access command packet, and receives a network access command reply);
device address: 0x0001.

Item 0x0000 of the metropolitan area address information table is configured as follows:
address occupation descriptor: it will not be modified;
device descriptor: it will not be modified;
device resource description information: the metropolitan area server has four 1000M fiber interfaces, which are in turn defined as port 0 to port 3, and the CPU module interface is defined as port 4, the type of this node server is MS-1000, port 0 thereof is connected with port 2 of MX-4-0 with a metropolitan area address of 0x0001, port 1 is connected with port 3 of MX-4-0 with a metropolitan area address of 0x0001, the metropolitan area network address of a device connected with other network ports is not allocated, and downlink flow count of each of its network ports is 0;

Then, a device state query instruction will be sent to port 1 periodically (for example, each second), if server MS-1000 does not receive a state query reply in a certain period of time (for example, 6 seconds), it will not send a device state query instruction any longer, instead, it continues to send a query packet to port 1.

13) Server MS-1000 knows that port 0 thereof is connected with port 2 of MX-4-0 with a metropolitan area address of 0x0001, and port 1 thereof is connected with port 3 of MX-4-0, and port 0 and port 1 of MX-4-0 are unknown, the next metropolitan area protocol label is 0x0004. Therefore, it configures the 4 items of table 4 as, respectively:

"100 0000 0000 0000 0100"=>"0 0001 0000 0000 0000 0100", i.e., a query packet with a metropolitan area protocol label of 0x0004 is oriented to port 0;

"100 0000 0000 0000 0101"=>"0 0001 0000 0000 0000 0101", i.e., a query packet with a metropolitan area protocol label of 0x0005 is oriented to port 0;

"100 0000 0000 0000 0110"=>"0 0010 0000 0000 0000 0110". i.e., a query packet with a metropolitan area protocol label of 0x0006 is oriented to port 1;

"100 0000 0000 0000 0111"=>"0 0010 0000 0000 0000 0111", i.e., a query packet with a metropolitan area protocol label of 0x0007 is oriented to port 1;

The next metropolitan area protocol label is 0x0008.

By sending a packet using label 0x0000 or 0x0001, MS-1000 notifies MX-4-0 to configure the items of MX-4-0 table 4:

"100 0000 0000 0000 0100"=>"0 0001 0000 0000 0000 0100", i.e., a query packet with a metropolitan area protocol label of 0x0004 is oriented to port 0;

"100 0000 0000 0000 0101"=>"0 0010 0000 0000 0000 0101", i.e., a query packet with a metropolitan area protocol label of 0x0005 is oriented to port 1;

"100 0000 0000 0000 0110"=>"0 0001 0000 0000 0110". i.e., a query packet with a metropolitan area protocol label of 0x0006 is oriented to port 1;

"100 0000 0000 0000 0111"=>"0 0010 0000 0000 0111", i.e., a query packet with a metropolitan area protocol label of 0x0007 is oriented to port 1;

The items of MX-4-0 table 5 are configured as follows:

"101 0000 0000 0000 0100"=>"0 0100 0000 0000 0100", i.e., a reply packet with a metropolitan area protocol label of 0x0004 is oriented to port 2;

"101 0000 0000 0000 0101"=>"0 0100 0000 0000 0101", i.e., a reply packet with a metropolitan area protocol label of 0x0005 is oriented to port 2;

"101 0000 0000 0000 0110"=>"0 1000 0000 0000 0110", i.e., a reply packet with a metropolitan area protocol label of 0x0006 is oriented to port 3;

"101 0000 0000 0000 0111"=>"0 1000 0000 0000 0111", i.e., a reply packet with a metropolitan area protocol label of 0x0007 is oriented to port 3;

14) Server MS-1000 issues port query packets with a header information of 0x9000 0x0000 0x0000 0x0000 0x0000 0x0000 0x0000 0x0000 0x0000 0x0000 0x0004, 0x9000 0x0000 0x0000 0x0000 0x0000 0x0000 0x0000 0x0000 0x0000 0x0000 0x0005, 0x9000 0x0000 0x0000 0x0000 0x0000 0x0000 0x0000 0x0000 0x0000 0x0000 0x0006, 0x9000 0x0000 0x0000 0x0000 0x0000 0x0000 0x0000 0x0000 0x0000 0x0007, and because the packets are exchanged according to labels, it does not matter even if the DA is the same. According to the configuration of table 0, query packets with label 0x0004 and 0x0005 will be in turn oriented to port 0, and query packets with label 0x0006 and 0x0007 will be in turn oriented to port 1;

Item 0x0004 of the label information table is configured as follows:
label occupation descriptor 0x0001 represents that this label is standby;
label descriptor it will not be modified;
label route description information: 0x0001 (the metropolitan area network address of the previous-hop switch, i.e. the metropolitan area network address of MX-4-0), and 0x0000 (port 0 of MX-4-0).

Item 0x0005 of the label information table is configured as follows:
label occupation descriptor: 0x0001 represents that this label is standby;
label descriptor it will not be modified;
label route description information: 0x0001 (the metropolitan area network address of the previous-hop switch, i.e., the metropolitan area network address of MX-4-0), and 0x0001 (port 1 of MX-4-0).

Item 0x0006 of the label information table is configured as follows:
label occupation descriptor: 0x0001 represents that this label is standby;
label descriptor it will not be modified;
label route description information: 0x0001 (the metropolitan area network address of the previous-hop switch, i.e., the metropolitan area network address of MX-4-0), and 0x0000 (port 0 of MX-4-0).

Item 0x0007 of the label information table is configured as follows:
label occupation descriptor: 0x0001 represents that this label is standby;
label descriptor it will not be modified;
label route description information: 0x0001 (the metropolitan area network address of the previous-hop switch, i.e., the metropolitan area network address of MX-4-0), 0x0001 (port 1 of MS-1000).

The next available label is 0x0008;

15) After switches MSS-400-0 and MSS-400-1 are powered on, they initialize the hardware; because the node server is the initiating end or the terminating end of a label, the label thereof does not need to be replaced;
configuring table 4 as "001 0000 0000", i.e., all metropolitan area query label packets are oriented to the CPU;
configuring table 5 as "100 0000 0000", i.e., all metropolitan area reply label packets are oriented to port 10 (i.e., uplink 1000M fiber interface);
configuring tables 6 and 7 as "000 0000 0000", i.e., the transmission of all unicast or multicast data packets is closed;

16) According to the topological graph, port 10 of switch MSS-400-0 receives query packets with a metropolitan area protocol label of 0x0004 and 0x0006, then:

Two reply packets are sent (which contain the device type and device identification of the current switch and the port number that receives the query packet), the header of one packet is 0x0900 0x0000 0x0000 0x0000 0x0000 0x00 0x0000 0x0000 0x0000 0x0000 0x0004, and at the same time, it marks in the packet that the port number receiving the query packet is port 10;

The header of the other packet is 0x0900 0x0000 0x0000 0x0000 0x0000 0x0000 0x0000 0x0000 0x0000 0x0000 0x0006, and at the same time, it marks in the packet that the port number receiving the query packet is port 10;

17) According to the topological graph, port 10 or switch MSS-400-1 receives query packets with a metropolitan area protocol label of 0x0005 and 0x0007, then:

Two reply packets are sent (which contain the device type and device identification of the current switch and the port number that receives the query packet), the header of one packet is 0x0900 0x0000 0x0000 0x0000 0x0000 0x0000 0x0000 0x0000 0x0000 0x0000 0x0005, and at the same time, it marks in the packet that the port number receiving the query packet is port 10;

The header of the other packet is 0x0900 0x0000 0x0000 0x0000 0x0000 0x0000 0x0000 0x0000 0x0000 0x0000 0x0007, and at the same time, it marks in the packet that the port number receiving the query packet is port 10;

18) Similarly, by repeating 7, 8, 9, 10, 11, 12, the two switches MSS-400 also access the network.

4.2 Service Process of the Metropolitan Area Network

Figure 15:
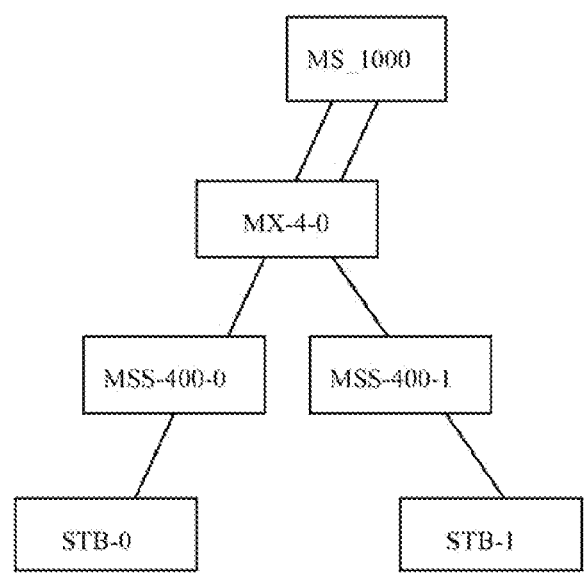
FIG. 15 is an exemplary connection diagram showing the service interaction among a metropolitan area server, a node switch and a node server according to an embodiment of the invention.

As shown in FIG. 15, it is hypothesized that the metropolitan area server has four 1000M fiber interfaces and one CPU module interface. If the four 1000M fiber interfaces are in turn defined as port 0 to port 3 and the CPU module interface is defined as port 4, the type of the metropolitan area server is MS-1000, and port 0 and port 1 of MS-1000 are respectively connected with port 2 and port 3 of MX-4-0, and port 0 of MX-4-0 is connected with MSS-400-0, port 1 is connected with MSS-400-1 (as shown in the above figure).

STB_0 is connected on port 0 of MSS-400-0, STB_1 is connected on port 1 of MSS-400-1, and their addresses after accessing the network are STB_0 (0x0000 0x0000 0x0002× 0009) and STB_1 (0x0000 0x0000 0x0003 0x0012), the metropolitan area network address of MX-4-0 is 0x0001; the metropolitan area protocol labels of MX-4-0 and MSS-1000 are 0x0000 and 0x0001; the metropolitan area protocol labels of MSS-400-0 and MSS-1000 are 0x0005 and 0x0007, and the metropolitan area protocol labels of MSS-400-1 and MSS-1000 are 0x0006 and 0x0008.

4.2.1 Service Establishing Process

STB_0 issues a request to MSS-400-0 for carrying out visual communication with STB_1, in the following steps:

1) STB_0 issues a service request instruction packet, of which DA is 0x0800 0x0000 0x0002 0x0000, SA is 0x0000 0x0000 0x0002 0x0009, reserved is 0x0000, and PDU part refers to the appendix, and service parameter is SERVICE_TYPE_TELEPHONE_REQUEST or SERVICE_TYPE_TELEPHONE_DIRECT.

According to the configuration of table 1, the service request instruction packet is oriented to MSS-400-0, and MSS-400-0 determines that a request for visual communication is received according to the content of the packet; it knows according to SA that it is STB_0 that issues the request (it is hypothesized that the bandwidth of videophone is uplink and downlink 6 Mbit/s, and there is 80 Mbit/s remaining in the uplink and downlink bandwidth of MSS-400-0), it checks the uplink and downlink bandwidth of STB_0 and MSS-400-0, and if they meet the service requirement, it continues to jump to 4; otherwise, it jumps to 3.

3) MSS-400-0 sends a menu to the calling-party STB_0, which represents that the service is rejected;

A packet is sent to STB_0: DA is 0x8000 0x0000 0x0002 0x0009, SA is 0x0000 0x0000 0x0002 0x0000, reserved is 0x0000, and PDU part refers to appendix Menu Data Format.

4) MSS-400-0 checks the CAM table (content-address mapping table) according to the called party number and knows that the called party does not exist on its own access network, so MSS-400-0 issues service request instruction packet to metropolitan area server MSS-1000, wherein DA is 0x0900 0x0000 0x0000 0x0000, SA is 0x0000 0x0000 0x0002 0x0009, reserved is 0x0000, protocol label is 0x0005 (PDU part refers to 5 Definition of Data Format in the Network Access Process of a Metropolitan Area Network), service parameter is SERVICE_TYPE_TELEPHONE_REQUEST or SERVICE_TYPE_TELEPHONE_DIRECT.

5) MSS-1000 receives a service request packet from MSS-400-0 and determines that a request for visual communication is received according to the content of the packet; it knows according to SA that it is a t0 terminal under MSS-400-0 (It is hypothesized that there is 800 Mbit/s remaining in the uplink and downlink bandwidth of MX-4-0 and MSS-400-0); it checks the CAM table (content-address mapping table) according to the called party number and knows that the called party is under the access network of MSS-400-1 (it is hypothesized that there is 800 Mbit/s remaining in the uplink and downlink bandwidth of MX-4-0 and MSS-400-1), and it checks the uplink and downlink bandwidth of MX-4-0 and MSS-400-0, MSS-400-1, if they meet the service requirement, it continues to jump to 7; otherwise, it jumps to 6.

6) MSS-1000 sends a service reject packet to MSS-400-0, wherein DA is 0x9000 0x0000 0x0002 0x0009, SA is 0x0000 0x0000 0x0000 0x0000, reserved is 0x0000, protocol label is 0x0005, and PDU part is neglected; after MSS-400-0 receives the service reject packet, it jumps to 3.

7) MSS-1000 issues a service request packet to MSS-400-1, and issues a service request instruction packet, wherein DA is 0x9000 0x0000 0x0003 0x0012, SA is 0x0000 0x0000 0x0000 0x0000, reserved is 0x0000, protocol label is 0x0006, (PDU part refers to 5 Definition of Data Format in the Network Access Process of a Metropolitan Area Network"), and service parameter is SERVICE_TYPE_TELEPHONE_REQUEST or SERVICE_TYPE_TELEPHONE_DIRECT.

8) MSS-400-1 receives a service request packet from MSS-1000, it determines that a request for visual communication is received according to the content of the packet; and it checks the CAM table (content-address mapping table) according to the called party number and knows that the called party is STB_1 (it is hypothesized that there is 80 Mbit/s remaining in the uplink and downlink bandwidth of STB_1 and MSS-400-1), and it checks the uplink and downlink bandwidth of STB_1 and MSS-400-1, if they meet the service requirement, it continues to jump to 10; otherwise, it jumps to 9.

9) MSS-1000 receives the service reject packet, it jumps to 6.

10) MSS-400-1 sends a menu to the called party, and waits the called party to reply;

packet sent to STB_1: wherein DA is 0x8000 0x0000 0x0003 0x0012, SA is 0x0000 0x0000 0x0003 0x0000, reserved is 0x0000, and PDU part refers to appendix Menu Data Format.

11) After STB_1 receives the menu, it issues a request SERVICE_TYPE_PERMISSION and accepts the communication, wherein DA is 0x0800 0x0000 0x0003 0x0000, SA is 0x0000 0x0000 0x0003 0x0012, reserved is 0x0000, (PDU part refers to 5 Definition of Data Format in the Network Access Process of a Metropolitan Area Network"), and service parameter is SERVICE_TYPE_PERMISSION.

12) MSS-400-1 receives the reply packet from STB_1, and sends a service admission packet to MSS-1000, wherein DA is 0x9000 0x0000 0x0000 0x0000, SA is 0x0000 0x0000 0x0003 0x0000, reserved is 0x0000, protocol label is 0x0006, and PDU part is neglected.

13) If MSS-1000 receives a service admission packet, it allocates a unicast label (it is hypothesized that IN label and OUT label from MSS-400-0 to MSS-400-1 is 0x0000, and IN label and OUT label from MSS-400-1 to MSS-400-0 is 0x0001);

MSS-1000 sends a label allocation packet to MX-4-0, wherein DA is 0x9000 0x0000 0x0001 0x0000, SA is 0x0000 0x0000 0x0000 0x0000, reserved is 0x0000, protocol label is 0x0000, and PDU part contains IN label, OUT label and oriented port;

MSS-1000 sends a label allocation packet to MSS-400-0, wherein DA is 0x9000 0x0000 0x0002×00000, SA is 0x0000 0x0000 0x0000 0x0000, reserved is 0x0000, protocol label is 0x0005, and PDU part contains IN label, OUT label and oriented port, as well as a binding between DA. SA and label;

MSS-1000 sends a label allocation packet to MSS-400-1, wherein DA is 0x9000 0x0000 0x0003 0x0000, SA is 0x0000 0x0000 0x0000 0x0000, reserved is 0x0000, protocol label is 0x0006, and PDU part contains IN label, OUT label and oriented port, as well as a binding between DA, SA and label;

14) MX-4-0 receives a label allocation packet and updates its table 6, item 0x0000: OUT label is 0x0000, orientation port is port 1; and item 0x0001: OUT label is 0x0001, orientation port is port 0.

15) MSS-400-0 receives a label allocation packet and updates its CAM table in which DA, SA and label are bond (address-label binding table), that is, item 0x0000 of the CAM table: DA is 0x1000 0x0000 0x0003 0x0012, SA is 0x0000 0x0000 0x0002 0x0009;

It updates its table 6, item 0x0000: OUT label is 0x0000, orientation port is port 10;

MSS-400-0 configures its own table 2 as follows:
"10 0000 0000 0000 1001"=>"000 0000 0001", i.e., a unicast data packet with a destination address (DA) of 0x1000 0x0000 0x0002 0x0009 is oriented to port 0;

A coding/decoding command packet is sent to STB-0:
wherein, DA is 0x8000 0x0000 0x0002 0x0009, SA is 0x0000 0x0000 0x0002 0x0000, reserved is 0x0000, PDU part refers to the coding/decoding command.

| 8704 Field Number | Length | Code | Description |
|---|---|---|---|
| 0 | 1W | 8704 | coding/decoding command (server → user) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

16) MSS-400-1 receives a label allocation packet and updates its CAM table in which DA, SA and label are bond, i.e., item 0x0001 of the CAM table: DA is 0x100 0x0000 0x0002 0x0009, SA is 0x0000 0x0000 0x0003 0x0012;

It updates its table 6, item 0x0001: OUT label is 0x0001, orientation port is port 10;

MSS-400-1 configures its own table 2 as follows:
"10 0000 0000 0001 0010"=>"000 0000 0010", i.e., a unicast data packet with a destination address (DA) of 0x1000 0x0000 0x0003 0x0012 is oriented to port 1;

A coding/decoding command packet is sent to STB-1:
wherein, DA is 0x8000 0x0000 0x0003 0x0012, SA is 0x0000 0x0000 0x0003 0x0000, reserved is 0x0000, PDU part refers to the coding/decoding command.

| 8704 Field Number | Length | Code | Description |
|---|---|---|---|
| 0 | 1W | 8704 | coding/decoding command (server → user) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

According to table 0, the subsequent coding/decoding command packets will be respectively oriented to STB-0 and STB-1. STB-0 and STB-1 start coding/decoding according to the content of the packet, and receive and send unicast data.

4.2.2 Service Communication Process

In the packet sent by STB-0 to STB-1, DA is 0x1000 0x0000 0x0003 0x0012, SA is 0x0000 0x0000 0x0002 0x0009;

2) The packet enters MSS-400-0, and the switching engine of MSS-400-0 checks the metropolitan area network address of DA, if it does not belong to the local access network, it checks the CAM table in which DA, SA and label are bond and obtains unicast label 0x0000, then it checks item 0x0000 of table 6 and obtains OUT label 0x0000, and the orientation port is port 10, label 0x0000 is added to the sending end of port 10, i.e., header of the packet is 0x1000 0x0000 0x0003 0x0012 0x0000 0x0000 0x0002 0x0009 0x0000 0x0000 0x0000;

3) The packet enters MX-4-0, and the switching engine of MX-4-0 looks up in table 6 according to a combined address field, i.e., the table address is "110 0000 0000 0000 0000", and according to the configuration of table 6 on MX-4-0, a unicast label packet with a unicast label of 0x0000 is oriented to port 1, and the OUT label is 0x0000, i.e., header of the packet is 0x1000 0x0000 0x0003 0x0012 0x0000 0x0000 0x0002 0x0009 0x0000 0x0000 0x0000;

4) The packet enters a receiving module of port 10 on MSS-400-1, then the label is removed and the packet enters a switching engine; the switching engine of MSS-400-1 looks up in table 2 according to a combined address field, i.e., the table address is "10 0000 0000 0001 0010", and according to the configuration of table 2 on MSS-400-1, it knows that the output of the item is "00 0000 0010" which represents that downlink port 1 is opened, thus the packet enters STB-1;

5) Similarly, in the packet sent by STB-1 to STB-0, DA is 0x1000 0x0000 0x0002 0x0009, SA is 0x0000 0x0000 0x0003 0x0012;

6) The packet enters MSS-400-1, and the switching engine of MSS-400-1 checks the metropolitan area network address of DA, if it does not belong to the local access network, it checks the CAM table in which DA, SA and label are bond and obtains unicast label 0x0001, then it checks item 0x0001 of table 6 and obtains OUT label 0x0001, and the orientation port is port 10, label 0x0001 is added to the sending end of port 10, i.e., header of the packet is 0x1000 0x0000 0x0002 0x0009 0x0000 0x0000 0x0003 0x0012 0x0000 0x0000 0x0001;

7) The packet enters MX-4-0, and the switching engine of MX-4-0 looks up in table 6 according to a combined address field, i.e., the table address is "110 0000 0000 0000 0001", and according to the configuration of table 6 on MX-4-0, a unicast label packet with a unicast label of 0x0001 is oriented to port 0, and the OUT label is 0x0001, i.e., header of the packet is 0x1000 0x0000 0x0002 0x0009 0x0000 0x0000 0x0003 0x0012 0x0000 0x0000 0x0001;

8) The packet enters the receiving module of port 10 on MSS-400-0, then the label is removed and the packet enters a switching engine; the switching engine of MSS-400-0 looks up in table 2 according to a combined address field, i.e., the table address is "10 0000 0000 0000 1001", and according to the configuration of table 2 on MSS-400-0, it knows that the output of the item is "00 0000 0001", which represents that downlink port 0 is opened, thus the packet enters STB-0.

4. The advantages of the embodiments of the invention will be further described below by comparing with IP Internet.

1) Impersonation may be prevented fundamentally on network address structure.

A user device informs the network of its IP Internet address; but in the invention, the network informs the user device of the novel network address.

To prevent others from intruding, the PC and Internet set a complex password and secret code barrier. Even for a real-name address, it still cannot be avoided that the secret code is deciphered or the security information of the user leaks out due to user's inadvertency. A PC terminal connected to the IP Internet must give a self-introduction first and inform the network of its IP address. However, who can guarantee that the IP address is true? This will be the first loophole of IP Internet that cannot be overcome.

In the novel network of the invention, the address of a terminal is learnt via network management protocol, and the user terminal can only access the novel network of the invention via this address that is learnt. Therefore, it can be ensured without authentication. A detailed description thereof may refer to network management protocol. The novel network of the invention creates a "colored" address system with an ordered structure (D/SCAF). The novel network address of the invention not only has uniqueness, but also has a function of being locatable and characterizable; for example, similar to ID card number, it implies the geographic position of user port, device attribute, service right and other characteristics. A switch on the novel network of the invention specifies a rule of conduct for the packets according to these characteristics, thus data distribution with different attribute may be realized.

2) An independent passport is issued for each service, so that the path for hacker attack and virus diffusion can be blocked.

A user can enter and exit the IP Internet freely, and a user prepares a firewall by himself/herself; but in the novel network of the invention, a passport must be requested for each service.

On the IP network, because a communication protocol is executed on a user terminal, it may be tampered. Route information is broadcast on the network, so it may be intercepted. Various intrinsic defects of IP network, for example, address spoofing, anonymous attack, mail bomb, teardrop, hidden monitoring, port scanning, internal intruding and information altering, etc., provide a stage for hackers. It is difficult to prevent Internet pollutions, such as junk mail, etc.

Because a user on the IP Internet may set any IP address to personate another user, a probe may be sent to any device on the network to snoop the information thereof, and any interference packet may be sent to the network (foul water casting). Therefore, various firewalls are invented. However, the installation of a firewall is voluntary, and the effect of a firewall is temporary and relative, because the IP Internet itself will never be clean. This is the second security defect of IP Internet that cannot be overcome.

In the novel network of the invention, after a user accesses the network, the network switch only allows the user to issue limited service requests to a node server, and all other packets will be shut down. If the node server authorizes the user request, it issues a network passport to the switch on which the user exists, and if a packet issued by the user terminal does not meet the authentication condition on the network switch end, it will be discarded, thus hacker attack can be avoided. Each time a service ends, the passport will be cancelled automatically. The passport mechanism is executed by the switch, which is outside the control range of a user.

Authentication of user packet source address: it can prevent a user from sending any imitated or anonymous packet (which is automatically set after network access).

Authentication of destination address: a user can only send a packet to an object designated by the server (which is determined during service request).

Authentication of data traffic: data traffic sent by a user must meet a specification of the server (which is determined during service request).

Authentication of copyright identification: it prevents a user from forwarding content with a copyright that is downloaded from the network (which is set by a content provider).

Passive measures such as firewall, antivirus, encryption and isolation between internet and intranet, etc., will not be needed on the novel network of the invention, and the novel network of the invention blocks the approach of hacker attack and virus diffusion on the network structure. Therefore, it may be secure network essentially.

3) Network device and user data are completely isolated, thus the lifeline of virus and Trojan can be cut off.

An IP Internet device may dismantle a user packet freely: but the novel network device of the invention is completely isolated from the user data. That is, during data transmission, a novel network device (for example, switch and gateway, etc.) does not dismantle user packet; instead, it looks up in a mapping table according to the packet address, and then forwards it from the corresponding port. That is, the switch of the invention does not have the function of route calculation and selection.

The computer created by Von Neumann put program instructions and operating data in the same place, that is, a segment of program may modify other programs and data in the machine. Such a computer mode still in use today gives an opportunity to Trojan, worm, virus and backdoor, etc. With the rapid accumulation of virus, the antivirus software and patch always lag behind, so they will be in a passive state.

The technical core of Internet TCP/IP protocol is Best Efforts. Store & Forward and Error Detection & Retransmission. To complete the mission of Internet, the network server and router must have the ability of user packet resolution, which leaves a way to hacker and virus. Thus, network security becomes an Indian wrestling in which the smarter one will win for the moment. This is the third defect of IP Internet that is inherited.

On the novel network of the invention, it is impossible for the CPUs of all servers and switch devices to touch the user packet of any user. That is, the whole novel network of the invention only establishes a transparent pipeline with specified flow and behaviors, which is completely isolated, between the terminal devices of the service-providing party and the service-receiving party. Whatever are received or sent by a user terminal, it has nothing to do with the network. The lifeline of virus and Trojan is cut off on the structure. Therefore, an end may be put to the possibility of stealing user data on the network; by the same token, those who attempt to be a hacker or make a virus will have no object to attack.

4) Free connections between users are completely isolated, so that effective management may be ensured.

IP Internet is a free market and has no middleman: the novel network of the invention is a department store and has middlemen. For the network, consumers and content providers both belong to the category of network users, except for different scales. IP Internet is a free market that will not be managed, and communication may be conducted directly between any users (P2P). That is, it is determined by users whether management is needed, it is determined by unilateral large users (providers) whether it is charged, and it is determined by unilateral large users (vampire websites) whether laws and regulations are to be complied with. The operator can at most collect an entrance fee, and it will be Arabian Nights that the operator conducts legal, moral, security or commercial rules, neither now nor in the future. This is the fourth disability of IP Internet on structure.

In the novel network of the invention, it creates a concept of service node, and it forms a department store commercial mode that is managed. Free contact is impossible between users or between consumers and providers, and all contacts must be authorized by a node server (middleman), which is a necessary condition to realize the effective management of network services. If one wants to be a novel network user, he/she must negotiate a role with the network operator; for example, from ordinary consumer to network store, school, hospital, government department, or even TV station, they are all clients of the operator, just as that the above are all clients of the telephone company. It seems that each role on the network just receives and sends a video content, however, for the receiving and sending of the video content, it must strictly comply with certain behavior rules that are negotiated. Only with specifications that must be complied with, can the relation between various users become C2C, B2C, B2B and so on in a true sense, or called managed user-to-user communication (MP2P).

5) Commercial rules are implanted into the communication protocol to ensure a profit-gaining mode;

IP Internet follows a mode of communication first; while the novel network of the invention follows a mode of management first.

For IP Internet, illegal media contents can only be sequestrated partially after a serious affect is caused, but it cannot be prevented in advance. "Professional attacks" that are systematically organized and planned cannot be prevented by law and morality; moreover, one can only be punished by law after others are harmed. The IP Internet defines management as an additional service, which is established on the application layer. Therefore, it is certain that management becomes an ornament which may exist or not. This is the fifth nature of IP Internet that cannot be changed.

In the novel network of the invention, a user terminal can only select to apply one of the services designated by the node server. The protocol signaling during the service establishing process is executed by the node server (without being processed by the user). The user terminal only answers the questions of the server passively, and accepts or rejects the service, and it cannot participate in the protocol process. Once the user accepts the service provided by the server, it will only be able to send a packet according to the mode specified by the passport, and any packet departing from the passport will be discarded in a bottom-layer switch. The basic concept of the novel network protocol according to the invention is to realize a commercial mode with a core of service content, rather than performing simple data communication. In such a mode, security will be an intrinsic attribute of the novel network, rather than being an additional service appended to the network. Of course, service right authentication, resource confirmation and charging procedure, etc., all may be easily contained in the arrangement contract.

For the communication system for a novel network according to the invention, it basically corresponds to the above method embodiments, and reference may be made to the related description of the above method embodiments, so it will not be described again here.

It should be noted that, in this specification, relation terms such as first, second and so on are only used to distinguish one entity or operation from another entity or operation, rather than requiring or implying that such an actual relation or sequence exists between these entities or operations.

A communication method for a novel network and a communication system for a novel network according to the invention have been described in detail above. Theory and embodiment of the invention are illustrated with specific examples, and the description of the above embodiments only aims to help one skilled in the art to understand the method of the invention and its core concept; at the same time, various modifications and variations may be made by those skilled in the art without departing from the scope of the invention. In conclusion, the contents of the specification should not be construed as limiting the scope of the invention.

What is claimed is:

1. A communication method for a novel network, wherein the novel network is a network with a centralized control function, which comprises a main control server and subordinate network devices, the subordinate network devices comprise terminals, and the method comprises:
configuring, by the main control server, a downlink communication link of a current service; and
transmitting a data packet of the current service, sent from a source terminal, to a target terminal via the downlink communication link;
wherein the subordinate network devices comprises an access switch, a terminal, and an Ethernet protocol conversion gateway and the Ethernet connected between the access switch and the terminal, and the method further comprises:
the Ethernet protocol conversion gateway accessing the novel network by:
issuing, by the main control server, a query packet;
receiving, by the Ethernet protocol conversion gateway, the query packet and returning a reply packet that contains a serial number of the Ethernet protocol conversion gateway, after the Ethernet protocol conversion gateway is powered on and initialized;
looking up, by the main control server, Ethernet protocol conversion gateway information corresponding to the serial number in a registration information table, wherein the Ethernet protocol conversion gateway information comprises an MAC address of the Ethernet protocol conversion gateway and an MAC address of a terminal ae bound to the Ethernet protocol conversion gateway;
sending, by the main control server, a network access command to the Ethernet protocol conversion gateway, wherein the network access command contains an address of the Ethernet protocol conversion gateway in the novel network and the MAC address of the Ethernet protocol conversion gateway; and
returning, by the Ethernet protocol conversion gateway, a reply after receiving the network access command, and accessing the novel network;
wherein a binding relation between the MAC address of the terminal and the Ethernet protocol conversion gateway is preset in a node server at the time the terminal and the Ethernet protocol conversion gateway are initialized;
and wherein after the Ethernet protocol conversion gateway accesses the novel network and obtains the MAC address of the Ethernet protocol conversion gateway and the MAC address of the terminal are bound to the Ethernet protocol conversion gateway, the method further comprises:
the terminal is bound to the Ethernet protocol conversion gateway accessing the novel network by:
issuing, by the main control server, a query packet;
receiving, by the Ethernet protocol conversion gateway, the query packet, orienting the query packet to a corresponding port according to a protocol packet address table, adding the MAC address of the Ethernet protocol conversion gateway and the MAC address of the target terminal into the query packet, and forwarding the query packet;
receiving, by the terminal, the query packet, and returning a reply packet that contains a serial number of the terminal, after the terminal is powered on and initialized;
removing, by the Ethernet protocol conversion gateway, the MAC address of the Ethernet protocol conversion gateway and the MAC address of the terminal in the reply packet, and then forwarding the reply packet to the main control server;
finding, by the main control server, terminal information corresponding to the serial number of the terminal in the registration information table, and sending a network access command, wherein the network access command contains an address of the terminal in the novel network;

receiving, by the Ethernet protocol conversion gateway, the network access command, and forwarding the network access command after adding the MAC address of the Ethernet protocol conversion gateway and the MAC address of the target terminal; and returning, by the terminal, a reply after receiving the network access command;

and forwarding, by the Ethernet protocol conversion gateway, the reply to the main control server after removing the MAC address of the Ethernet protocol conversion gateway and the MAC address of the terminal from the reply; and the terminal accessing the novel network.

2. The method of claim 1, wherein the novel network comprises an access network, the main control server is a node server and the subordinate network devices comprise an access switch and terminals in the access network, the service comprises a unicast communication service, and the configuring by the main control server the downlink communication link of the current service comprises:

acquiring, by the main control server, information on the downlink communication link of the current service according to a service request protocol packet initiated by the source terminal, wherein the information on the downlink communication link comprises downlink communication port information of the main control server and an access switch that participate in the current service;

setting, by the main control server, a downlink port to which the data packet of the current service is to be oriented in its internal data packet address table according to the downlink communication port information of the main control server, and sending a port configuration command to the corresponding access switch according to the downlink communication port information of the access switch; and setting, by the access switch, a downlink port to which the data packet of the current service is to be oriented in its internal data packet address table in response to the port configuration command.

3. The method of claim 2, wherein the subordinate network devices each has a corresponding access network address, and the acquiring by the main control server the information on the downlink communication link of the current service comprises:

obtaining, by the main control server, a service request protocol packet initiated by the source terminal for establishing a unicast communication service with the target terminal, wherein the service request protocol packet comprises service type information, service content information and an access network address of the source terminal, and the service content information comprises a service number;

extracting, by the main control server, an access network address of the target terminal from a preset content-address mapping table according to the service number; and acquiring, by the main control server, the information on the downlink communication link of the current service according to the service type information, the access network address of the source terminal, and the access network address of the target terminal;

wherein a downlink port to which a unicast data packet of the current service is to be oriented, that is set by the main control server in its internal unicast data packet address table, comprises: a downlink port to which the unicast data packet, with a destination address being an address of the source terminal, is to be oriented; and/or a downlink port to which the unicast data packet, with a destination address being an address of the target terminal, is to be oriented;

and wherein when information on a communication link is information on a unidirectional communication link, communication port information of an access switch comprises uplink port information of an uplink access switch and downlink port information of a downlink access switch; and a port to which the unicast data packet of the current service is to be oriented, that is set by an access switch in its internal unicast data packet address table according to the port configuration command, comprises: an uplink port of an uplink access switch and a downlink port of a downlink access switch to which the unicast data packet with a destination address being the address of the target terminal is to be oriented;

and wherein when information on a communication link is information on a bidirectional downlink communication link, communication port information of an access switch comprises uplink port information and downlink port information of an uplink access switch, and uplink port information and downlink port information of a downlink access switch; and a port to which the unicast data packet of the current service is to be oriented, that is set by an access switch in its internal unicast data packet address table according to the port configuration command, comprises: an uplink port and a downlink port of an uplink access switch to which the unicast data packet with a destination address being the address of the target terminal is to be oriented; and an uplink port and a downlink port of an downlink access switch to which the unicast data packet with a destination address being the address of the source terminal is to be oriented.

4. The method of claim 2, wherein the data packet of the current service comprises an access network address of the target terminal, and the transmitting the data packet of the current service to the target terminal via the downlink communication link comprises:

looking up, by the main control server, the downlink port to which the data packet of the current service is to be oriented in its internal data packet address table according to the access network address of the target terminal, and transmitting the data packet to the corresponding access switch via the downlink port; and looking up, by the access switch, the downlink port to which the data packet of the current service is to be oriented in its internal data packet address table according to the access network address of the target terminal, and transmitting the data packet to the target terminal via the downlink port.

5. The method of claim 1, further comprising:

transmitting a data packet of the current service, sent from the target terminal, to the source terminal via the downlink communication link;

wherein the data packet of the current service comprises an access network address of the source terminal, and the transmitting the data packet of the current service to the source terminal via the downlink communication link comprises:

looking up, by the main control server, the downlink port to which the data packet of the current service is to be oriented in its internal data packet address table according to the access network address of the source terminal, and transmitting the data packet to the corresponding access switch via the downlink port; and looking up, by the access switch, the downlink port to which the data packet of the current service is to be oriented in its internal data packet address table according to the access network address of the source terminal, and transmitting the data packet to the source terminal via the downlink port.

6. The method of claim 2, wherein the service comprises a multicast communication service, the subordinate network devices each has a corresponding access network address, and the acquiring by the main control server the information on the downlink communication link of the current service comprises:

obtaining, by the main control server, a service request protocol packet initiated by the target terminal for applying for a multicast communication service, wherein the service request protocol packet comprises service type information, service content information and an access network address of the target terminal, and the service content information comprises a service number;

extracting, by the main control server, an access network address of the source terminal from a preset content-address mapping table according to the service number; and acquiring, by the main control server, a multicast address corresponding to the source terminal and allocating the multicast address to the target terminal; and acquiring communication link information of the current multicast service according to the service type information, the access network address of the source terminal, and the access network address of the target terminal.

7. The method of claim 6, wherein the acquiring by the main control server the information on the downlink communication link of the current service further comprises:

obtaining, by the main control server, a service request protocol packet submitted by the source terminal for initiating a multicast communication service, and allocating a multicast address to the source terminal according to the service request protocol packet, wherein the service request protocol packet comprises service type information, service content information and the access network address of the source terminal, and the service content information comprises a service number; and acquiring uplink communication link information of the current multicast service according to the service type information, an access network address of the main control server, and the access network address of the source terminal;

or the acquiring by the main control server the information on the downlink communication link of the current service further comprises:

acquiring downlink communication link information of the current multicast service according to the service type information, the access network address of the main control server, and the access network address of the source terminal;

wherein a port to which a multicast data packet of the current service is oriented, that is set by the main control server in its internal multicast data packet address table, comprises: a downlink port to which the multicast data packet with a destination address being the multicast address is to be oriented;

and wherein communication port information of an access switch comprises uplink port information of an uplink access switch and downlink port information of a downlink access switch; and a port to which the multicast data packet of the current service is to be oriented, that is set by an access switch in its internal multicast data packet address table according to the port configuration command, comprises: an uplink port of an uplink access switch and a downlink port of an downlink access switch to which the multicast data packet with a destination address being the multicast address is to be oriented;

or wherein the communication port information of the access switch further comprises downlink port information of the uplink access switch; and the port to which the multicast data packet of the current service is to be oriented, that is set by the access switch in its internal multicast data packet address table according to the port configuration command, comprises: a downlink port of the uplink access switch to which the multicast data packet with a destination address being the multicast address is to be oriented.

8. The method of claim 1, wherein the main control server is a node server, has its own access network address, and maintains access network addresses of the subordinate network devices;

and wherein the subordinate network devices comprises an access switch, and the method further comprises:

the access switch accessing the novel network by:

the access switch being powered on and setting in its internal downlink protocol packet address table that all downlink protocol packets are to be oriented to a CPU module;

receiving, by the access switch, a downlink protocol packet sent from the main control server and orienting the downlink protocol packet to the CPU module of the access switch according to the settings of the downlink protocol packet address table; and generating, by the CPU module, an uplink protocol packet and sending the uplink protocol packet to the main control server; wherein the downlink protocol packet contains an access network address that is to be allocated;

sending, by the main control server, a network access command to the access switch, wherein the network access command contains an access network address of the access switch, and the access network address is the access network address to be allocated in the downlink protocol packet received by the access switch; and updating, by the access switch, its internal downlink protocol packet address table, for orienting only a protocol packet with a destination address being its own access network address to the CPU module.

9. The method of claim 1, wherein the novel network comprises a metropolitan area network, and the main control server is a metropolitan area server and the subordinate network devices comprise a node switch and a node server in the metropolitan area network, and wherein the node switch is connected between the metropolitan area server and the node server, and the method further comprises:

after a subordinate network device accesses the metropolitan area network, allocating, by the metropolitan area server, a protocol label and a metropolitan area network address to the device that accesses the network;

wherein, the protocol label is adapted to describe a connection between the subordinate network device and the metropolitan area server; when there exist multiple connections between one and the same subordinate network device and the metropolitan area server, the metropolitan area server allocates a different protocol label to each connection; and allocating, by the metropolitan area server, a data label of a corresponding service to each service request across the metropolitan area network, wherein the data label is adapted to describe a connection between node servers related to the service.

10. The method of claim 9, wherein the allocating by the metropolitan area server the protocol label and the metropolitan area network address after the subordinate network device accesses the metropolitan area network comprises:

sending, by the metropolitan area server, metropolitan area query label packets to all of its downlink ports, wherein each metropolitan area query label packet contains a standby protocol label allocated by the metropolitan area server;

receiving, by a certain subordinate network device, a metropolitan area query label packet sent by the metropolitan area server after said subordinate network device is powered on, and then returning a metropolitan area reply label packet to the metropolitan area server, wherein the metropolitan area reply label packet contains a serial number of the subordinate network device and a port number of a port that receives the metropolitan area query label packet;

verifying, by the metropolitan area server according to the serial number in the metropolitan area reply label packet after receiving the packet, whether the subordinate network device is registered; if it is registered, sending a network access command to the port of the subordinate network device that receives the metropolitan area query label packet, wherein the network access command contains a metropolitan area network address allocated by the metropolitan area server to the subordinate network device and the standby protocol label; and returning, by the corresponding port of the subordinate network device, a network access command reply after receiving the network access command, and the subordinate network device accessing the metropolitan area network;

wherein the method further comprises:

setting, by the subordinate network device, in its internal protocol packet label table that all metropolitan area protocol packets are oriented to a CPU module when the subordinate network device is powered on, wherein the protocol packet label table is set in the subordinate network device; and when the subordinate network device is a node switch, after accessing the metropolitan area network, modifying, by the node switch, its own protocol packet label table according to an instruction of the metropolitan area server, and orienting metropolitan area protocol packets corresponding to respective standby protocol labels newly allocated by the metropolitan area server to corresponding downlink ports of the node switch respectively;

wherein, the standby protocol labels newly allocated are adapted to describe connections between the metropolitan area server and a subordinate connecting device of the node switch, and the metropolitan area protocol packets comprise the metropolitan area query label packets sent by the metropolitan area server;

and wherein the method further comprises:

setting, by the subordinate network device, in its internal reply packet label table that orientation of all metropolitan area reply label packets is shut down when the subordinate network device is powered on, wherein the reply packet label table is set in the subordinate network device;

modifying, by the subordinate network device, its own reply packet label table after receiving a metropolitan area query label packet sent by the metropolitan area server, and orienting a metropolitan area reply label packet corresponding to the protocol label to an uplink port that receives the metropolitan area query label packet; and when the subordinate network device is a node switch, after accessing the metropolitan area network, modifying, by the node switch, its own reply packet label table according to an instruction of the metropolitan area server, and orienting metropolitan area reply label packets corresponding to respective standby protocol labels newly allocated by the metropolitan area server to corresponding uplink ports of the node switch respectively;

wherein, the standby protocol labels newly allocated are adapted to describe connections between a subordinate connecting device of the node switch and the metropolitan area server;

and wherein the method further comprises:

setting, by the metropolitan area server, in its internal protocol packet label table that orientation of all metropolitan area protocol packets is shut down when the metropolitan area server is powered on, wherein the protocol packet label table is set in the metropolitan area server; and allocating, by the metropolitan area server, standby protocol labels corresponding to the number of its own downlink ports, modifying its own protocol packet label table, and orienting metropolitan area protocol packets corresponding to respective allocated standby protocol labels to corresponding downlink ports of the metropolitan area server respectively;

wherein, the standby protocol labels are adapted to describe connections between the metropolitan area server and a subordinate network device, and the metropolitan area protocol packets comprise the metropolitan area query label packets sent by the metropolitan area server; the metropolitan area server sends the metropolitan area query label packets to its downlink ports according to its own protocol packet label table;

and wherein the method further comprises:

newly allocating, by the metropolitan area server, standby protocol labels to a subordinate connecting device of a subordinate network device after the subordinate network device accesses the network, modifying its own protocol packet label table, and orienting metropolitan area protocol packets corresponding to respective newly allocated standby protocol labels to corresponding downlink ports of the metropolitan area server respectively;

wherein, the newly allocated standby protocol labels are adapted to describe connections between the metropolitan area server and the subordinate connecting device of the subordinate network device, and the metropolitan area protocol packets comprise the metropolitan area query label packets sent by the metropolitan area server; the metropolitan area server sends the metropolitan area query label packets to its downlink ports according to its own protocol packet label table.

11. A communication system for a novel network, wherein the novel network is a network with a centralized control function, which comprises a main control server and subordinate network devices, the subordinate network devices comprise terminals, and the system comprises the main control server and subordinate network devices, wherein:

the main control server is configured for configuring a downlink communication link of a current service; and configured for transmitting a data packet of the current service, sent from a source terminal, to a target terminal via the downlink communication link;

the subordinate network device comprises an access switch, a terminal, and an Ethernet protocol conversion gateway and the Ethernet connected between the access switch and the terminal, the main control server is further configured for issuing a query packet; looking up Ethernet protocol conversion gateway information corresponding to the serial number in a registration information table, wherein the Ethernet protocol conversion gateway information comprises an MAC address of the Ethernet protocol conversion gateway and an MAC address of a terminal are bound to the Ethernet protocol conversion gateway; to sending a network access command to the Ethernet protocol conversion gateway, wherein the network access command contains an address of the Ethernet protocol conversion gateway in the novel network and the MAC address of the Ethernet protocol conversion gateway; and the Ethernet protocol conversion gateway is configured for receiving the query packet and returning a reply packet that contains a serial number of the Ethernet protocol conversion gateway, after the Ethernet protocol conversion gateway is powered on and initialized, and returning a reply after receiving the network access command, and accessing the novel network;

wherein a binding relation between the MAC address of the terminal and the Ethernet protocol conversion gateway is preset in a node server at the time the terminal and the Ethernet protocol conversion gateway are initialized;

wherein the main control server is further configured for issuing a query packet;

the Ethernet protocol conversion gateway is further configured for receiving the query packet, orienting the query packet to a corresponding port according to a protocol packet address table, adding the MAC address of the Ethernet protocol conversion gateway and the MAC address of the target terminal into the query packet, and forwarding the query packet;

the terminal is configured for receiving the query packet, and returning a reply packet that contains a serial number of the terminal, after the terminal is powered on and initialized;

the Ethernet protocol conversion gateway is configured for removing the MAC address of the Ethernet protocol conversion gateway and the MAC address of the terminal in the reply packet, and then forwarding the reply packet to the main control server;

the main control server is further configured for finding terminal information corresponding to the serial number of the terminal in the registration information table, and sending a network access command, wherein the network access command contains an address of the terminal in the novel network;

the Ethernet protocol conversion gateway is configured for receiving the network access command, and forwarding the network access command after adding the MAC address of the Ethernet protocol conversion gateway and the MAC address of the target terminal; and the terminal is configured for returning a reply after receiving the network access command;

the Ethernet protocol conversion gateway is configured for forwarding the reply to the main control server after removing the MAC address of the Ethernet protocol conversion gateway and the MAC address of the terminal from the reply.

12. The system of claim 11, wherein the novel network comprises an access network, the main control server is a node server and the subordinate network devices comprise an access switch and terminals in the access network, the service comprises a unicast communication service, and the main control server is configured for:

acquiring information on the downlink communication link of the current service according to a service request protocol packet initiated by the source terminal, wherein the information on the downlink communication link comprises downlink communication port information of the main control server and an access switch that participate in the current service;

setting a downlink port to which the data packet of the current service is to be oriented in its internal data packet address table according to the downlink communication port information of the main control server; and sending a port configuration command to the corresponding access switch according to the downlink communication port information of the access switch, so that the access switch sets a downlink port to which the data packet of the current service is to be oriented in its internal data packet address table in response to the port configuration command.

13. The system of claim 12, wherein, the subordinate network devices each has a corresponding access network address, and the main control server is configured for:

obtaining a service request protocol packet initiated by the source terminal for establishing a unicast communication service with the target terminal, wherein the service request protocol packet comprises service type information, service content information and an access network address of the source terminal, and the service content information comprises a service number;

extracting an access network address of the target terminal from a preset content-address mapping table according to the service number; and acquiring the information on the downlink communication link of the current service according to the service type information, the access network address of the source terminal, and the access network address of the target terminal;

wherein a downlink port to which a unicast data packet of the current service is to be oriented, that is set by the main control server in its internal unicast data packet address table, comprises: a downlink port to which the unicast data packet, with a destination address being an address of the source terminal, is to be oriented; and/or a downlink port to which the unicast data packet, with a destination address being an address of the target terminal, is to be oriented;

and wherein when the information on a communication link is information on a unidirectional communication link, communication port information of an access switch comprises uplink port information of an uplink access switch and downlink port information of a downlink access switch; and a port to which the unicast data packet of the current service is to be oriented, that is set by an access switch in its internal unicast data packet address table according to the port configuration command, comprises: an uplink port of an uplink access switch and a downlink port of a downlink access switch to which the unicast data packet with a destination address being the address of the target terminal is to be oriented;

and wherein when information on a communication link is information on a bidirectional downlink communication link, communication port information of an access switch comprises uplink port information and downlink port information of an uplink access switch, and uplink port information and downlink port information of a downlink access switch; and a port to which the unicast data packet of the current service is to be oriented, that is set by an access switch in its internal unicast data packet address table according to the port configuration command, comprises: an uplink port and a downlink port of an uplink access switch to which the unicast data packet with a destination address being the address of the target terminal is to be oriented; and an uplink port and a downlink port of an downlink access switch to which the unicast data packet with a destination address being the address of the source terminal is to be oriented.

14. The system of claim 12, wherein the data packet of the current service comprises an access network address of the target terminal, and the main control server is configured for:

looking up the downlink port to which the data packet of the current service is to be oriented in its internal data packet address table according to the access network address of the target terminal, and transmitting the data packet to the corresponding access switch via the downlink port; and looking up the downlink port to which the data packet of the current service is to be oriented in its internal data packet address table according to the access network address of the target terminal, and transmitting the data packet to the target terminal via the downlink port.

15. The system of claim 11, wherein the main control server is configured for transmitting a data packet of the current service, sent by the target terminal, to the source terminal via the downlink communication link;

wherein the data packet of the current service comprises an access network address of the source terminal, and the main control server is configured for looking up the downlink port to which the data packet of the current service is to be oriented in its internal data packet address table according to the access network address of the source terminal, and transmitting the data packet to the corresponding access switch via the downlink port; and the access switch is configured for looking up the downlink port to which the data packet of the current service is to be oriented in its internal data packet address table according to the access network address of the source terminal, and transmitting the data packet to the source terminal via the downlink port.

16. The system of claim 12, wherein the service comprises a multicast communication service, the subordinate network devices each has a corresponding access network address, and the main control server is configured for obtaining a service request protocol packet initiated by the target terminal for applying for a multicast communication service, wherein the service request protocol packet comprises service type information, service content information and an access network address of the target terminal, and the service content information comprises a service number;

extracting an access network address of the source terminal from a preset content-address mapping table according to the service number;

acquiring the multicast address corresponding to the source terminal and allocating the multicast address to the target terminal; and acquiring communication link information of the current multicast service according to the service type information, the access network address of the source terminal, and the access network address of the target terminal.

17. The system of claim 16, wherein the:

obtaining a service request protocol packet submitted by the source terminal for initiating a multicast communication service, wherein the service request protocol packet comprises service type information, service content information and the access network address of the source terminal, and the service content information comprises a service number;

allocating a multicast address to the source terminal according to the service request protocol packet; and acquiring uplink communication link information of the current multicast service according to the service type information, an access network address of the main control server, and the access network address of the source terminal;

or the main control server is configured for:

acquiring downlink communication link information of the current multicast service according to the service type information, the access network address of the main control server, and the access network address of the source terminal;

wherein a port to which a multicast data packet of the current service is oriented, that is set by the main control server in its internal multicast data packet address table, comprises: a downlink port to which the multicast data packet with a destination address being the multicast address is to be oriented;

and wherein the communication port information of an access switch comprises uplink port information of an uplink access switch and downlink port information of a downlink access switch; and a port to which the multicast data packet of the current service is to be oriented, that is set by an access switch in its internal multicast data packet address table according to the port configuration command, comprises: an uplink port of an uplink access switch and a downlink port of an downlink access switch to which the multicast data packet with a destination address being the multicast address is to be oriented;

or wherein the communication port information of the access switch further comprises downlink port information of the uplink access switch; and the port to which the multicast data packet of the current service is to be oriented, that is set by the access switch in its internal multicast data packet address table according to the port configuration command, comprises: a downlink port of the uplink access switch to which the multicast data packet with a destination address being the multicast address is to be oriented.

18. The system of claim 11, wherein, the main control server is a node server, has its own access network address, and maintains the access network addresses of the subordinate network devices;

and wherein the subordinate network device comprises an access switch, and the node server is further configured for:

sending a downlink protocol packet to the access switch; and sending a network access command according to an uplink protocol packet returned by the access switch; and the access switch is further configured for:

setting in its internal downlink protocol packet address table that all downlink protocol packets are to be oriented to a CPU module when it is powered on;

orienting the received downlink protocol packet to the CPU module of the access switch according to the settings of the downlink protocol packet address table, wherein the downlink protocol packet contains an access network address that is to be allocated;

generating an uplink protocol packet by the CPU module and sending the uplink protocol packet to the node server;

receiving the network access command sent by the node server, wherein the network access command contains an access network address of the access switch, and the access network address is the access network address to be allocated in the downlink protocol packet received by the access switch; and updating its internal downlink protocol packet address table to orient only a protocol packet with a destination address being its own access network address to the CPU module.

19. The system of claim 11, wherein, the novel network comprises a metropolitan area network, and the main control server is a metropolitan area server and the subordinate network devices comprise a node switch and a node server in the metropolitan area network, and wherein the node switch is connected between the metropolitan area server and the node server; and the system further comprises:

the metropolitan area server is configured for:

allocating a protocol label to a subordinate network device that accesses the metropolitan area network when the device accesses the network, and allocating a different protocol label to each connection when there exist multiple connections between one and the same subordinate network device and the metropolitan area server; wherein, the protocol label is adapted to describe a connection between the subordinate network device and the metropolitan area server, and the subordinate network device comprises a node switch and a node server;

allocating a data label of a corresponding service to each service request across the metropolitan area network, wherein the data label is adapted to describe a connection between node servers related to the service; and allocating a metropolitan area network address to a subordinate network device that accesses the metropolitan area network when the device accesses the network.

* * * * *